US012665637B2

(12) United States Patent (10) Patent No.: US 12,665,637 B2
Huang et al. (45) Date of Patent: Jun. 23, 2026

(54) METHOD FOR OBTAINING PRECODING MATRIX AND APPARATUS

(71) Applicant: HUAWEI TECHNOLOGIES CO., LTD., Shenzhen (CN)

(72) Inventors: Jie Huang, Shanghai (CN); Leting Li, Shanghai (CN); Liechen Li, Bangkok (TH); Liwei Ge, Shenzhen (CN); Li Wang, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 18/399,882

(22) Filed: Dec. 29, 2023

(65) Prior Publication Data

US 2024/0187050 A1 Jun. 6, 2024

Related U.S. Application Data

(63) Continuation of application No. PCT/CN2022/101379, filed on Jun. 27, 2022.

(30) Foreign Application Priority Data

Jun. 30, 2021 (CN) .......................... 202110738192.6

(51) Int. Cl.
*H04B 7/02* (2018.01)
*H04B 7/0456* (2017.01)
(52) U.S. Cl.
CPC .................................. *H04B 7/0456* (2013.01)

(58) Field of Classification Search
CPC . H04B 7/0456; H04B 7/0452; H04L 25/0224; H04L 25/0242; H04L 25/0204; H04L 25/03343; H04L 25/03006
(Continued)

(56) References Cited

U.S. PATENT DOCUMENTS 8,472,553 B2  6/2013  Li
9,312,935 B2  4/2016  Ketchum et al.
(Continued)

OTHER PUBLICATIONS

Petre Stoica et al,"Optimization of the Receive Filter and Transmit Sequence for Active Sensing", IEEE Transactions on Signal Processing, vol. 60, No. 4, Apr. 2012, total 11 pages.
(Continued)

*Primary Examiner* — Helene E Tayong
(74) *Attorney, Agent, or Firm* — HAUPTMAN HAM, LLP

(57) ABSTRACT

A method for obtaining a precoding matrix includes obtaining a joint precoding matrix of M terminals based on statistical autocorrelation matrices respectively corresponding to N terminals in the M terminals, where M and N are positive integers, $M \geq 2$, and $1 \leq N \leq M$. The method further includes outputting information that is useable to indicate the joint precoding matrix. The N terminals include a terminal $n_j$, wherein a statistical autocorrelation matrix $\overline{R}_{n_j}$ corresponding to the terminal $n_j$ is obtainable by filtering an autocorrelation matrix $R_{n_j}$ corresponding to the terminal $n_j$ in a frequency domain or a time domain, j is a positive integer, $1 \leq j \leq N$, and the autocorrelation matrix $R_{n_j}$ corresponding to the terminal $n_j$ is obtainable based on a channel estimation result $H_{n_j}$ corresponding to the terminal $n_j$.

20 Claims, 6 Drawing Sheets

(58) Field of Classification Search
USPC ........................................................ 375/267
See application file for complete search history.

(56) References Cited

U.S. PATENT DOCUMENTS

| | | | |
|---|---|---|---|
| 2003/0125040 A1 | 7/2003 | Walton et al. | |
| 2007/0117527 A1* | 5/2007 | Xu ........................ | H04B 7/0857 |
| | | | 455/127.4 |
| 2009/0067558 A1* | 3/2009 | Mourad ............... | H04B 1/1027 |
| | | | 375/348 |
| 2010/0171032 A1* | 7/2010 | Wang .................. | H01J 49/0009 |
| | | | 250/281 |

OTHER PUBLICATIONS

Simon Jarmyr et al.:"Statistical Precoding and Detection Ordering in MIMO Multiple-Access Channels with Decision Feedback Equalization", IEEE Internationalconference on Communications, DOI:10. 1109/ICC.2011.5963271 ISBN:978-1-61284-232-5,XP031908997,Jun. 5, 2021, total 6 pages.

Xiaoming Chen et al.: "Statistical Precoder Design for Space-Time-Frequency Block Codes in Multiuser MISO-MC-CDMA Systems", IEEE Systems Journal, ISSN: 1932-8184, DOI:10.1109/JSYST. 2014.2337885 , XP055150256,Jul. 9, 2014, total 10 pages.

Han Bin et al,:"Joint preceding and scheduling algorithm for massive MIMO FDD multi-cell network"ISSN: 1022-0038, DOI:10. 1007/S11276-017-1535-9,XP036683377,Jun. 14, 2017, total 11 pages.

Extended European Search Report issued in European Application No. 22831915.8, dated Sep. 25, 2024, pp. 1-8.

Office Action issued in IN202417000213 dated Apr. 16, 2026.

* cited by examiner

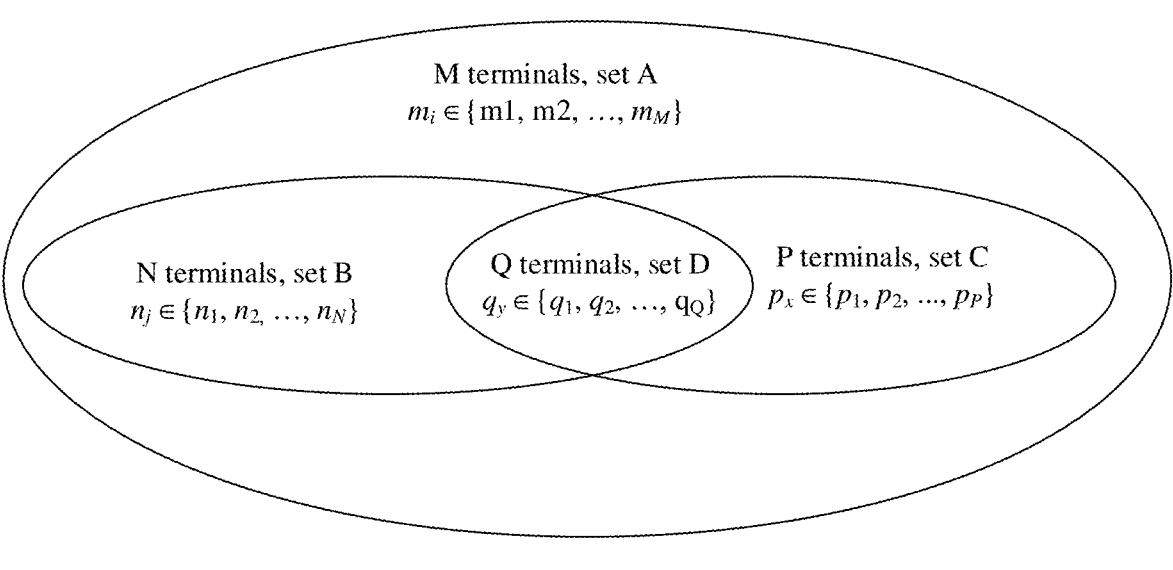

S501: Obtain channel estimation results of M terminals

↓

S502: Select N terminals from the M terminals

↓

S503: Calculate a statistical autocorrelation matrix of each of the N terminals

↓

S504: Calculate a single-user precoding matrix of each of the M terminals

↓

S505: Calculate a joint precoding matrix of the M terminals based on the statistical autocorrelation matrix of each of the N terminals and the single-user precoding matrix of each of the M terminals

FIG. 5

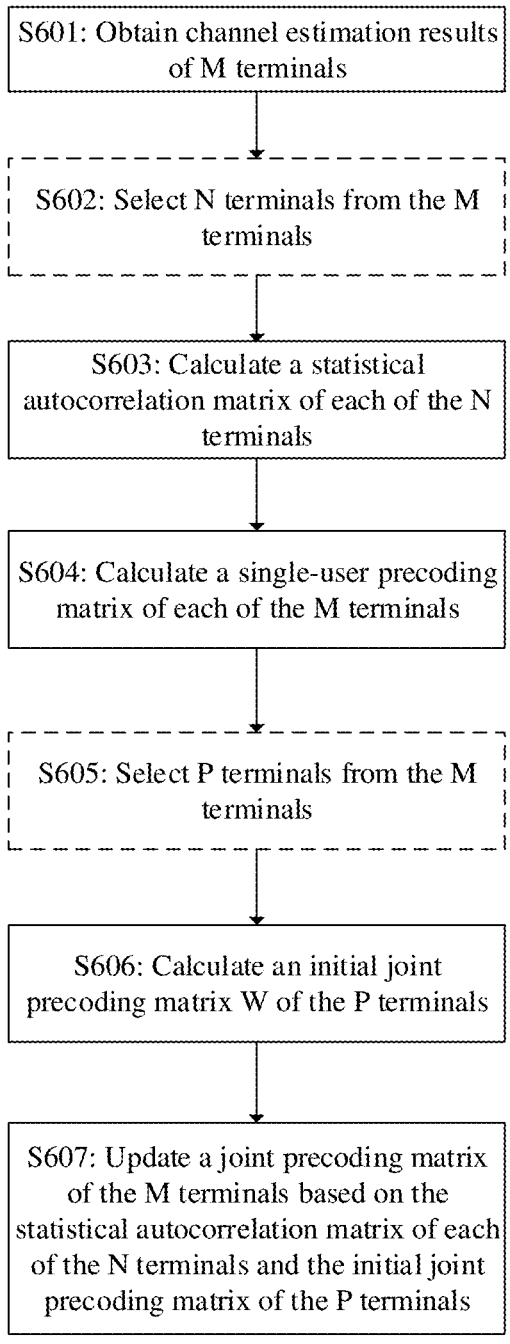

S601: Obtain channel estimation results of M terminals

S602: Select N terminals from the M terminals

S603: Calculate a statistical autocorrelation matrix of each of the N terminals

S604: Calculate a single-user precoding matrix of each of the M terminals

S605: Select P terminals from the M terminals

S606: Calculate an initial joint precoding matrix W of the P terminals

S607: Update a joint precoding matrix of the M terminals based on the statistical autocorrelation matrix of each of the N terminals and the initial joint precoding matrix of the P terminals

FIG. 6

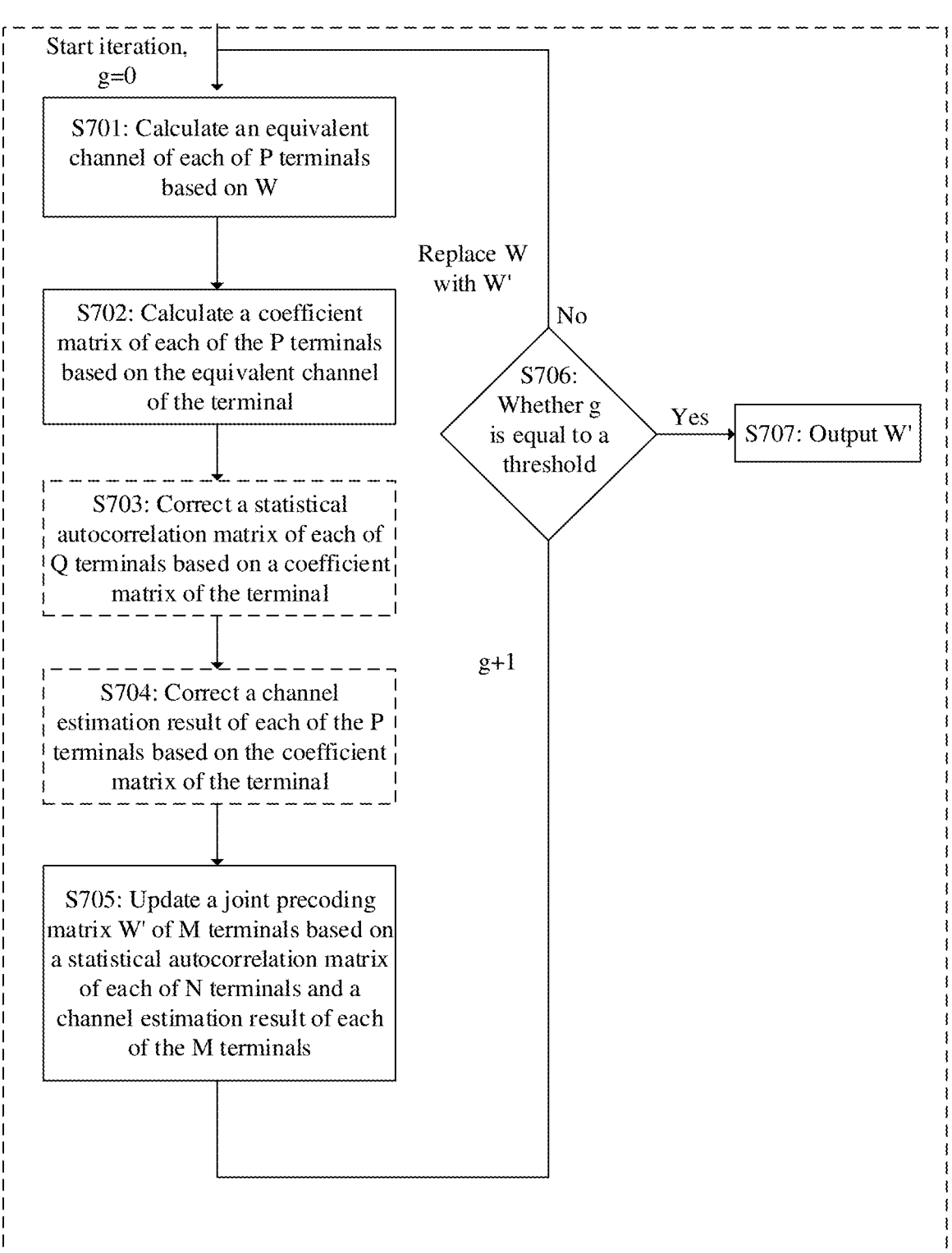

Start iteration,
g=0

S701: Calculate an equivalent channel of each of P terminals based on W

S702: Calculate a coefficient matrix of each of the P terminals based on the equivalent channel of the terminal S703: Correct a statistical autocorrelation matrix of each of Q terminals based on a coefficient matrix of the terminal S704: Correct a channel estimation result of each of the P terminals based on the coefficient matrix of the terminal S705: Update a joint precoding matrix W' of M terminals based on a statistical autocorrelation matrix of each of N terminals and a channel estimation result of each of the M terminals Replace W with W'

No

S706: Whether g is equal to a threshold

Yes

S707: Output W' g+1

FIG. 7

METHOD FOR OBTAINING PRECODING MATRIX AND APPARATUS

CROSS-REFERENCE TO RELATED APPLICATIONS

This application is a continuation of International Application No. PCT/CN2022/101379, filed on Jun. 27, 2022, which claims priority to Chinese Patent Application No. 202110738192.6, filed on Jun. 30, 2021, the disclosures of the aforementioned applications are hereby incorporated by reference in their entireties.

TECHNICAL FIELD

The present application relates to the field of communication technologies, and in particular, to a method for obtaining a precoding matrix and an apparatus.

BACKGROUND $5^{th}$ generation (5G) new radio (NR) is a new radio access technology that is developed by the $3^{rd}$ Generation Partnership Project (3GPP) and is used in a 5G mobile communication network. An idea of the 5G mobile communication network is to implement the following functions:

enhanced mobile broadband (eMBB): applicable to data-intensive applications, for example, augmented reality (AR), three-dimensional (3D) video conferencing, two-dimensional (2D) streaming videos, fixed wireless internet (Internet) access points, and other high-bandwidth applications;

massive machine-type communication (mMTC): applicable to large-scale internet of things (IoT) connections, including high-density sensor and device arrays in interconnected cities and interconnected homes, devices for monitoring complex global supply chains, and connected devices that move at high speeds; and ultra-reliable low-latency communication (URLLC): applicable to real-time mission-critical applications, for example, industrial control systems, autonomous vehicles, and remote real-time surgery, that require a high bandwidth, high reliability, and a low latency.

In one technology for implementing the foregoing functions, a large-scale antenna array and different precoding technologies are used to implement a function of simultaneous transmission for different users and improve throughput of an entire network. However, in a precoding technology, how to reduce inter-stream interference to improve downlink throughput performance is a problem to be urgently resolved.

SUMMARY

One or more embodiments of present application provide a method for obtaining a precoding matrix, a communication apparatus, and a communication system. A joint precoding matrix of M terminals is calculated based on statistical autocorrelation matrices of N terminals, so that a factor of channel aging can be considered in advance, to improve robustness of the precoding matrix, reduce interference between downlink streams, and improve downlink transmission performance.

According to a first aspect, this application provides a method for obtaining a precoding matrix. The method may be performed by a network device or a chip in the network device. The network device may be a network device in an architecture in which a central unit (centralized unit, CU) and a distributed unit (DU) are not separated, may be a CU or a DU in an architecture in which the CU and the DU are separated, may be a CU control plane (CU-CP) or a CU user plane (CU-UP) in an architecture in which the CU-CP and the CU-UP are separated, may be a DU or an RU in an architecture in which the DU and the radio unit (RU) are separated, may be a centralized controller, or the like.

In some embodiments, the method includes: first, obtaining a joint precoding matrix of M terminals based on statistical autocorrelation matrices respectively corresponding to N terminals in the M terminals, where M and N are positive integers, $M \geq 2$, and $1 \leq N \leq M$; and then outputting information that indicates the joint precoding matrix.

For ease of description, a terminal in the M terminals is referred to as $m_i$, where i is a positive integer, and $1 \leq i \leq M$. A terminal in the N terminals is referred to as $n_j$, where j is a positive integer, and $1 \leq j \leq N$.

In some embodiments, a statistical autocorrelation matrix $\overline{R}_{n_j}$ corresponding to the terminal $n_j$ is obtained by filtering an autocorrelation matrix $R_{n_j}$ corresponding to the terminal $n_j$ in frequency domain and/or time domain. The autocorrelation matrix $R_{n_j}$ corresponding to the terminal $n_j$ is obtained based on a channel estimation result $H_{n_j}$ corresponding to the terminal $n_j$.

A statistical autocorrelation matrix is a matrix obtained by processing an autocorrelation matrix. The statistical autocorrelation matrix in this application may be referred to as a filtered autocorrelation matrix, an accumulated autocorrelation matrix, an average autocorrelation matrix, a historical autocorrelation matrix, a processed autocorrelation matrix, or the like. Alternatively, the statistical autocorrelation matrix may have another name. This is not limited in this application.

Because the autocorrelation matrix $R_{n_j}$ corresponding to the terminal $n_j$ is obtained based on the channel estimation result $H_{n_j}$ corresponding to the terminal $n_j$, and the statistical autocorrelation matrix $\overline{R}_{n_j}$ corresponding to the terminal $n_j$ is obtained by filtering the autocorrelation matrix $R_{n_j}$ corresponding to the terminal $n_j$ in frequency domain and/or time domain, it may be understood that the statistical autocorrelation matrix $\overline{R}_{n_j}$ corresponding to the terminal $n_j$ indicates historical channel estimation results of the terminal $n_j$ on a plurality of resources (frequency domain resources and/or time domain resources). The historical channel estimation results may be used to predict a status of a future channel to some extent, and reflect a general direction of the future channel. Therefore, in a process of calculating the joint precoding matrix, the statistical autocorrelation matrices of the N terminals, that is, historical channel estimation results of the N terminals, are considered, so that statuses of future channels of the N terminals can be considered in advance, to help mitigate impact of channel aging, improve robustness of a precoding matrix, reduce inter-stream interference, improve a downlink throughput rate, and improve downlink transmission performance.

In some embodiments, $H_{n_j}$ may include $H_{r,n_j}(t)$, where r is a number of a subcarrier, $r=1, 2, \ldots, R$, r and R are integers greater than or equal to 1, t is a number of a moment, $t=1, \ldots, 2T$, t and T are integers greater than or equal to 1, and $H_{r,n_j}(t)$ represents a channel estimation result of a channel between a network device and the terminal $n_j$ at the moment t and on the subcarrier r.

The autocorrelation matrix $R_{n_j}$ may include $R_{r,n_j}(t)$, and a relationship between the autocorrelation matrix $R_{r,n_j}(t)$ and the channel estimation result $H_{r,n_j}(t)$ may be represented as $$R_{r,n_j}(t) = H_{r,n_j}(t)H_{r,n_j}^H(t),$$

where $$H_{r,n_j}^H(t)$$

represents a conjugate transpose matrix of $H_{r,n_j}(t)$.

In some embodiments, filtering in frequency domain and/or time domain includes (1) filtering in frequency domain, (2) filtering in time domain, and (3) filtering in frequency domain and filtering in time domain. The following provides descriptions with reference to several examples.

(1) Filtering performed on the autocorrelation matrix $R_{n_j}$ in frequency domain may be represented as $$\hat{R}_{n_j}(t) = \frac{1}{R}\sum_{r=1}^R R_{r,n_j}(t).$$

In some embodiments, a value of R may be determined based on an RBG or a scheduling bandwidth. For example, one RBG may include 48 subcarriers. In other words, R may be 48. For another example, R may be a quantity of subcarriers included in the scheduling bandwidth. For example, the scheduling bandwidth may include 4 RBGs. In other words, the scheduling bandwidth includes 4*48=192 subcarriers, and R is 192.

A numerical value of Q is increased, so that a frequency-domain autocorrelation matrix on a sufficiently wide bandwidth may be obtained, the channel space may be more approximate to channel space in time domain, and accuracy of calculating the statistical autocorrelation matrix is improved. In this way, the inter-stream interference is better avoided, and downlink performance is improved.

(2) Filtering performed on the autocorrelation matrix $R_{n_j}$ in time domain may be represented as $R_{\_n_j}(t)$, and $R_{\_n_j}(t)=\gamma R_{r,n_j}(t)+\beta R_{\_n_j}(t-1)$. $\gamma$ and $\beta$ represent filtering coefficients, and may be scalars. When t=1, $R_{\_n_j}(t-1)=0$, and $R_{\_n_j}(1)=\gamma R_{r,n_j}(1)$: when t=2, $R_{\_n_j}(2)=\gamma R_{r,n_j}(2)+\beta R_{\_n_j}(1)$: when t=3, $R_{\_n_j}(3)=\gamma R_{r,n_j}(3)+\beta_{\_n_j}(2)$, and so on.

(3) Filtering performed on the autocorrelation matrix $R_{n_j}$ in frequency domain and time domain may be represented as $$\hat{R}_{n_j}(t) = \frac{1}{R}\sum_{r=1}^R R_{\_r,n_j}(t).$$

and $R_{\_n_j}(t)=\gamma\hat{R}_{n_j}(t)+\beta R_{\_n_j}(t-1)$. For $\hat{R}_{n_j}(t)$, refer to the foregoing content. $\gamma$ and $\beta$ represent filtering coefficients, and may be scalars. When t=1, $R_{\_n_j}(t-1)=0$, and $R_{\_n_j}(1)=\gamma\hat{R}_{n_j}(1)$: when t=2, $R_{\_n_j}(2)=\gamma\hat{R}_{n_j}(2)+\beta R_{\_n_j}(1)$: when t=3, $R_{\_n_j}(3)=\gamma\hat{R}_{\_n_j}(3)+\beta R_{\_n_j}(2)$, and so on.

The statistical autocorrelation matrix $\overline{R}_{n_j}$ may be the foregoing $\hat{R}_{n_j}(t)$ or $R_{\_n_j}(t)$.

In some embodiments, the statistical autocorrelation matrix $\overline{R}_{n_j}$ includes T main diagonal blocks and a zero element other than the T main diagonal blocks, and T is an integer greater than or equal to 2. In some embodiments, there may be one or more zero elements.

In some embodiments, the statistical autocorrelation matrix $\overline{R}_{n_j}$ may include the T main diagonal blocks and the zero element other than the T main diagonal blocks. In other words, any element other than the T main diagonal blocks is a zero element.

In this application, a value of T may be determined based on a quantity of polarization directions of an antenna of the network device. As an example, T may be the quantity of polarization directions. The quantity of polarization directions may be 2, 3, 4, or a larger integer.

The main diagonal block may indicate an autocorrelation value in a same polarization direction, and a non-main diagonal block indicates a cross-correlation value between different polarization directions. One or more elements other than the main diagonal block are set to zero, and a correlation between polarizations is ignored, so that calculation may be simplified, complexity is reduced, and resources are saved.

In some embodiments, the N terminals may be terminals, in the M terminals, of which channel correlations satisfy a first preset condition. An example in which the channel correlation satisfies the first preset condition is that the channel correlation is less than a threshold. A higher channel correlation may indicate a smaller channel change. On the contrary, a lower channel correlation may indicate a larger channel change.

A statistical autocorrelation matrix operation is performed on a terminal with a large channel change, and the statistical autocorrelation matrix operation is not performed on a terminal with a small channel change, so that processing resources may be saved, and complexity is reduced.

In some embodiments, in the method according to the first aspect, the output may be an output from the network device to another network device.

In some embodiments, the output may be an output from one module in the network device to another module in the network device, for example, an output performed through an interface or the like. The interface may be a circuit. The module may be referred to as a unit, and may be specifically a physical unit, or may be a logical unit. This is not limited in this application.

The information that indicates the joint precoding matrix may be understood as that the joint precoding matrix may be obtained based on the information. There are a plurality of implementations for the information. The following provides descriptions.

In some embodiments, the information may be the joint precoding matrix.

In some embodiments, the information may be information that indicates a compressed matrix, and the compressed matrix corresponds to the joint precoding matrix.

The information that indicates the compressed matrix is output, so that overheads of the output information can be reduced, and communication resources can be saved.

In some embodiments, the information may be an index of the joint precoding matrix. The index is output, so that overheads of the information can be reduced, and communication resources can be saved.

In some embodiments, the joint precoding matrix includes precoding matrices respectively corresponding to the M terminals. Herein, the precoding matrices respectively corresponding to the M terminals may be referred to as multi-user precoding matrices. It is assumed that the M terminals include a first terminal. There may be a plurality of possibilities for a relationship between a precoding matrix corresponding to the first terminal and the statistical autocorrelation matrices respectively corresponding to the N terminals. The following describes two examples.

In a first example, the M terminals include the N terminals and the first terminal, and a precoding matrix that is in the joint precoding matrix and that corresponds to the first terminal is related to the statistical autocorrelation matrices respectively corresponding to the N terminals. In other words, the first terminal does not belong to the N terminals, and the precoding matrix corresponding to the first terminal is obtained based on the statistical autocorrelation matrices respectively corresponding to the N terminals.

In a second example, N≥2, the N terminals include the first terminal, and a precoding matrix that is in the joint precoding matrix and that corresponds to the first terminal is related to statistical autocorrelation matrices respectively corresponding to N−1 terminals, in the N terminals, other than the first terminal. In other words, the first terminal belongs to the N terminals, and the precoding matrix corresponding to the first terminal is obtained based on the statistical autocorrelation matrices respectively corresponding to the N−1 terminals other than the first terminal.

In some embodiments, in the second example, the precoding matrix corresponding to the first terminal is further related to a statistical autocorrelation matrix corresponding to the first terminal. In other words, the precoding matrix corresponding to the first terminal is obtained based on the statistical autocorrelation matrices respectively corresponding to the N−1 terminals other than the first terminal and the statistical autocorrelation matrix corresponding to the first terminal.

In some embodiments, a single-user precoding matrix of each of the M terminals may be first calculated, then a multi-user precoding matrix of the terminal is calculated, and then the multi-user precoding matrices of the terminals are concatenated to obtain the joint precoding matrix.

A multi-user precoding matrix of a terminal $m_i$ may be represented as $U_{m_i}$. The single-user precoding matrix $U_{m_i}$ of the terminal $m_i$ may be obtained based on a channel estimation result $H_{r,m_i}(t)$ of the terminal $m_i$. $H_{r,m_i}(t)$ may represent a channel estimation result of a channel between the network device and the terminal $m_i$ at the moment t and on the subcarrier r. For meanings of r and t, refer to the foregoing descriptions.

It is assumed that M and N are the same. In other words, the N terminals are the M terminals. The following describes calculation of a multi-user precoding matrix of each terminal $m_k$ with reference to two examples. It is assumed that the terminal $m_k$ is a terminal $n_l$, $1 \leq l \leq N$, the two terminals may be interchanged with each other, and M and N may be interchanged with each other.

In a first example, a sum of statistical autocorrelation matrices of other terminal(s), in the N terminals, other than the terminal $m_k$ is first calculated, for example, $$\Phi_{\backslash m_k} = \sum_{j=1, j \neq l}^{N} \left( \left( 1 - \alpha_{n_j}^2 \right) \bar{R}_{n_j} + \sigma_{n_j}{}^2 I \right),$$

where $\alpha_{n_j}$ represents a channel correlation of the terminal $n_j$, $\alpha_{n_j}$ may be a number from 0 to 1, $\sigma_{n_j}$ represents noise in a channel estimation corresponding to the terminal $n_j$, and I represents a unit matrix. Then, the multi-user precoding matrix of the terminal $m_k$ is calculated, and $$W'_{m_k} = \alpha_{m_k} \left( \sum_{i=1}^{M} \alpha_{m_i}^2 U_{m_i} (U_{m_i})^H + \Phi_{\backslash m_k} \right)^{-1} U_{m_k},$$

(65)

where $\alpha_{m_k}$ represents a channel correlation of the terminal $m_k$, $U_{m_i}$ represents the single-user precoding matrix of the terminal $m_i$, and $U_{m_k}$ represents a single-user precoding matrix of the terminal $m_k$.

The formula of $$W'_{m_k}$$

in the foregoing first example may be understood as that a precoding matrix of the terminal $m_k$ not only avoids channel space (which may be represented by $U_{m_i}$) of another terminal, in the M terminals, other than the terminal $m_k$ at the latest moment, but also avoids future possible channel space (which may be represented by $\Phi_{\backslash m_k}$) of the another terminal, so that a weight avoidance dimension is increased, downlink inter-stream interference can be reduced, and downlink data transmission performance can be improved.

It can be learned from the foregoing first example that multi-user precoding matrix corresponding to the terminal $m_k$ is related to a statistical autocorrelation matrix of the another terminal, in the N terminals, other than the terminal $m_k$, and the terminal $m_k$ may be understood as the first terminal in the foregoing descriptions.

In the foregoing first example, for each terminal $m_k$, the sum of statistical autocorrelation matrices of other terminals other than the terminal $m_k$ may be separately calculated, and the multi-user precoding matrix $$W'_{m_k}$$

of the terminal $m_k$ may be calculated.

In a second example, a sum of the statistical autocorrelation matrices of the N terminals is first calculated, for example, $$\Phi_N = \sum_{j=1}^{N} \left( \left( 1 - a_{n_j}^2 \right) \bar{R}_{n_j} + \sigma_{n_j}{}^2 I \right).$$

Then, the multi-user precoding matrix of the terminal $m_k$ is calculated, and $$W'_{m_k} = \left( \sum_{i=1}^{M} \alpha_{m_i}^2 U_{m_i} (U_{m_i})^H + \Phi_N \right)^{-1} \left( \alpha_{m_k} U_{m_k} + \left( 1 - \alpha_{m_k}^2 \right) \bar{R}_{m_k} U_{m_k} \right).$$

For a meaning of the formula, refer to the foregoing first example.

In the foregoing second example, the sum of the statistical autocorrelation matrices of the N terminals may be calculated, then inversion is performed on the sum of the statistical autocorrelation matrices of the N terminals, and then for each terminal $m_k$, the statistical autocorrelation matrix of the terminal $m_k$ is supplemented. In this way, the statistical autocorrelation matrices of N terminals are summed up only once, and inversion is performed only once, so that a quantity of times of summation and inversion of the statistical autocorrelation matrices can be reduced, calculation complexity can be reduced, and resources can be saved.

The formula of $$W'_{m_k}$$

7

8 in the foregoing second example may be understood as that the precoding matrix of the terminal $m_k$ not only avoids the channel space (which may be represented by $U_{m_i}$) of the another terminal, in the M terminals, other than the terminal $m_k$ at the latest moment, but also avoids future possible channel space (which may be represented by $\Phi_N$) of the N terminals, and channel space (which may be represented by $$(\alpha_{m_k} U_{m_k} + (1 - \alpha_{m_k}^2) \bar{R}_{m_k} U_{m_k}))$$

of the terminal $m_k$ is supplemented. The weight avoidance dimension is increased, so that the downlink inter-stream interference can be reduced, and the downlink data transmission performance can be improved.

It can be learned from the foregoing second example that the multi-user precoding matrix corresponding to the terminal $m_k$ is related to the statistical autocorrelation matrix of the another terminal, in the N terminals, other than the terminal $m_k$ and the statistical autocorrelation matrix of the terminal $m_k$, and the terminal $m_k$ may be understood as the first terminal in the foregoing descriptions.

In the foregoing first example and second example, the joint precoding matrix may be represented as:

$$W' = [W'_{m_1}, W'_{m_2}, \cdots, W'_{m_M}].$$

To improve accuracy of the joint precoding matrix, in a process of calculating the joint precoding matrix, a coefficient matrix may be introduced for correction. The following describes a correction solution. The following content and the foregoing content may be mutually referenced.

The M terminals include P terminals. The P terminals include a terminal $p_x$. The terminal $p_x$ corresponds to a coefficient matrix $B_{p_x}$. $B_{p_x}$ is related to a channel estimation result corresponding to each of the P terminals, where P and x are positive integers, $1 \leq P \leq M$, and $1 \leq x \leq P$. It may be understood that the P terminals in the M terminals have coefficient matrices, and the coefficient matrix $B_{p_x}$ of the terminal $p_x$ is obtained based on channel estimation results corresponding to the P terminals.

In some embodiments, the P terminals may be terminals, in the M terminals, of which a relationship between channels of the terminals and a channel of another terminal satisfies a second preset condition. For example, the second preset condition may be that a correlation between a channel of a terminal and a channel of another terminal is high, or a channel of a terminal causes interference to a channel of another terminal to some extent.

In some embodiments, the single-user precoding matrix of the terminal $m_i$ in the M terminals may be represented as $U_{m_i}$. An initial joint precoding matrix W of the P terminals may be calculated, $W = U (U^H U + \sigma^2 I)^{-1}$, and $U = [U_{p_1}, U_{p_2}, \ldots, U_{p_p}]$. $U^H$ represents a conjugate transpose matrix of U. $\sigma^2$ represents downlink noise floor power. I represents a unit matrix. $W = [W_{p_1}, W_{p_2}, \ldots, W_{p_p}]$. It may be understood that $W_{p_x}$ is obtained based on the channel estimation result of each of the P terminals.

In some embodiments, an equivalent channel of the terminal $p_x$ may be represented as $$H_{p_x}^{user}, \text{ and } H_{p_x}^{user} = H_{p_x}^H W_{p_x},$$

where $$H_{p_x}^H$$

represents a conjugate transpose matrix of $H_{p_x}$. $H_{p_x}$ represents a channel estimation result of the terminal $p_x$.

For example, the coefficient matrix $B_{p_x}$ of the terminal $p_x$ may satisfy the following formula:

$$B_{p_x} = (H_{p_x}^{user}(H_{p_x}^{user})^H + \sigma_{p_x}^2 I)^{-1} H_{p_x}^{user},$$

where $\sigma_{p_x}$ represents noise in a channel estimation corresponding to the terminal $p_x$. I represents a unit matrix.

The coefficient matrix of the terminal $p_x$ is obtained based on the equivalent channel $$H_{p_x}^{user}$$

of the terminal $p_x$, the equivalent channel $$H_{p_x}^{user}$$

of the terminal $p_x$ is determined based on $W_{p_x}$, and $W_{p_x}$ is obtained based on the channel estimation result of each of the P terminals. Therefore, the coefficient matrix $B_{p_x}$ of the terminal $p_x$ is obtained based on the channel estimation results corresponding to the P terminals.

In a first possible implementation, the N terminals include Q terminals in the P terminals, and the Q terminals include a terminal $q_y$. It may be understood as that the Q terminals are one or more overlapping terminals of the P terminals and the N terminals.

Obtaining the joint precoding matrix based on the statistical autocorrelation matrices respectively corresponding to the N terminals includes:

obtaining the joint precoding matrix based on corrected statistical autocorrelation matrices corresponding to the Q terminals and a statistical autocorrelation matrix of a terminal, in the N terminals, other than the Q terminals. A corrected statistical autocorrelation matrix $$R'_{q_y}$$

corresponding to the terminal $q_y$ is obtained by correcting a statistical autocorrelation matrix $\bar{R}_{q_y}$ corresponding to the terminal $q_y$ based on a coefficient matrix $B_{q_y}$ corresponding to the terminal $q_y$, where Q and y are positive integers, $1 \leq Q \leq P$, $1 \leq Q \leq N$, and $1 \leq y \leq Q$.

That is, the statistical autocorrelation matrices of the Q overlapping terminals of the N terminals and the P terminals may be corrected, and the statistical autocorrelation matrix of the terminal, in the N terminals, other than the Q terminals is not corrected.

In some embodiments, the statistical autocorrelation matrix that is of the terminal $q_y$ and that is corrected based on the coefficient matrix $B_{q_y}$ corresponding to the terminal $q_y$ may be represented as $$R'_{q_y}.$$

For example, $$R'_{q_y} = tr\{B_{q_y} B^H_{q_y}\} \overline{R}_{q_y}.$$

In the foregoing first possible implementation, the statistical autocorrelation matrices of the Q terminals are corrected, so that the statistical autocorrelation matrices may more approximately indicate a future possible channel direction, to improve accuracy and robustness of the joint precoding matrix, to reduce the inter-stream interference, improve the downlink throughput rate, and improve the downlink transmission performance.

In a second possible implementation, in the method of the first aspect, the obtaining a joint precoding matrix of M terminals based on statistical autocorrelation matrices respectively corresponding to N terminals includes:

obtaining the joint precoding matrix based on a corrected channel estimation result $$H'_{p_x}$$

corresponding to the terminal $p_x$ and the statistical autocorrelation matrices respectively corresponding to the N terminals.

The corrected channel estimation result $$H'_{p_x}$$

corresponding to the terminal $p_x$ is obtained by correcting the channel estimation result $H_{p_x}$ corresponding to the terminal $p_x$ based on the coefficient matrix $B_{p_x}$ corresponding to the terminal $p_x$.

The channel estimation result $H_{p_x}$ corresponding to the terminal $p_x$ may be a channel estimation result $H_{p_x}$ corresponding to the terminal $p_x$ at the latest moment.

That is, the obtaining a joint precoding matrix of M terminals based on statistical autocorrelation matrices respectively corresponding to N terminals may be understood as obtaining the joint precoding matrix based on the statistical autocorrelation matrices respectively corresponding to the N terminals and corrected channel estimation results corresponding to some or all of the P terminals. In some embodiments, the joint precoding matrix may be further obtained based on a channel estimation results corresponding to another terminal, in the M terminals, other than the some or all terminals.

In some embodiments, the corrected channel estimation result of the terminal $p_x$ may be represented as $$H'_{p_x}.$$

For example, $$H'_{p_x}$$

may satisfy the following formula:

$$H'_{p_x} = H_{p_x} (B_{p_x})^H.$$

In the foregoing second possible implementation, in the process of calculating the joint precoding matrix, in addition to using the statistical autocorrelation matrices of the N terminals to indicate statuses of historical channels of the N terminals, the corrected channel estimation results corresponding to the P terminals may further indicate statuses of channels of the P terminals at the latest moment, to help improve the robustness of the joint precoding matrix, reduce the inter-stream interference, and improve the downlink data transmission performance.

In a third possible implementation, the first implementation and the second implementation may be combined. For details, refer to the foregoing first implementation and second implementation. In the foregoing first possible implementation, the obtaining the joint precoding matrix based on corrected statistical autocorrelation matrices corresponding to the Q terminals and a statistical autocorrelation matrix of a terminal, in the N terminals, other than the Q terminals includes:

obtaining the joint precoding matrix based on the corrected channel estimation result $$H'_{p_x}$$

corresponding to the terminal $p_x$, the corrected statistical autocorrelation matrices corresponding to the Q terminals, and the statistical autocorrelation matrix of the terminal, in the N terminals, other than the Q terminals. The corrected channel estimation result $$H'_{p_x}$$

corresponding to the terminal $p_x$ is obtained by correcting the channel estimation result $H_{p_x}$ corresponding to the terminal $p_x$ based on the coefficient matrix $B_{p_x}$ corresponding to the terminal $p_x$.

In some embodiments, the statistical autocorrelation matrix that is of the terminal $q_y$ and that is corrected based on the coefficient matrix $B_{q_y}$ corresponding to the terminal $q_y$ may be represented as $$R'_{q_y}.$$

For example, $$R'_{q_y} = tr\{B_{q_y} B^H_{q_y}\} \overline{R}_{q_y}.$$

In some embodiments, the corrected channel estimation result of the terminal $p_x$ may be represented as $$H'_{p_x}.$$

For example, $$H'_{p_x}$$

may satisfy the following formula:

$$H'_{p_x} = H_{p_x}\left(B_{q_x}\right)^H.$$

In the foregoing third implementation, it is assumed that M, N, P, and Q are the same. In other words, the N terminals, the M terminals, the P terminals, and the Q terminals are all the same. The following describes calculation of the multi-user precoding matrix of each terminal $m_k$ with reference to two examples. It is assumed that the terminal $m_k$ is a terminal $q_s$, the two terminals may be interchanged with each other, $1 \le s \le Q$, and M, N, P, and Q may be interchanged with each other. A set of the M terminals is A, a set of the N terminals is B, a set of the P terminals is C, a set of the Q terminals is D, and A=B=C=D.

In a first example, a sum of statistical autocorrelation matrices of other terminals, in the M terminals, other than the terminal $m_k$ is first calculated, and $$\Phi_{\backslash m_k} = \sum\nolimits_{q_y \in D, y \ne s}\left(\left(1 - \alpha_{q_y}^2\right)R'_{q_y} + tr\left\{B_{q_y}B_{q_y}^H\right\}\sigma_{q_y}{}^2 I\right),$$

where $\alpha_{q_y}$ represents a channel correlation of the terminal $q_y$, $\alpha_{q_y}$ may be a number from 0 to 1, $\sigma_{q_y}$ represents noise in a channel estimation corresponding to the terminal $q_y$, and I represents a unit matrix. Then, the multi-user precoding matrix $W'_{m_k}$ of the terminal $m_k$ is calculated, and $$W'_{m_k} = \alpha_{m_k}^2\left(\left(\sum\nolimits_{p_x \in C}\alpha_{p_x}^2 H'_{p_x}\left(H'_{p_x}\right)^H\right) + \Phi_{\backslash m_k}\right)^{-1}H'_{m_k}.$$

It can be learned from the foregoing first example that the multi-user precoding matrix corresponding to the terminal $m_k$ is related to the statistical autocorrelation matrix of the another terminal other than the terminal $m_k$, and the terminal $m_k$ may be understood as the first terminal in the foregoing descriptions.

The formula of $$W'_{m_k}$$

in the foregoing first example may be understood as that the precoding matrix of the terminal $m_k$ not only avoids the channel space (which may be represented by $$H'_{p_x})$$

of the another terminal, in the M terminals, other than the terminal $m_k$ at the latest moment, but also avoids the future possible channel space (which may be represented by $\Phi_{\backslash m_k}$) of the another terminal, so that the weight avoidance dimension is increased, the downlink inter-stream interference can be reduced, and the downlink data transmission performance can be improved.

In a second example, the sum of the statistical autocorrelation matrices of the N terminals is first calculated, for example, $$\Phi_N = \sum\nolimits_{q_y \in D}\left(\left(1 - \alpha_{q_y}^2\right)R'_{q_y} + tr\left\{B_{q_y}B_{q_y}^H\right\}\sigma_{q_y}{}^2 I\right).$$

Then, the multi-user precoding matrix $$W'_{m_k}$$

of the terminal $m_k$ is calculated based on the sum of the statistical autocorrelation matrices of the N terminals and channel estimation results of the M terminals, and $$W'_{m_k} = \left(\sum\nolimits_{p_x \in C}\left(\alpha_{p_x}^2 H'_{p_x}\left(H'_{p_x}\right)^H\right) + \Phi_N\right)\left(\left(\alpha_{m_k}^2 H'_{m_k} + \left(1 - \alpha_{m_k}^2\right)R'_{m_k}W_{m_k}\right)\right).$$

For a meaning of the formula, refer to the foregoing descriptions.

It can be learned from the foregoing second example that the multi-user precoding matrix corresponding to the terminal $m_k$ is related to the statistical autocorrelation matrix of the another terminal other than the terminal $m_k$ and the statistical autocorrelation matrix of the terminal $m_k$, and the terminal $m_k$ may be understood as the first terminal in the foregoing descriptions.

The formula of $$W'_{m_k}$$

in the foregoing second example may be understood as that the precoding matrix of the terminal $m_k$ not only avoids the channel space (which may be represented by $$H'_{p_x})$$

of the another terminal, in the M terminals, other than the terminal $m_k$ at the latest moment, but also avoids the future possible channel space (which may be represented by $\Phi_N$) of the N terminals, and channel space (which may be represented by $$\left(\alpha_{m_k}^2 H'_{m_k} + \left(1 - \alpha_{m_k}^2\right)R'_{m_k}W_{m_k}\right))$$

of the terminal $m_k$ is supplemented. The weight avoidance dimension is increased, so that the downlink inter-stream interference can be reduced, and the downlink data transmission performance can be improved.

In the foregoing second example, the sum of the statistical autocorrelation matrices of the N terminals may be calculated, then inversion is performed on the sum of the statistical autocorrelation matrices of the N terminals, and then for each terminal $m_k$, the statistical autocorrelation matrix of the terminal $m_k$ is supplemented. In this way, the statistical autocorrelation matrices of N terminals are summed up only once, and inversion is performed only once, so that the quantity of times of summation and inversion of the statistical autocorrelation matrices can be reduced, the calculation complexity can be reduced, and the resources can be saved.

In the foregoing first example and second example, the joint precoding matrix may be represented as:

$$W' = \left[ W'_{m_1}, W'_{m_2}, \cdots, W'_{m_M} \right].$$

According to a second aspect, an embodiment of this application provides an apparatus, to implement the method according to any one of the possible implementations of the first aspect. The apparatus includes a corresponding unit or component configured to perform the foregoing method. The unit included in the apparatus may be implemented by using software and/or hardware.

According to a third aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the first aspect or the possible implementations of the first aspect.

In some embodiments, a communication apparatus may further include a communication unit. The communication unit is configured to communicate with another device or with another component in the communication apparatus. For example, the communication apparatus is a network device, and the communication unit is an interface between the communication apparatus and another network device or may be a transceiver between the communication apparatus and a terminal. For example, the communication apparatus is a chip in a network, and the communication unit is an input/output circuit or an interface of the chip.

The apparatus in the second aspect and the third aspect may be, for example, a network device, a server, or a centralized controller, or may be a chip, a chip system, a processor, or the like that may support the network device, the server, or the centralized controller in implementing the foregoing method. The network device may be a network device in an architecture in which a CU and a DU are not separated, may be a CU or a DU in an architecture in which the CU and the DU are separated, may be a CU-CP or a CU-UP in an architecture in which the CU-CP and the CU-UP are separated, or may be a DU or an RU in an architecture in which the DU and the RU are separated.

According to a fourth aspect, an embodiment of this application provides a computer-readable medium. The computer-readable medium stores a computer program or instructions. When the computer program or the instructions is/are executed, a computer is enabled to perform the method according to any one of the first aspect or the possible implementations of the first aspect.

According to a fifth aspect, an embodiment of this application provides a computer program product. The computer program product includes computer program code. When the computer program code is run on a computer, the computer is enabled to perform the method according to any one of the first aspect or the possible implementations of the first aspect.

According to a sixth aspect, an embodiment of this application provides a chip. The chip includes a processor and an interface circuit. The interface circuit is coupled to the processor. The processor is configured to run a computer program or instructions, to implement the method according to the first aspect. The interface circuit is configured to communicate with another module other than the chip.

BRIEF DESCRIPTION OF DRAWINGS

FIG. 4C is a schematic diagram of a set according to this application:

FIG. 5 shows a method for obtaining a joint precoding matrix according to this application:

FIG. 6 is a schematic diagram of another method for obtaining a joint precoding matrix according to this application:

FIG. 7 is a schematic diagram of a method for updating a joint precoding matrix according to this application:

DETAILED DESCRIPTION

Figure 1:
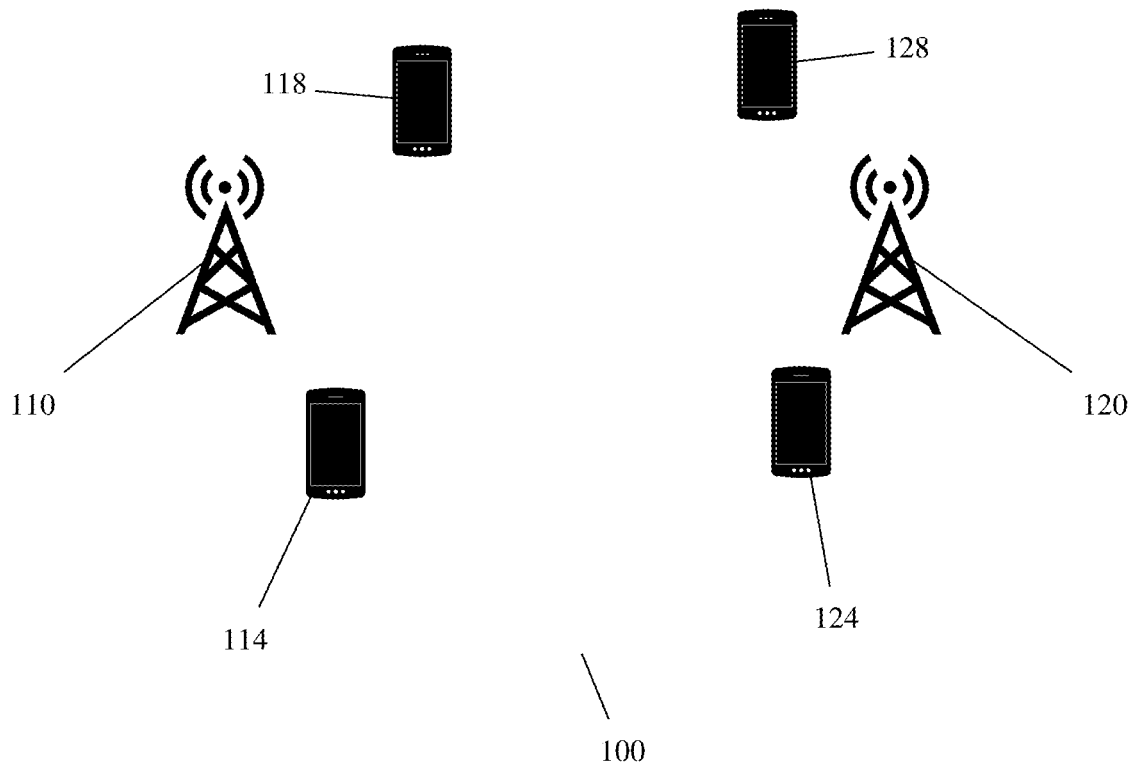
FIG. 1 is a schematic diagram of a communication system to which an embodiment of this application is applied.

A method and an apparatus provided in embodiments of this application may be applied to a communication system. FIG. 1 is a schematic diagram of a structure of a communication system. The communication system 100 includes one or more network devices (a network device 110 and a network device 120 are shown in the figure), and one or more terminals that communicate with the one or more network devices. A terminal 114 and a terminal 118 shown in FIG. 1 communicate with the network device 110, and a terminal 124 and a terminal 128 shown in FIG. 1 communicate with the network device 120. It may be understood that the network device and the terminal may also be referred to as communication devices.

Technologies described in embodiments of this application may be applied to various communication systems, for example, a $4^{th}$ generation (4G) communication system, a 4.5th generation (4.5G) communication system, a $5^{th}$ generation (5G) communication system, a system integrating a plurality of communication systems, or a future evolved communication system, for example, a 6G (6G) communication system. For example, the communication system may be a long term evolution (LTE) system, a new radio (NR) system, a wireless fidelity (Wi-Fi) system, a wireless self-organized system, a device-to-device direct communication system, a communication system related to the 3$^{rd}$ Generation Partnership Project (3GPP), or another communication system of this type.

Figure 2:
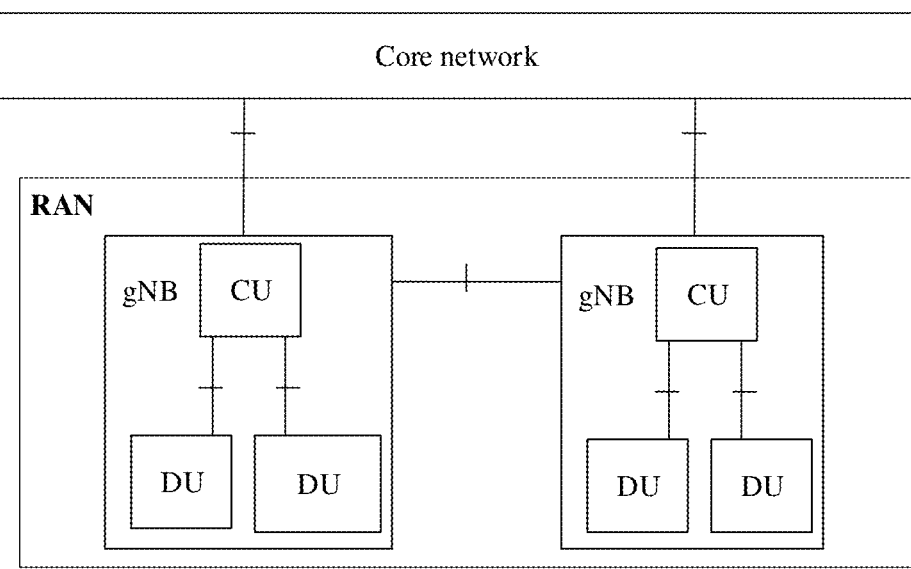
FIG. 2 is a schematic diagram of a possible architecture of a communication system according to this application.

FIG. 2 is a schematic diagram of a possible architecture of a communication system. As shown in FIG. 2, a network device in a radio access network (RAN) includes a base station (for example, a gNodeB or a gNB) in an architecture in which a central unit (CU) and a distributed unit (DU) are separated. The RAN may be connected to a core network (for example, a core network in LTE or a core network in 5G). It may be understood that the base station is divided into the CU and the DU in terms of logical functions. The CU and the DU can be physically separated or physically deployed together. A plurality of DUs may share one CU. One DU may alternatively be connected to a plurality of CUs (not shown in the figure). The CU and the DU may be connected through an interface, for example, an F1 interface.

The CU and the DU may be obtained through division based on protocol layers of a wireless network. For example, functions of a packet data convergence protocol (PDCP) layer and a radio resource control (RRC) layer are set on the CU, and functions of a radio link control (RLC) layer, a media access control (MAC) layer, a physical (physical) layer, and the like are set on the DU. It may be understood that the division into processing functions of the CU and the DU based on the protocol layers is merely an example, and there may be another division manner. For example, the CU or the DU may have functions of more protocol layers through division. For example, the CU or the DU may alternatively have some processing functions of the protocol layers through division. In a design, some functions of the RLC layer and functions of a protocol layer above the RLC layer are set on the CU, and remaining functions of the RLC layer and functions of a protocol layer below the RLC layer are set on the DU. In another design, functions of the CU or the DU may alternatively be divided based on a service type or another system requirement. For example, division is performed based on a latency. A function of which processing time needs to satisfy a latency requirement is set on the DU, and a function of which processing time does not need to satisfy the latency requirement is set on the CU. In a design, the CU may alternatively have one or more functions of a core network. One or more CUs may be disposed in a centralized manner or a separated manner. For example, the CUs may be disposed on a network side for ease of centralized management.

A network architecture shown in FIG. 2 may be applied to a 5G communication system, and the 5G communication system may share one or more components or resources with an LTE system.

The functions of the CU may be implemented by one entity, or a control plane (CP) and a user plane (UP) of the CU may be separated, that is, the control plane of the CU (CU-CP) and the user plane of the CU (CU-UP) may be implemented by different functional entities, and the CU-CP and the CU-UP may be coupled to the DU to jointly implement a function of the base station.

The functions of the DU may be implemented by one entity or a plurality of entities. The DU may have a plurality of radio frequency functions, or the radio frequency functions may be set remotely.

Functions that are of a wireless protocol layer and that are set on the DU may be further divided based on division of the protocol layers. For example, the radio frequency functions and a function of a lower layer of the physical layer are set on a radio frequency unit (radio unit, RU), and functions of the RLC layer, the MAC layer, and a higher layer of the physical layer are set on the DU.

For ease of differentiation and description, in this application, the lower layer and the higher layer are used to refer to the physical layer. The lower layer of the physical layer may implement some functions of the physical layer, and the higher layer of the physical layer may implement the other functions of the physical layer.

For example, in downlink, one or more of inverse fast Fourier transform (IFFT) and digital beamforming (digital beamforming) may be performed in the lower layer of the physical layer; and one or more of resource (resource element, RE) mapping (mapping), precoding (precoding), layer mapping (layer mapping), modulation (modulation), scrambling (scrambling), rate matching (rate matching), and coding (coding) may be performed in the higher layer of the physical layer. Alternatively, one or more of inverse fast Fourier transformation, digital beamforming, resource mapping, and precoding may be performed in the lower layer of the physical layer; and one or more of layer mapping (layer mapping), modulation (modulation), scrambling (scrambling), rate matching (rate matching), and coding (coding) may be performed in the higher layer of the physical layer. Alternatively, in downlink, one or more of inverse fast Fourier transformation, digital beamforming, resource mapping, precoding, layer mapping (layer mapping), and modulation (modulation) may be performed in the lower layer of the physical layer. One or more of scrambling (scrambling), rate matching (rate matching), and coding (coding) may be performed in the higher layer of the physical layer.

In uplink, one or more of fast Fourier transform (FFT) and digital beamforming may be performed in the lower layer of the physical layer; and resource demapping (demapping), channel estimation (channel estimation), equalization (equalization), inverse discrete Fourier transform (IDFT), demodulation (demodulation), descrambling (descrambling), rate de-matching (rate de-matching), and decoding (decoding) may be performed in the higher layer of the physical layer. Alternatively, one or more of fast Fourier transform, digital beamforming, resource demapping, channel estimation, and equalization may be performed in the lower layer of the physical layer; and one or more of inverse discrete Fourier transform, demodulation, descrambling, rate de-matching, and decoding may be performed in the higher layer of the physical layer.

It may be understood that the lower layer of the physical layer and the higher layer of the physical layer are an example of division of the physical layer, and there may be another division manner. "Lower" in the "lower layer" and "higher" in the "higher layer" do not constitute a limitation. The "lower layer" and the "higher" may be replaced with other names.

It may be understood that embodiments provided in this application may be applicable to an architecture in which the CU and the DU are not separated, or may be applicable to an architecture in which the CU and the DU are separated. When embodiments are applicable to the architecture in which the CU and the DU are separated, embodiments can be applicable to an architecture in which the CU-CP and the CU-UP are separated and/or the DU and the RU are separated.

In this application, the network device may be any device having a wireless transceiver function. The network device includes but is not limited to an evolved NodeB (NodeB, or eNB, or e-NodeB, evolved NodeB) in LTE, a gNodeB (gNodeB or gNB) or a transmission reception point (transmission receiving point/transmission reception point, TRP)

in NR, a subsequently evolved base station in 3GPP, an access node in a Wi-Fi system, a wireless relay node, a wireless backhaul node, a core network device, and the like. The base station may be a macro base station, a micro base station, a picocell base station, a small cell, a relay station, a balloon station, or the like. A plurality of base stations may support networks using a same technology described above, or may support networks using different technologies described above. The base station may include one or more co-site or non-co-site TRPs. The network device may alternatively be a server (for example, a cloud server), a radio controller in a cloud radio access network (CRAN) scenario, a CU, and/or a DU. The network device may alternatively be a server, a wearable device, a machine-type communication device, a vehicle-mounted device, a smart screen, or the like. The following uses an example in which the network device is a base station for description. The plurality of network devices may be base stations of a same type, or may be base stations of different types. The base station may communicate with a terminal device, or may communicate with the terminal device through a relay station. The terminal device may communicate with a plurality of base stations using different technologies. For example, the terminal device may communicate with a base station supporting an LTE network, may communicate with a base station supporting a 5G network, and may support dual connections to the base station supporting the LTE network and the base station supporting the 5G network.

It may be understood that all or some functions of the network device in this application may also be implemented by using a software function run on hardware, or may be implemented by using a virtualized function instantiated on a platform (for example, a cloud platform).

The terminal is a device having the wireless transceiver function. The terminal may be deployed on land, including an indoor or outdoor device, a hand-held device, a wearable device, or a vehicle-mounted device: may be deployed on water (for example, on a ship): or may be deployed in air (for example, on an airplane, a balloon, or a satellite). The terminal may be a mobile phone (mobile phone), a tablet computer (Pad), a computer having the wireless transceiver function, a virtual reality (VR) terminal device, an AR terminal device, a mixed reality (MR) terminal device, a terminal in industrial control (industrial control), a vehicle-mounted terminal device, a terminal in self-driving (self-driving), a terminal in assisted driving, a terminal in remote medical (remote medical), a terminal in a smart grid (smart grid), a terminal in transportation safety (transportation safety), a terminal in a smart city (smart city), a terminal in a smart home (smart home), or the like. An application scenario is not limited in embodiments of this application. Sometimes, the terminal may also be referred to as a terminal device, user equipment (UE), an access terminal device, a vehicle-mounted terminal, an industrial control terminal, a UE unit, a UE station, a mobile station, a mobile console, a remote station, a remote terminal device, a mobile device, a UE terminal device, a wireless communication device, a machine terminal, a UE agent, a UE apparatus, or the like. The terminal may be fixed or mobile.

As an example rather than a limitation, the terminal in this application may be a wearable device. The wearable device may also be referred to as a wearable intelligent device, and is a general term for wearable devices that are developed by applying wearable technologies to intelligently design daily wear, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that may implement complete or partial functions without depending on smartphones, for example, smart watches or smart glasses, and devices that focus on only one type of application function and need to work with other devices such as smartphones, for example, various smart bands or smart jewelry for monitoring physical signs.

In this application, the terminal may be a terminal in an internet of things (IoT) system. IoT is an important component in development of future information technologies. A main technical feature of the IoT is to connect an object to a network by using a communication technology, to implement an intelligent network of human-machine interconnection and thing-thing interconnection. The terminal in this application may be a terminal in machine-type communication (MTC). The terminal in this application may be a vehicle-mounted module, a vehicle-mounted module set, a vehicle-mounted component, a vehicle-mounted chip, or a vehicle-mounted unit that is built in a vehicle as one or more components or units. The vehicle may implement the method in this application by using the vehicle-mounted module, the vehicle-mounted module set, the vehicle-mounted component, the vehicle-mounted chip, or the vehicle-mounted unit that is built in the vehicle. Therefore, embodiments of this application may be applied to the internet of vehicles, for example, vehicle to everything (V2X), long term evolution-vehicle (LTE-V), or vehicle to vehicle (V2V).

In the foregoing communication system, to adapt to an explosive growth of mobile data traffic, a multiple-input multiple-output (MIMO) technology emerges. Different users may perform simultaneous transmission by using a precoding technology and a large-scale antenna array, to improve throughput of the communication system.

In the precoding technology, the network device needs to calculate a precoding matrix based on downlink channel information, process data by using the precoding matrix, and send the data to the terminal.

For obtaining the downlink channel information, in a time division duplex (TDD) system, the network device may measure a channel sounding reference signal (SRS) to obtain uplink channel information, and then the network device obtain the downlink channel information based on reciprocity between uplink and downlink channels. In a frequency division duplex (FDD) system, the terminal may measure a downlink reference signal, for example, a channel state information reference signal (CSI-RS), and then the terminal feeds back channel state information (CSI) to the network device. The network device obtains the downlink channel information based on the CSI.

However, in both a TDD system and an FDD system, because a measurement moment of a reference signal is different from a moment at which data is sent by using the precoding matrix, a channel may change (this phenomenon is referred to as channel aging in this application) in a time range between the two moments due to movement of the terminal or an environment change. Consequently, the precoding matrix cannot match a real channel at the moment at which the data is sent, and downlink transmission performance of the terminal is greatly affected. In addition, in the multi-user MIMO (MU-MIMO), because the precoding matrix is inaccurate due to channel aging, transmission of a stream of a terminal can interfere with transmission of another stream, or transmission of a stream of a terminal may interfere with transmission of a stream of another terminal. Consequently, inter-stream interference is severe. The stream may be referred to as a layer, or may have another name. This is not limited in this application.

Figure 3A:
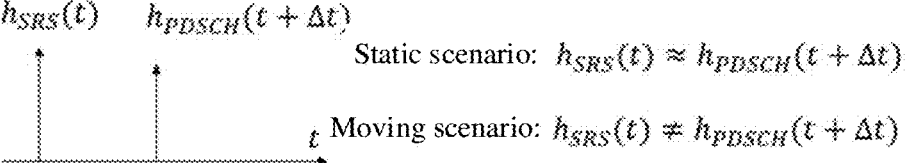
FIG. 3A is a schematic diagram of channel aging according to this application.

FIG. 3A is a schematic diagram of channel aging according to an embodiment of this application. As shown in FIG. 3A, a channel estimation obtained by a network device by measuring an SRS at a moment t is $h_{SRS}(t)$, and a channel estimation that is obtained by the network device at a moment $t+\Delta t$ and that is of a channel that sends physical downlink shared channel (physical downlink shared channel, PDSCH) data to a terminal is $h_{PDSCH}(t+\Delta t)$. If the terminal has not moved or an environment has not changed from the moment t to the moment $t+\Delta t$, $h_{SRS}(t)\approx h_{PDSCH}(t+\Delta t)$: or if the terminal has moved or the environment has changed, $h_{SRS}(t) \neq h_{PDSCH}(t+\Delta t)$.

Based on this, an embodiment of this application provides a solution for calculating a precoding matrix. The solution may be applied to a TDD system or an FDD system. In this solution, statistics about statuses of historical channels of a plurality of terminals may be collected, and the historical channels of the plurality of terminals may reflect future channels of the plurality of terminals to some extent. The historical channels of the plurality of terminals are considered during calculation of the precoding matrix, so that a factor of channel aging may be considered in advance, to reduce downlink inter-stream interference, and improve downlink transmission performance of the terminals.

Figure 3B:
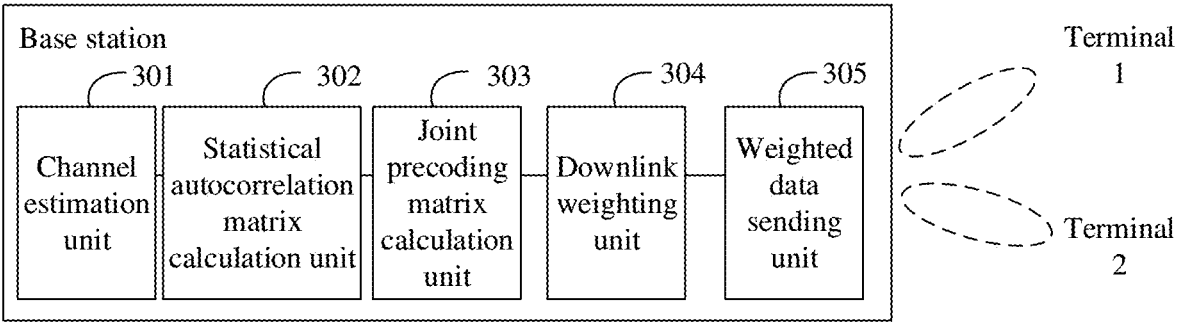
FIG. 3B is a schematic diagram of a base station according to an embodiment of this application.

FIG. 3B is a schematic diagram of a base station according to an embodiment of this application. The base station in FIG. 3B may implement the foregoing solution for calculating a precoding matrix. As shown in FIG. 3B, the base station may include a channel estimation unit, a statistical autocorrelation matrix calculation unit, a joint precoding matrix calculation unit, a downlink weighting unit, and a weighted data sending unit.

Specifically, the channel estimation unit is first configured to calculate a channel estimation result, the statistical autocorrelation matrix calculation unit is configured to calculate a statistical autocorrelation matrix based on the channel estimation result obtained through calculation, the joint precoding matrix calculation unit is configured to calculate a joint precoding matrix based on the statistical autocorrelation matrix, the downlink weighting unit is configured to weight downlink data by using the joint precoding matrix, and the weighted data sending unit is configured to send weighted data to a terminal device.

If the base station uses an architecture in which a CU and a DU are not separated, functions of the foregoing five units may be integrated into the base station.

If the base station uses an architecture in which the CU and the DU are separated, functions of the plurality of units may be implemented by different network devices in the base station. For example, if the base station uses the architecture in which the CU and the DU are separated, the functions of the five units may be implemented by the CU and/or the DU.

In some embodiments, if the base station uses an architecture in which a DU and an RU are separated, because a lower layer of a physical layer is deployed on the RU, and a higher layer of the physical layer is deployed on the DU, the functions of the foregoing five units may be implemented by the DU or by the RU: or functions of some of the foregoing units may be implemented by the DU, and functions of some of the units are implemented by the RU. For example, the DU may include 301, and the RU includes 302,

303, 304, and 305. Alternatively, the DU includes 301 and 302, and the RU includes 303, 304, and 305. Alternatively, the DU includes 301, 302, and 303, and the RU includes 304 and 305. Alternatively, the DU includes 301, 302, 303, and 304, and the RU includes 305.

Figure 4A:
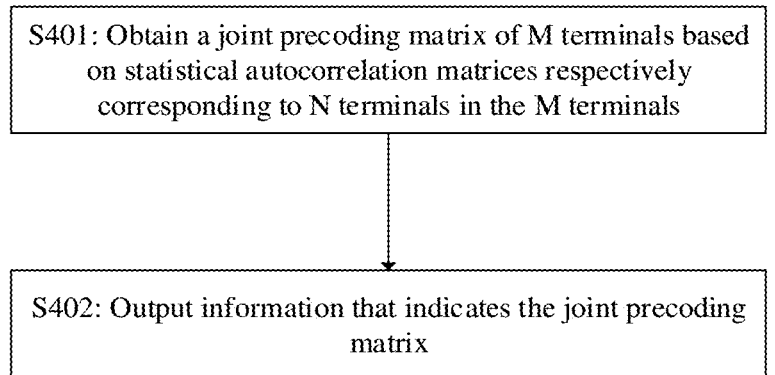
FIG. 4A is a schematic diagram of a method for obtaining a joint precoding matrix according to this application.

FIG. 4A is a schematic diagram of a method for obtaining a joint precoding matrix according to an embodiment of this application. The method in FIG. 4A may be applied to the unit 303 (namely, the joint precoding matrix calculation unit) in FIG. 3B. FIG. 4A and the base station in FIG. 3B may be mutually referenced and cited.

The method in FIG. 4A may be performed by a network device, or a chip, a chip system, a processor that supports the network device in implementing the method, a logical module or software that can implement all or some functions of the network device, or the like. The network device may be a network device in an architecture in which a CU and a DU are not separated, may be a CU or a DU in an architecture in which the CU and the DU are separated, may be a CU-CP or a CU-UP in an architecture in which the CU-CP and the CU-UP are separated, may be a DU or an RU in an architecture in which the DU and the RU are separated, may be a centralized controller, or the like. Steps in FIG. 4A may be performed by a same entity or different entities. As shown in FIG. 4A, the method includes the following steps.

S401: Obtain a joint precoding matrix of M terminals based on statistical autocorrelation matrices respectively corresponding to N terminals in the M terminals. M and N are positive integers, and $M\geq 2$, $1\leq N\leq M$. It may be understood that the N terminals are a subset of the M terminals. In some embodiments, the N terminals may be the M terminals.

In the following descriptions, for ease of description, a terminal in the M terminals may be referred to as $m_i$, where i is a positive integer, and $1\leq i\leq M$. That is, $m_i\in\{m_1, m_2, \ldots, m_M\}$. A set $\{m_1, m_2, \ldots, m_M\}$ may be referred to as a set A, and $m_i\in A$. A terminal in the N terminals may be referred to as $n_j$, where j is a positive integer, and $1\leq j\leq N$. That is, $n_j \in \{n_1, n_2, \ldots, n_N\}$. A set $\{n_1, n_2, \ldots, n_N\}$ may be referred to as a set B, and $n_j\in B$. It may be understood that the set B is a subset of the set A. In other words, $B\subseteq A$.

The terminal $m_i$ corresponds to a channel estimation result $H_{m_i}$.

For example, the M terminals include a terminal $m_1$, a terminal $m_2$, a terminal $m_3$, and a terminal $m_4$. For example, the N terminals include a terminal $n_1$, a terminal $n_2$, and a terminal $n_3$, where the terminal $n_1$ is the terminal $m_1$, the terminal $n_2$ is the terminal $m_2$, and the terminal $n_3$ is the terminal $m_3$.

The joint precoding matrix of the M terminals may be understood as a matrix used to process downlink data of the M terminals in an MU-MIMO scenario. The joint precoding matrix may include precoding matrices respectively corresponding to the M terminals, where a precoding matrix corresponding to the terminal $m_i$ is used to precode data of the terminal $m_i$. The precoding matrix corresponding to the terminal $m_i$ may be referred to as a multi-user precoding matrix corresponding to the terminal $m_i$.

For example, the joint precoding matrix includes a precoding matrix corresponding to the terminal $m_1$, a precoding matrix corresponding to the terminal $m_2$, a precoding matrix corresponding to the terminal $m_3$, and a precoding matrix corresponding to the terminal $m_4$. The precoding matrix corresponding to the terminal $m_1$ is used to precode data corresponding to the terminal $m_1$, the precoding matrix corresponding to the terminal $m_2$ is used to precode data corresponding to the terminal $m_2$, the precoding matrix corresponding to the terminal $m_3$ is used to precode data corresponding to the terminal $m_3$, and the precoding matrix corresponding to the terminal $m_4$ is used to precode data corresponding to the terminal $m_4$.

In some embodiments, the N terminals are terminals, in the M terminals, of which channel correlations satisfy a first preset condition. For example, if a channel correlation of each of the terminal $m_1$, the terminal $m_2$, and the terminal $m_3$ satisfies the first preset condition, and a channel correlation of the terminal $m_4$ does not satisfy the first preset condition, the N terminals include the terminal $m_1$, the terminal $m_2$, and the terminal $m_3$ (that is, the terminal $n_1$, the terminal $n_2$, and the terminal $n_3$).

A channel correlation of a terminal may be a channel correlation in frequency domain and/or time domain. A channel correlation of the terminal in frequency domain may reflect a change of a channel of the terminal in frequency domain, and a channel correlation of the terminal in time domain may reflect a change of a channel of the terminal in time domain.

In some embodiments, the channel correlation may be represented by a numerical value. For example, the channel correlation may be a number greater than or equal to 0 and less than or equal to 1. The first preset condition may be that the channel correlation is greater than, is greater than or equal to, is less than, or is less than or equal to a numerical value, or the channel correlation falls within a numerical value range. A manner for setting the first preset condition and a manner for calculating the channel correlation are not limited in this embodiment of this application.

In some embodiments, a higher channel correlation may indicate a smaller channel change. On the contrary, a lower channel correlation may indicate a larger channel change. The first preset condition may be set, so that the N terminals are terminals with small channel correlations, that is, terminals with large channel changes, and another terminal, in the M terminals, other than the N terminals is a terminal with a small channel change. A statistical autocorrelation matrix operation is performed on a terminal with a large channel change, and the statistical autocorrelation matrix operation is not performed on a terminal with a small channel change, so that processing resources may be saved, and complexity is reduced.

A statistical autocorrelation matrix $\bar{R}_{n_j}$ corresponding to the terminal $n_j$ is obtained by filtering an autocorrelation matrix $R_{n_j}$ corresponding to the terminal $n_j$ in frequency domain and/or time domain, where j is a positive integer, and $1 \leq j \leq N$. The following provides descriptions with reference to examples.

In this application, a statistical autocorrelation matrix is a matrix obtained by processing an autocorrelation matrix. For ease of description, the matrix obtained by processing the autocorrelation matrix is referred to as the statistical autocorrelation matrix. In this application, an example in which the processing is filtering in frequency domain and/or time domain is used for description, and there may be another statistics collection manner. The statistical autocorrelation matrix in this application may be referred to as a filtered autocorrelation matrix, an accumulated autocorrelation matrix, an average autocorrelation matrix, a historical autocorrelation matrix, a processed autocorrelation matrix, or the like. Alternatively, the statistical autocorrelation matrix may have another name. This is not limited in this application. In this application, a "matrix" and an "array" may be interchangeable.

The statistical autocorrelation matrix $\bar{R}_{n_j}$ of the terminal $n_j$ is obtained by filtering the autocorrelation matrix $R_{n_j}$ corresponding to the terminal $n_j$ in frequency domain and/or time domain.

For example, a statistical autocorrelation matrix $\bar{R}_{n_1}$ corresponding to the terminal $n_1$ is obtained by filtering an autocorrelation matrix $R_{n_1}$ corresponding to the terminal $n_1$ in frequency domain and/or time domain, a statistical autocorrelation matrix $\bar{R}_{n_2}$ corresponding to the terminal $n_2$ is obtained by filtering an autocorrelation matrix $R_{n_2}$ corresponding to the terminal $n_2$ in frequency domain and/or time domain, and a statistical autocorrelation matrix $\bar{R}_{n_3}$ corresponding to the terminal $n_3$ is obtained by filtering an autocorrelation matrix $R_{n_3}$ corresponding to the terminal $n_3$ in frequency domain and/or time domain.

The filtering in frequency domain and/or time domain may include three cases: (1) filtering in frequency domain, (2) filtering in time domain, and (3) filtering in frequency domain and time domain. A sequence between the filtering in frequency domain and the filtering in time domain is not limited in this application. The filtering in frequency domain may be first performed, and then the filtering in time domain is performed: the filtering in time domain may be first performed, and then the filtering in frequency domain is performed: or the filtering in frequency domain and the filtering in time domain may be simultaneously performed.

Filtering an autocorrelation matrix corresponding to a terminal in frequency domain may be understood as performing an operation on autocorrelation matrices of the terminal on different frequency domain resources. For example, the operation may be averaging, that is, the autocorrelation matrices on the different frequency domain resources are summed up, and then a summation result is divided by a quantity of the frequency domain resources.

Filtering an autocorrelation matrix corresponding to a terminal in time domain may be understood as performing an operation on autocorrelation matrices of the terminal on different time domain resources. For example, the filtering in time domain may be alpha (alpha) filtering.

For example, the statistical autocorrelation matrix $\bar{R}_{n_1}$ corresponding to the terminal $n_1$ may be implemented in the following manner: Autocorrelation matrices on different frequency domain resources corresponding to a same time domain resource of the terminal $n_1$ are filtered in frequency domain to obtain a frequency-domain filtering result, and then frequency-domain filtering results corresponding to the different time domain resources are filtered in time domain to obtain the statistical autocorrelation matrix $\bar{R}_{n_1}$ corresponding to the terminal $n_1$. Similarly, the statistical autocorrelation matrix $\bar{R}_{n_2}$ corresponding to the terminal $n_2$ and the statistical autocorrelation matrix $\bar{R}n$ corresponding to the terminal $n_3$ may be obtained.

The autocorrelation matrix $R_{n_j}$ corresponding to the terminal $n_j$ is obtained based on a channel estimation result $H_{n_j}$ corresponding to the terminal $n_j$.

In other words, the autocorrelation matrices respectively corresponding to the N terminals are respectively obtained based on channel estimation results corresponding to the N terminals.

For example, the autocorrelation matrix $R_{n_1}$ corresponding to the terminal $n_1$ is obtained based on a channel estimation result $H_{n_1}$ corresponding to the terminal $n_1$, the autocorrelation matrix $R_{n_2}$ corresponding to the terminal $n_2$ is obtained based on a channel estimation result $H_{n_2}$ corresponding to the terminal $n_2$, and the autocorrelation matrix $R_{n_3}$ corresponding to the terminal ng is obtained based on a channel estimation result $H_{n_3}$ corresponding to the terminal $n_3$.

That the autocorrelation matrix $R_{n_j}$ corresponding to the terminal $n_j$ is obtained based on the channel estimation result $H_{n_j}$ corresponding to the terminal $n_j$ may be understood as that the autocorrelation matrix $R_{n_j}$ corresponding to the terminal $n_j$ is related to the channel estimation result $H_{n_j}$ corresponding to the terminal $n_j$.

For example, $$R_{n_j} = H_{n_j} H_{n_j}^H,$$

where $$H_{n_j}^H$$

represents a conjugate transpose matrix of $H_{n_j}$. In this application, the autocorrelation matrix may be referred to as an autocorrelation array.

The channel estimation result $H_{n_j}$ corresponding to the terminal $n_j$ may indicate quality of a channel between the terminal $n_j$ and the network device.

In this application, the channel estimation result may be a matrix. The channel estimation result may be referred to as a channel estimation, a channel characteristic matrix, a channel characteristic, a channel matrix, or the like. This is not limited in this application. In this application, the matrix may have X rows and Y columns, where both X and Y are integers greater than or equal to 1. It may be understood that when X is equal to 1 and Y is greater than 1, or when X is greater than 1 and Y is equal to 1, the matrix is a vector. In other words, the matrix in this application includes a vector.

In this application, the channel estimation result may be obtained by measuring an uplink reference signal. For example, the terminal $n_j$ sends an uplink reference signal to the network device, and the network device measures the uplink reference signal to obtain the channel estimation result $H_{n_j}$. Alternatively, the channel estimation result $H_{n_j}$ may be obtained based on information that is fed back by the terminal $n_j$ and that indicates an initial precoding matrix. For example, the network device sends a downlink reference signal to the terminal $n_j$, the terminal $n_j$ measures the downlink reference signal to obtain the initial precoding matrix, and then the terminal sends indication information to the network device to indicate the initial precoding matrix. The network device obtains the channel estimation result $H_{n_j}$ based on the information that indicates the initial precoding matrix.

Because the autocorrelation matrix $R_{n_j}$ corresponding to the terminal $n_j$ is obtained based on the channel estimation result $H_{n_j}$ corresponding to the terminal $n_j$, and the statistical autocorrelation matrix $\overline{R}_{n_j}$ corresponding to the terminal $n_j$ is obtained by filtering the autocorrelation matrix $R_{n_j}$ corresponding to the terminal $n_j$ in frequency domain and/or time domain, it may be understood that the statistical autocorrelation matrix $\overline{R}_{n_j}$ corresponding to the terminal $n_j$ includes historical channel estimation results of the terminal $n_j$ on a plurality of resources (frequency domain resources and/or time domain resources). The historical channel estimation results may reflect a status of a future channel to some extent, and may be used to estimate a general direction of the future channel. Therefore, in a process of calculating the joint precoding matrix, historical channel estimation results of the N terminals are considered, that is, statuses of future channels of the N terminals are considered in advance, to help mitigate impact of channel aging, reduce inter-stream interference, improve a downlink throughput rate, and improve downlink transmission performance.

In some embodiments, a statistical autocorrelation matrix respectively corresponding to one or more of the N terminals includes T main diagonal blocks and a zero element other than the T main diagonal blocks, and T is an integer greater than or equal to 2.

The following uses the terminal $n_j$ as an example for description, and two cases may be included.

Case (1): A matrix obtained by filtering the autocorrelation matrix $R_{n_j}$ corresponding to the terminal $n_j$ in frequency domain and/or time domain includes the T main diagonal blocks and one or more zero elements other than the T main diagonal blocks. In this case, the matrix is the statistical autocorrelation matrix $\overline{R}_{n_j}$ corresponding to the terminal $n_j$.

Case (2): A matrix obtained by filtering the autocorrelation matrix $R_{n_j}$ corresponding to the terminal $n_j$ in frequency domain and/or time domain does not include the T main diagonal blocks or a zero element other than the T main diagonal blocks. One or more elements, in the matrix, other than the T main diagonal blocks may be set to zero, that is, become zero elements. A matrix obtained by setting the one or more elements, in the matrix, other than the T main diagonal blocks to zero is the statistical autocorrelation matrix $\overline{R}_{n_j}$ corresponding to the terminal $n_j$.

In Case (2), the one or more elements other than the T main diagonal blocks are set to zero, so that complexity of obtaining the joint precoding matrix subsequently by performing an operation based on the statistical autocorrelation $\overline{R}_{n_j}$ can be reduced, resources of a processor can be saved, and complexity of implementation can be reduced.

In some embodiments, in Case (1) or Case (2), the statistical autocorrelation matrix $\overline{R}_{n_j}$ may include the T main diagonal blocks and the zero element other than the T main diagonal blocks. In other words, any element other than the T main diagonal blocks is a zero element.

In this application, the statistical autocorrelation matrix $\overline{R}_{n_j}$ may be an array having $N_t$ rows and $N_t$ columns. The statistical autocorrelation matrix $\overline{R}_{n_j}$ may be divided into T rows and T columns, so that $T^2$ blocks may be obtained, where each block is a matrix having $N_t/T$ rows and $N_t/T$ columns. The main diagonal block in this application may be a block located on a main diagonal line of the statistical autocorrelation matrix $\overline{R}_{n_j}$. The main diagonal line of the statistical autocorrelation matrix $\overline{R}_{n_j}$ may be a diagonal line on which elements in a direction of an oblique line from an upper left corner to a lower right corner are located.

Figure 4B:
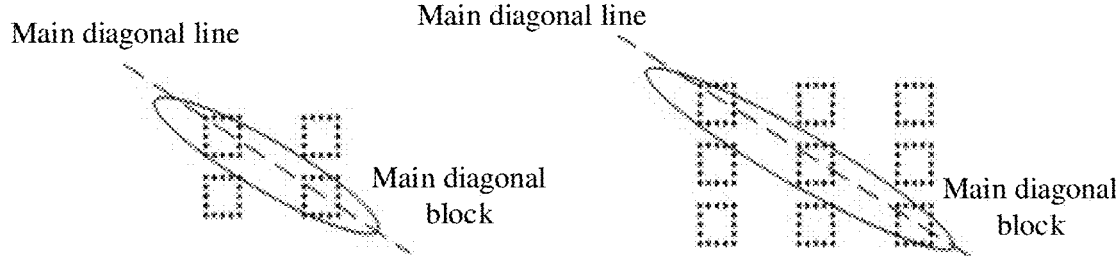
FIG. 4B is a schematic diagram of a main diagonal line and main diagonal blocks according to this application.

FIG. 4B is a schematic diagram of a main diagonal line and main diagonal blocks according to this application. As shown in FIG. 4B, the figure on the left shows a main diagonal line and main diagonal blocks in a case in which T is 2. The figure on the right shows a main diagonal line and main diagonal blocks in a case in which T is 3. In some embodiments, in addition to the main diagonal blocks, elements in other squares are all 0.

In this application, a value of T may be determined based on a quantity of polarization directions of an antenna of the network device. As an example, T may be the quantity of polarization directions. The quantity of polarization directions may be 2, 3, 4, or a larger integer.

For example, when the antenna of the network device is a dual-polarized antenna, in other words, the antenna has two polarization directions, T is 2.

For another example, when the antenna of the network device has three polarization directions, T is 3.

For another example, when the antenna of the network device has four polarization directions, T is 4.

The main diagonal block may indicate an autocorrelation value in a same polarization direction, and a non-main diagonal block indicates a cross-correlation value between different polarization directions. One or more elements other than the main diagonal block are set to zero, and a correlation between polarizations is ignored, so that calculation may be simplified, complexity is reduced, and resources are saved.

In some embodiments, because the joint precoding matrix of the M terminals is obtained based on the statistical autocorrelation matrices respectively corresponding to the N terminals, the joint precoding matrix includes the precoding matrices respectively corresponding to the M terminals. It is assumed that the M terminals include a first terminal. There may be a plurality of possibilities for a relationship between a precoding matrix corresponding to the first terminal and the statistical autocorrelation matrices respectively corresponding to the N terminals. The following provides descriptions based on different cases.

Case (1): The M terminals include the N terminals and the first terminal. In other words, the N terminals do not include the first terminal. In this case, the precoding matrix corresponding to the first terminal is related to all the statistical autocorrelation matrices of the N terminals.

That the precoding matrix corresponding to the first terminal is related to all the statistical autocorrelation matrices of the N terminals may be understood as that the precoding matrix corresponding to the first terminal is obtained based on the statistical autocorrelation matrices respectively corresponding to the N terminals.

Case (2): The N terminals include the first terminal, and the precoding matrix corresponding to the first terminal is related to statistical autocorrelation matrices of N−1 terminals, in the N terminals, other than the first terminal.

That the precoding matrix corresponding to the first terminal is related to statistical autocorrelation matrices of N−1 terminals, in the N terminals, other than the first terminal may be understood as that the precoding matrix corresponding to the first terminal is obtained based on the statistical autocorrelation matrices respectively corresponding to the N−1 terminals.

In some embodiments, in Case (2), the precoding matrix corresponding to the first terminal may not be related to a statistical autocorrelation matrix of the first terminal. Alternatively, the precoding matrix corresponding to the first terminal may be related to the statistical autocorrelation matrix of the first terminal. In other words, the precoding matrix corresponding to the first terminal is related to the statistical autocorrelation matrices of the N terminals.

In some embodiments, in S401, the obtaining a joint precoding matrix of M terminals based on statistical autocorrelation matrices respectively corresponding to N terminals includes: obtaining the joint precoding matrix based on the statistical autocorrelation matrices respectively corresponding to the N terminals, and channel estimation results respectively corresponding to the M terminals or a channel estimation result respectively corresponding to another terminal, in the M terminals, other than the N terminals. That is, in the process of calculating the joint precoding matrix, in addition to using the statistical autocorrelation matrices of the N terminals to indicate statuses of historical channels of the N terminals, the channel estimation results respectively corresponding to the M terminals or the another terminal may further indicate statuses of channels of the M terminals or the another terminal at the latest moment, to help improve robustness of the joint precoding matrix, reduce the inter-stream interference, and improve the downlink data transmission performance.

In some embodiments, to improve accuracy of the joint precoding matrix, a coefficient matrix may be used to correct the statistical autocorrelation matrix, and/or correct the channel estimation result. The following provides descriptions.

The M terminals include P terminals. In the following descriptions, for ease of description, a terminal in the P terminals may be referred to as $p_x$, where P and x are positive integers, $1 \leq P \leq M$, and $1 \leq x \leq P$. That is, $p_x \in \{p_1, p_2, \ldots, p_P\}$. A set $\{p_1, p_2, \ldots, p_P\}$ may be referred to as a set C, and $p_x \in C$. The set C is a subset of a set of the M terminals (that is, a set A). In other words, $C \subseteq A$.

The terminal $p_x$ corresponds to a coefficient matrix $B_{p_x}$. $B_{p_x}$ is related to a channel estimation result corresponding to each of the P terminals. In other words, the coefficient matrix $B_{p_x}$ corresponding to the terminal $p_x$ is calculated based on the channel estimation result of each of the P terminals.

For example, the P terminals include a terminal $p_1$, a terminal $p_2$, and a terminal $p_3$. The terminal $p_1$ is the terminal $m_1$, the terminal $p_2$ is the terminal $m_2$, and the terminal $p_3$ is the terminal $m_4$. The terminal $p_1$ corresponds to a coefficient matrix $B_{p_1}$, the terminal $p_2$ corresponds to a coefficient matrix $B_{p_2}$, and the terminal $p_3$ corresponds to a coefficient matrix $B_{p_3}$.

$B_{p_1}$ is related to $H_{p_1}$, $H_{p_2}$, and $H_{p_3}$. $B_{p_2}$ is related to $H_{p_1}$, $H_{p_2}$, and $H_{p_3}$. $B_{p_3}$ is related to $H_{p_1}$, $H_{p_2}$, and $H_{p_2}$. Alternatively, it may be understood as that the coefficient matrices $B_{p_1}$, $B_{p_2}$, and $B_{p_3}$ are separately calculated based on $H_{p_1}$, $H_{p_2}$, and $H_{p_3}$.

In some embodiments, the P terminals may be terminals, in the M terminals, of which a relationship between channels of the terminals and a channel of another terminal satisfies a second preset condition. For example, the second preset condition may be that a correlation between a channel of a terminal and a channel of another terminal is high, or a channel of a terminal causes interference to a channel of another terminal to some extent.

It may be understood that, according to the foregoing descriptions, the N terminals are terminals of which channel correlations satisfy the first preset condition, and the P terminals are terminals of which a relationship between the channels of the terminals and another terminal satisfies the second preset condition (the second preset condition may be the same as or different from the first preset condition, and this is not limited in this application). There may be a plurality of possibilities for a relationship between the N terminals and the P terminals. For example, Case (1): The P terminals and N terminals do not overlap at all. For example, there is no same terminal between the P terminals and the N terminals. Case (2): The P terminals and the N terminals partially overlap. For example, some of the P terminals are the same as some of the N terminals. Case (3): The P terminals include or are included in the N terminals. The N terminals include the P terminals, or the P terminals include the N terminals. In Case (3), if the N terminals include the P terminals, and the P terminals include the N terminals, the P terminals are the same as the N terminals.

It is assumed that the N terminals include the Q terminals in the P terminals. It may be understood as that the Q terminals are one or more overlapping terminals of the P terminals and the N terminals.

In the following descriptions, for ease of description, a terminal in the Q terminals may be referred to as $q_y$, where Q and y are positive integers, $1 \leq Q \leq P$, $1 \leq Q \leq N$, and $1 \leq y \leq Q$. That is, $q_y \in \{q_1, q_2, \ldots, q_Q\}$. A set $\{q_1, q_2, \ldots, q_Q\}$ may be referred to as a set D, and $q_y \in D$.

FIG. 4C is a schematic diagram of a set according to an embodiment of this application. As shown in FIG. 4C, $B \subseteq A$, and $C \subseteq A$. The set D is an intersection of a set of the P terminals (that is, the set C) and a set of the N terminals (that is, the set B). In other words, $D = C \cap B$.

For example, according to the foregoing descriptions, the N terminals include the terminal $n_1$ (that is, the terminal $m_1$), the terminal $n_2$ (that is, the terminal $m_2$), and the terminal $n_3$ (that is, the terminal $m_3$). The P terminals include the terminal $p_1$ (that is, the terminal $m_1$), the terminal $p_2$ (that is, the terminal $m_2$), and the terminal $p_3$ (that is, the terminal $m_4$). In this case, the Q terminals include the terminal $m_1$ and the terminal $m_2$ that may be denoted as a terminal $q_1$ and a terminal $q_2$.

In a first possible implementation, the coefficient matrix may be used to correct the statistical autocorrelation matrix.

A statistical autocorrelation matrix $\overline{R}_{q_y}$ corresponding to the terminal $q_y$ is corrected based on a coefficient matrix $B_{q_y}$ corresponding to the terminal $q_y$. For ease of description, the statistical autocorrelation matrix corrected based on the coefficient matrix $B_{q_y}$ is referred to as $$R'_{q_y}.$$

For example, a corrected statistical autocorrelation matrix $$R'_{q_1}$$

corresponding to the terminal $q_1$ is obtained by correcting a statistical autocorrelation matrix $\overline{R}_{q_1}$ corresponding to the terminal $q_1$ based on a coefficient matrix $B_{q_1}$ corresponding to the terminal $q_1$, and/or a corrected statistical autocorrelation matrix $$R'_{q_2}$$

corresponding to the terminal $q_2$ is obtained by correcting a statistical autocorrelation matrix $\overline{R}_{q_2}$ corresponding to the terminal $q_2$ based on a coefficient matrix $B_{q_2}$ corresponding to the terminal $q_2$.

In the first possible implementation, the obtaining a joint precoding matrix of M terminals based on statistical autocorrelation matrices respectively corresponding to N terminals may be understood as obtaining the joint precoding matrix based on corrected statistical autocorrelation matrices corresponding to some or all of the Q terminals and a statistical autocorrelation matrix of a terminal, in the N terminals, other than the some or all terminals.

For example, the joint precoding matrix is obtained based on the corrected statistical autocorrelation matrix $$R'_{q_1}$$

corresponding to the terminal $q_1$, the corrected statistical autocorrelation matrix $R'_{q_2}$ corresponding to the terminal $q_1$, and the statistical autocorrelation matrix $\overline{R}_{n_2}$ corresponding to the terminal $n_3$.

In a second possible implementation, the coefficient matrix may be used to correct the channel estimation result.

A corrected channel estimation result $$H'_{p_x}$$

corresponding to the terminal $p_x$ is obtained by correcting a channel estimation result $H_{p_x}$ corresponding to the terminal $p_x$ based on a coefficient matrix $B_{p_x}$ corresponding to the terminal $p_x$.

For example, a corrected channel estimation result H $$H'_{p_1}$$

corresponding to the terminal $p_1$ (that is, the terminal $m_1$) is obtained by correcting a channel estimation result $H_{p_1}$ corresponding to the terminal $p_1$ based on a coefficient matrix $B_{p_1}$, a corrected channel estimation result $H'_{p_2}$ corresponding to the terminal $p_2$ (that is, the terminal $m_2$) is obtained by correcting a channel estimation result $$H'_{p_2}$$

corresponding to the terminal $p_2$ based on a coefficient matrix $B_{p_2}$, and/or a corrected channel estimation result $$H'_{p_3}$$

corresponding to the terminal $p_3$ (that is, the terminal $m_4$) is obtained by correcting a channel estimation result $H_{p_3}$ corresponding to the terminal $p_3$ based on a coefficient matrix $B_{p_3}$.

In the second possible implementation, the obtaining a joint precoding matrix of M terminals based on statistical autocorrelation matrices respectively corresponding to N terminals may be understood as obtaining the joint precoding matrix based on the statistical autocorrelation matrices respectively corresponding to the N terminals and corrected channel estimation results corresponding to some or all of the P terminals. In some embodiments, the joint precoding matrix may be further obtained based on a channel estimation result corresponding to another terminal, in the M terminals, other than the some or all terminals.

For example, the joint precoding matrix is obtained based on (1) the corrected channel estimation result $$H'_{p_1}$$

corresponding to the terminal $p_1$ (that is, the terminal $m_1$), the corrected channel estimation result $$H'_{p_2}$$

corresponding to the terminal $p_2$ (that is, the terminal $m_2$), and the corrected channel estimation result $$H'_{p_3}$$

corresponding to the terminal $p_3$ (that is, the terminal $m_4$), and (2) the statistical autocorrelation matrix $\overline{R}_{n_1}$ corresponding to the terminal $n_1$ (that is, the terminal $m_1$ or $q_1$), the statistical autocorrelation matrix $\overline{R}_{n_2}$ corresponding to the terminal $n_2$ (that is, the terminal $m_2$ or $q_2$), and the statistical autocorrelation matrix $R_{n_3}$ corresponding to the terminal $n_3$ (that is, the terminal $m_3$). In some embodiments, the joint precoding matrix may be further obtained based on a channel estimation result $H_{m_3}$ corresponding to the terminal $m_3$.

In a third possible implementation, with reference to the foregoing first possible implementation and the foregoing second possible implementation, the coefficient matrix may be used to correct the statistical autocorrelation matrix and the channel estimation result.

The corrected statistical autocorrelation matrix $$R'_{q_y}$$

corresponding to the terminal $q_y$ in the Q terminals is obtained by correcting the statistical autocorrelation matrix $\overline{R}_{q_y}$ corresponding to the terminal $q_y$ based on the coefficient matrix $B_{q_y}$ corresponding to the terminal $q_y$, and the corrected channel estimation result $$H'_{p_x}$$

corresponding to the terminal $p_x$ in the P terminals is obtained by correcting the channel estimation result $H_{p_x}$ corresponding to the terminal $p_x$ based on the coefficient matrix $B_{p_x}$ corresponding to the terminal $p_x$.

For example, the corrected statistical autocorrelation matrix $$R'_{q_1}$$

corresponding to the terminal $q_1$ (that is, the terminal $m_1$, $n_1$, or $p_1$) is obtained by correcting the statistical autocorrelation matrix $\overline{R}_{q_1}$ corresponding to the terminal $q_1$ based on the coefficient matrix $B_{q_1}$ corresponding to the terminal $q_1$, and/or the corrected statistical autocorrelation matrix $$R'_{q_2}$$

corresponding to the terminal $q_2$ (that is, the terminal $m_2$, $n_2$, or $p_2$) is obtained by correcting the statistical autocorrelation matrix $\overline{R}_{q_2}$ corresponding to the terminal $q_2$ based on the coefficient matrix $B_{q_2}$ corresponding to the terminal $q_2$. The corrected channel estimation result $$H'_{p_1}$$

corresponding to the terminal $p_1$ (that is, the terminal $m_1$) is obtained by correcting the channel estimation result $H_{p_1}$ corresponding to the terminal $p_1$ based on the coefficient matrix $B_{p_1}$, the corrected channel estimation result $$H'_{p_2}$$

corresponding to the terminal $p_2$ (that is, the terminal $m_2$) is obtained by correcting the channel estimation result $H_{p_2}$ corresponding to the terminal $p_2$ based on the coefficient matrix $B_{p_2}$, and/or the corrected channel estimation result $$H'_{p_3}$$

corresponding to the terminal $p_3$ (that is, the terminal $m_4$) is obtained by correcting the channel estimation result $H_{p_3}$ corresponding to the terminal $p_3$ based on the coefficient matrix $B_{p_3}$.

In the third possible implementation, the obtaining a joint precoding matrix of M terminals based on statistical autocorrelation matrices respectively corresponding to N terminals may be understood as obtaining the joint precoding matrix based on the corrected statistical autocorrelation matrices corresponding to some or all of the Q terminals, a statistical autocorrelation matrix of a terminal, in the N terminals, other than the some or all of the Q terminals, and the corrected channel estimation results corresponding to some or all of the P terminals. In some embodiments, the joint precoding matrix may be further obtained based on a channel estimation result corresponding to another terminal, in the M terminals, other than the some or all of the P terminals.

For example, the joint precoding matrix is obtained based on $$R'_{q_1}, R'_{q_2}, H'_{p_1}, H'_{p_2}, H'_{p_3}, \text{ and } \overline{R}_{n_3}.$$

In some embodiments, the joint precoding matrix may be further obtained based on the channel estimation result $H_{m_3}$ corresponding to the terminal $m_3$.

S402: Output information that indicates the joint precoding matrix.

The output may be an output from the network device to another network device or an internal output of the network device. The network device may be the network device in the architecture in which the CU and the DU are not separated, may be the CU or the DU in an architecture in which the CU and the DU are separated, may be the CU-CP or the CU-UP in the architecture in which the CU-CP and the CU-UP are separated, may be the DU or the RU in the architecture in which the DU and the RU are separated, may be a centralized controller, or the like. For details, refer to the foregoing descriptions. The following describes an output manner with reference to several implementations.

In a first implementation, the output may be the output from the network device to another network device.

In the first implementation, in some embodiments, the method in FIG. 4A may further include: The another network device may process data of the M terminals based on the joint precoding matrix. In some embodiments, the method in FIG. 4A further includes: The another network device may send data processed by using the joint precoding matrix to the terminal, or the another network device may send the data processed by using the joint precoding matrix to the network device, and the network device sends the data to the terminal.

For example, the network device is the DU in the architecture in which the DU and the RU are separated, and the DU may send, to the RU, the information that indicates the joint precoding matrix. The RU may process the data of the M terminals based on the joint precoding matrix, and then send the processed data to the terminal by using a radio frequency unit.

For another example, the network device is the RU in the architecture in which the DU and the RU are separated, and the RU may send, to the DU, the information that indicates the joint precoding matrix. The DU may process the data of the M terminals based on the joint precoding matrix, then the DU sends the processed data to the RU, and the RU sends the processed data to the terminal by using the radio frequency unit.

In a second implementation, the output may be an output from one module in the network device to another module in the network device, for example, an output performed through an interface or the like. The interface may be a circuit. The module may be referred to as a unit, and may be specifically a physical unit, or may be a logical unit. This is not limited in this application.

For example, the output may be an output from a processor in the network device to a memory, may be the output from a unit that is in the network device and that is configured to calculate the joint precoding matrix to another unit, or the like. The another unit may be a unit using the joint precoding matrix. For example, the another unit may process the data of the M terminals based on the joint precoding matrix.

For example, the network device is the network device in the architecture in which the CU and the DU are not separated. The output may be understood as an output from one unit in the network device to another unit, and the another unit may process the data of the M terminals based on the joint precoding matrix. For another example, the network device is the DU in the architecture in which the CU and the DU are separated. The output may be understood as an output from one unit in the DU to another unit, and the another unit may process the data of the M terminals based on the joint precoding matrix. For another example, the network device is the DU in the architecture in which the DU and the RU are separated. The output may be understood as an output from one unit in the DU to another unit, and the another unit may process the data of the M terminals based on the joint precoding matrix. For still another example, the network device is the RU in the architecture in which the DU and the RU are separated. The output may be understood as an output from one unit in the RU to another unit, and the another unit may process the data of the M terminals based on the joint precoding matrix.

In some embodiments, in the foregoing second implementation, the method may further include: The network device sends the data processed by using the joint precoding matrix to the terminal. Specifically, the data processed by using the joint precoding matrix may be sent to the terminal by using the foregoing unit, the foregoing another unit, or another unit of the network device. Alternatively, the network device may send the data processed by using the joint precoding matrix to another network device, and the another network device sends the data to the terminal. This is not limited in this embodiment of this application.

The information that indicates the joint precoding matrix may be understood as that the joint precoding matrix may be obtained based on the information. There are a plurality of implementations for the information. The following provides descriptions.

In some embodiments, the information may be the joint precoding matrix.

In some embodiments, the information may be information that indicates a compressed matrix, and the compressed matrix corresponds to the joint precoding matrix. In this case, S402 may include: outputting the information that indicates the compressed matrix.

Because the joint precoding matrix may include a large quantity of elements, directly outputting the joint precoding matrix may occupy large communication resources, and cause large overheads. The information that indicates the compressed matrix is output, so that overheads of output information can be reduced, and the communication resources can be saved.

In some embodiments, the information may be an index of the joint precoding matrix. A receive end of the index may determine the joint precoding matrix based on a relationship between the joint precoding matrix and the index.

The index is output, so that overheads of the information can be reduced, and the communication resources can be saved.

The foregoing describes a method for obtaining a precoding matrix of this application with reference to FIG. 3B, FIG. 4A, and FIG. 4B. The following further describes content of FIG. 3B, FIG. 4A, FIG. 4B, and FIG. 4C with reference to FIG. 5 to FIG. 7. The content in FIG. 3B, FIG. 4A, FIG. 4B, FIG. 4C, FIG. 5, FIG. 6, and FIG. 7 may be mutually referenced and cited.

In this application, an example in which a base station performs methods in FIG. 5 to FIG. 7 is used for description. However, the base station may include a plurality of network elements (namely, network devices), and the methods in FIG. 5 to FIG. 7 may be implemented by different network elements. For details, refer to descriptions in FIG. 3B. FIG. 5 shows a method for obtaining a joint precoding matrix according to an embodiment of this application. The method in FIG. 5 specifically describes how to obtain the joint precoding matrix. The method in FIG. 5 and the method in FIG. 3B and FIG. 4A may be mutually referenced and cited. For example, S501 may be performed by 301 in FIG. 3B, S502 and S503 may be performed by 302 in FIG. 3B, and S504 and S505 may be performed by 303 in FIG. 3B. S505 and S401 may be mutually referenced.

The following provides descriptions with reference to FIG. 5.

S501: The base station obtains channel estimation results of M terminals.

In a first implementation of S501, the base station receives SRSs sent by the M terminals, and performs channel estimation to obtain the channel estimation results.

It may be understood that each of the M terminals may send an SRS to the base station on an SRS resource. The SRS resource may include one or more resource elements (resource elements, REs).

In this application, an example in which a reference signal is the SRS is used for description. It should be noted that the base station may receive another reference signal sent by the terminal, and perform channel estimation to obtain the channel estimation result.

The base station may perform channel estimation on an SRS received on each RE by using the RE as a granularity, or may perform channel estimation on SRSs received on a plurality of REs by using the plurality of REs (for example, a resource block (resource block, RB) or a resource block group (resource block group, RBG)) as a granularity. A granularity of the SRS used for channel estimation is not limited in this embodiment of this application. An example in which the base station performs channel estimation on the SRS received on each RE is used for description.

Refer to the descriptions in FIG. 4A. A terminal in the M terminals may be referred to as $m_i$, where i is a positive integer, and $1 \le i \le M$. That is, $m_i \in \{m_1, m_2, \ldots, m_M\}$. A set $\{m_1, m_2, \ldots, m_M\}$ may be referred to as a set A, and $m_i \in A$.

For example, the M terminals include a terminal $m_1$, a terminal $m_2$, a terminal $m_3$, and a terminal $m_4$.

A channel estimation result of an SRS received, at an SRS moment t and on a subcarrier r, by the base station from the terminal $m_i$ may be represented as $H_{r,m_i}(t)$.

r is a number of a subcarrier, and $r = 1, 2, \ldots, R$. One subcarrier may correspond to one RE, and r and R are integers greater than or equal to 1. $i = 1, 2, \ldots, M$, and M is an integer greater than or equal to 1. t is a number of an SRS moment, $t = 1, 2, \ldots, T$, and t and T are integers greater than or equal to 1.

$H_{r,m_i}(t)$ may be a matrix having $N_t$ rows and $M_t$ columns, where $N_t$ is a quantity of antennas of the base station, and $M_t$ is a quantity of antennas of the terminal $m_i$. In some embodiments, SRSs may correspond to same subcarriers at different moments. In addition, one RE may include one subcarrier on one symbol in time domain, and the SRS moment t may be understood as one symbol corresponding to RE r.

For example, the base station receives, at a moment 1 and on a subcarrier 1 and a subcarrier 2, SRSs of the terminal $m_1$. The base station may separately perform channel estimation on the SRSs received, at the moment 1 and on the subcarrier 1 and the subcarrier 2, from the terminal 1. Channel estimation results may be respectively represented as $H_{1,m_1}(1)$ and $H_{2,m_1}(1)$. The base station receives, at a moment 2 and on the subcarrier 1 and the subcarrier 2, SRSs of the terminal $m_1$. The base station may separately perform channel estimation on the SRSs received, at the moment 2 and on the subcarrier 1 and the subcarrier 2, from the terminal $m_1$. Channel estimation results may be respectively represented as $H_{1,m_1}(2)$ and $H_{2,m_1}(2)$. In other words, the SRSs at the moment 1 and the moment 2 correspond to the same subcarriers, that is, both correspond to the subcarrier 1 and the subcarrier 2.

For another example, the base station receives, at the moment 1 and on the subcarrier 1 and the subcarrier 2, SRSs of the terminal $m_2$. The base station may separately perform channel estimation on the SRSs received, at the moment 1 and on the subcarrier 1 and the subcarrier 2, from the terminal $m_2$. The channel estimations may be respectively represented as $H_{1,m_2}(1)$ and $H_{2,m_2}(1)$. The base station receives, at the moment 2 and on the subcarrier 1 and the subcarrier 2, SRSs of the terminal $m_2$. The base station may separately perform channel estimation on the SRSs received, at the moment 2 and on the subcarrier 1 and the subcarrier 2, from the terminal $m_2$. The channel estimations may be respectively represented as $H_{1,m_2}(2)$ and $H_{2,m_2}(2)$. In other words, the SRSs at the moment 1 and the moment 2 correspond to the same subcarriers, that is, both correspond to the subcarrier 1 and the subcarrier 2.

Similarly, the base station obtains channel estimation results $H_{1,m_3}(1)$ and $H_{2,m_3}(1)$ corresponding to SRSs that are of the terminal $m_3$ and that are on the subcarrier 1 and the subcarrier 2 at the moment 1, and channel estimation results $H_{1,m_3}(2)$ and $H_{2,m_3}(2)$ of SRSs that are of the terminal $m_3$ and that are on the subcarrier 1 and the subcarrier 2 at the moment 2.

Similarly, the base station obtains channel estimation results $H_{1,m_4}(1)$ and $H_{2,m_4}(1)$ corresponding to SRSs that are of the terminal $m_4$ and that are on the subcarrier 1 and the subcarrier 2 at the moment 1, and channel estimation results $H_{1,m_4}(2)$ and $H_{2,m_4}(2)$ of SRSs that are of the terminal $m_4$ and that are on the subcarrier 1 and the subcarrier 2 at the moment 2.

In some embodiments, a space division technology may be used, so that different terminals send SRSs to the base station at a same moment and on a same subcarrier.

In a second implementation of S501, the base station may send a reference signal, for example, a CSI-RS, to the terminal, and the terminal feeds back CSI to the base station. Then, the base station obtains, based on the CSI, an initial precoding matrix expected by the terminal. The base station may obtain the channel estimation result based on the quantity of antennas of the base station and the quantity of antennas of the terminal. A channel estimation result of a channel between the base station and the terminal m; at the moment t and on the subcarrier r may be represented as $H_{r,m_i}(t)$. $H_{r,m_i}(t)$ may be a matrix having $N_t$ rows and $M_t$ columns. For meanings of r, $m_i$, t, $N_t$, and $M_t$, refer to the foregoing first implementation. For other content of the second implementation, refer to the foregoing first implementation, and details are not described herein again.

S502: The base station selects N terminals from the M terminals.

The base station may determine a channel correlation of each of the M terminals based on the channel estimation result of each of the M terminals, and then select a terminal of which a channel correlation satisfies a first preset condition. In some embodiments, a channel correlation of a terminal may be a correlation between channels of the terminal at different moments corresponding to a same subcarrier. For details, refer to the description of $401.

Refer to the descriptions in FIG. 4A. A terminal in the N terminals may be referred to as $n_j$, where j is a positive integer, and $1 \le j \le N$. That is, $n_j \in \{n_1, n_2, \ldots, n_N\}$. A set $\{n_1, n_2, \ldots, n_N\}$ may be referred to as a set B, and $n_j \in B$. It may be understood that the set B is a subset of the set A. In other words, $B \subseteq A$.

For example, the base station selects the terminal $m_1$, the terminal $m_2$, and the terminal $m_3$ from the terminal $m_1$, the terminal $m_2$, the terminal $m_3$, and the terminal $m_4$. In other words, the N terminals include a terminal $n_1$, a terminal $n_2$, and a terminal $n_3$, where the terminal $n_1$ is the terminal $m_1$, the terminal $n_2$ is the terminal $m_2$, and the terminal $n_3$ is the terminal $m_3$.

S502 is optional. When S502 does not exist, it may be understood as that in S503, the base station calculates a statistical autocorrelation matrix of each of the M terminals.

S503: The base station calculates a statistical autocorrelation matrix of each of the N terminals.

An autocorrelation matrix of a channel estimation result $H_{n_j}$ corresponding to an SRS received, at the moment t and on the subcarrier r, by the base station from the terminal $n_j$ (or a CSI-RS sent, on the subcarrier r, by the base station to the terminal $n_j$) may be represented as $$R_{r,n_j}(t), \text{ and } R_{r,n_j}(t) = H_{r,n_j}(t)H^H_{r,n_j}(t),$$

where $$H_{r,n_j}^H(t)$$

represents a conjugate transpose matrix of $H_{r,n_j}(t)$. It may be understood that $H_{r,n_j}(t)$ may represent a matrix having $N_t$ rows and $M_t$ columns, $$H_{r,n_j}^H(t)$$

represents a matrix having $M_t$ rows and $N_t$ columns, and $$H_{r,n_j}(t)H_{r,n_j}^H(t)$$

represents a matrix having $N_t$ rows and $N_t$ columns, where $M_t$ is the quantity of antennas of the terminal $m_j$, and $N_t$ is the quantity of antennas of the base station.

Calculating the statistical autocorrelation matrix may include: filtering an autocorrelation matrix in frequency domain and/or time domain. For ease of description, an autocorrelation matrix that is filtered in frequency domain may be referred to as a frequency-domain autocorrelation matrix, an autocorrelation matrix that is filtered in time domain is referred to as a time-domain autocorrelation matrix, and an autocorrelation matrix that is filtered in frequency domain and time domain is referred to as a time-frequency domain autocorrelation matrix. In other words, the statistical autocorrelation matrix is the frequency-domain autocorrelation matrix, the time-domain autocorrelation matrix, or the time-frequency domain autocorrelation matrix, which are separately described below. The following content and content in S401 may be mutually combined and referenced.

(1) Filtering in Frequency Domain

The filtering in frequency domain may include filtering a plurality of autocorrelation matrices corresponding to a plurality of subcarriers in frequency domain.

A frequency-domain autocorrelation matrix of the terminal $n_j$ at the moment t may be represented as $$\hat{R}_{n_j}(t), \text{ and } \hat{R}_{n_j}(t) = \frac{1}{R}\sum_{r=1}^R R_{r,n_j}(t),$$

where R is an integer greater than 1.

It may be understood that there may be a plurality of possibilities for a value of R. For example, statistics about channel estimations on subcarriers in one RBG at an SRS moment t may be collected in frequency domain. One RBG may include 48 subcarriers. In other words, R may be 48. Alternatively, statistics collection in frequency domain may be performed on a channel estimation on one or more subcarriers in a scheduling bandwidth, that is, R may be a quantity of subcarriers included in the scheduling bandwidth. For example, the scheduling bandwidth may include 4 RBGs. In other words, the scheduling bandwidth includes 4*48=192 subcarriers, and R is 192. Alternatively, the scheduling bandwidth may include 8 RBGs. In other words, 8*48=384 subcarriers, and R is 384.

For example, a frequency-domain autocorrelation matrix of the terminal $n_1$ at the moment 1 may be represented as $$\hat{R}_{n_1}(1), \text{ and } \hat{R}_{n_1}(1) = \left(H_{1,n_1}(1)H_{1,n_1}^H(1) + H_{2,n_1}(1)H_{2,n_1}^H(1)\right)/2.$$

A frequency-domain autocorrelation matrix of the terminal $n_1$ at the moment 2 may be represented as $$\hat{R}_{n_1}(2), \text{ and } \hat{R}_{n_1}(2) = \left(H_{1,n_1}(2)H_{1,n_1}^H(2) + H_{2,n_1}(2)H_{2,n_1}^H(2)\right)/2.$$

Similarly, it may be obtained that a frequency-domain autocorrelation matrix of the terminal $n_2$ at the moment 1 may be represented as $\hat{R}_{n_2}(1)$, and a frequency-domain autocorrelation matrix of the terminal $n_2$ at the moment 2 may be represented as $\hat{R}_{n_2}(2)$.

Similarly, it may be obtained that a frequency-domain autocorrelation matrix of the terminal $n_3$ at the moment 1 may be represented as $\hat{R}_{n_3}(1)$, and a frequency-domain autocorrelation matrix of the terminal $n_3$ at the moment 2 may be represented as $\hat{R}_{n_3}(2)$.

It may be understood that a statistical autocorrelation matrix of a terminal at the moment t is a second-order statistics and may indicate energy distribution of $N_t$ antennas of the base station in channel space between the terminal and the base station at the moment t. When Q is large, a frequency-domain autocorrelation matrix on a wide bandwidth may be obtained. The frequency-domain may approximately indicate channel space in time domain, so that a historical status of the channel space between the terminal and the base station may be indicated. A numerical value of Q is increased, so that a frequency-domain autocorrelation matrix on a sufficiently wide bandwidth may be obtained, the channel space may be more approximate to channel space in time domain, and accuracy of calculating the statistical autocorrelation matrix is improved. In this way, inter-stream interference is better avoided, and downlink performance is improved.

(2) Filtering in Time and Frequency Domains

Filtering in time and frequency domains may include filtering frequency-domain autocorrelation matrices corresponding to different moments in time domain to obtain a time-frequency domain autocorrelation matrix.

A time-frequency domain autocorrelation matrix of the terminal $n_j$ at the moment t may be represented as $R_{\_n_j}(t)$, and $R_{\_n_j}(t)=\gamma\hat{R}_{n_j}(t)+\beta R_{\_n}(t-1)$.

$\gamma$ and $\beta$ represent filtering coefficients, and may be scalars. $\hat{R}_{n_j}(t)$ is the frequency domain autocorrelation matrix of the terminal $n_j$ at the moment t. For details, refer to the foregoing content about the statistics collection in frequency domain.

When t=1, $R_{\_n_j}(t-1)=0$, and $R_{\_n_j}(1)=\gamma\hat{R}_{n_j}(1)$; when t=2, $R_{n_j}(2)=\gamma\hat{R}_{n_j}(2)+\beta R_{\_n_j}(1)$; when t=3, $R_{\_n_j}(3)=\gamma\hat{R}_{n_j}(3)+\beta R_{\_n_j}(2)$, and so on.

For example, a time-domain autocorrelation matrix of the terminal $n_1$ satisfies $R_{\_n_j}(1)=\gamma\hat{R}_{n_j}(1)$ at the moment 1, and a time-domain autocorrelation matrix of the terminal $n_1$ satisfies $R_{\_n_j}(2)=\gamma\hat{R}_{n_j}(2)+\beta R_{\_n_2}(1)$ at the moment 2.

Similarly, the time-domain autocorrelation matrix of the terminal $n_2$ satisfies $R_{\_n_2}(1)=\gamma\hat{R}_{n_2}(1)$ at the moment 1, and the time-domain autocorrelation matrix of the terminal $n_2$ satisfies $R_{\_n_2}(2)=\gamma\hat{R}_{n_2}(2)+\beta R_{\_n_2}(1)$ at the moment 2.

Similarly, the time-domain autocorrelation matrix of the terminal $n_3$ satisfies $R_{\_n_j}(1)=\gamma\hat{R}_{n_3}(1)$ at the moment 1, and the time-domain autocorrelation matrix of the terminal $n_3$ satisfies $R_{\_n_3}(2)=\gamma\hat{R}_{n_3}(2)+\beta R_{\_n_3}(1)$ at the moment 2.

The frequency-domain autocorrelation matrices of the terminal at different moments are filtered, so that a quantity of statistical sample points can be increased, and a statistical result is more accurate and authentic.

In some embodiments, the foregoing uses an example in which filtering in frequency domain is first performed, and then filtering in time domain is performed for description. In this application, filtering in time domain may be first performed, and then filtering in frequency domain is performed. For example, a result obtained through filtering in time domain may be represented as $R_{\_r,n_j}(t)$, and a result obtained through filtering in frequency domain may be represented as $\hat{R}_{n_j}(t)$, where $$R_{\_r,n_j}(t) = \gamma R_{r,n_j}(t) + \beta R_{\_r,n_j}(t-1), \text{ and } \hat{R}_{n_j}(t) = \frac{1}{R}\sum_{r=1}^{R} R_{\_r,n_j}(t).$$

(3) Filtering in Time Domain

Filtering in time domain may include filtering autocorrelation matrices corresponding to different moments in time domain to obtain a time-domain autocorrelation matrix.

A time-domain autocorrelation matrix of the terminal $n_j$ at the moment t may be represented as $R_{\_n_j}(t)$, and $R_{\_n_j}(t)=\gamma R_{r,n_j}(t)+\beta R_{\_n_j}(t-1)$.

$\gamma$ and $\beta$ represent filtering coefficients, and may be scalars. $R_{\_n_j}(t-1)$ is a time-domain autocorrelation matrix of the terminal $n_j$ at a moment $t-1$.

When $t=1$, $R_{\_n_j}(t-1)=0$, and $R_{\_n_j}(1)=\gamma R_{r,n_j}(1)$: when $t=2$, $R_{\_n_j}(2)=\gamma R_{r,n_j}(2)+\beta R_{\_n_j}(1)$: when $t=3$, $R_{\_n_j}(3)=\gamma R_{r,n_j}(3)+\beta R_{\_n_j}(2)$, and so on.

In some embodiments, if there is only an autocorrelation matrix corresponding to one subcarrier in frequency domain, $R_{r,n_j}(t)$ is the autocorrelation matrix corresponding to the subcarrier: or if there are autocorrelation matrices corresponding to a plurality of subcarriers in frequency domain, one subcarrier may be selected from the plurality of subcarriers, and an autocorrelation matrix corresponding to the subcarrier is $R_{r,n_j}(t)$.

A statistical autocorrelation matrix of the terminal $n_j$ may be represented as $\overline{R}_{n_j}$, and $\overline{R}_{n_j}=\hat{R}_{n_j}(t)$, or $\overline{R}_{n_j}=R_{\_n_j}(t)$.

For example, it may be obtained that a statistical autocorrelation matrix of the terminal $n_1$ satisfies $\overline{R}_{n_1}(2)=R_{\_n_1}(2)$, a statistical autocorrelation matrix of the terminal $n_2$ satisfies $\overline{R}_{n_2}(2)=R_{\_n_2}(2)$, and a statistical autocorrelation matrix of the terminal $n_3$ satisfies $\overline{R}_{n_3}(2)=R_{\_n_3}(2)$.

The foregoing describes how to perform channel estimation and calculate the statistical autocorrelation matrix with reference to S501 to S503. The foregoing content and the content in FIG. 4A may be mutually referenced. For example, $\overline{R}_{n_j}$ in FIG. 4A may be $\overline{R}_{n_j}(t)$ in FIG. 5. $R_{n_j}$ in FIG. 4A may be $\hat{R}_{r,n_j}(t)$ in FIG. 5. $H_{m_i}$ in FIG. 4A may be $H_{r,m_i}(t)$ in FIG. 5.

In some embodiments, each time the base station receives an SRS signal or CSI of one terminal, S503 may be performed, and then when the base station receives the SRS signal or CSI of the terminal next time, S503 is performed again, so that statistical autocorrelation matrices of the terminal at different moments may be obtained.

In some embodiments, when the antenna of the base station is a dual-polarized antenna, and a polarization separation degree is high, polarization combination may be performed on the statistical autocorrelation matrix. $\overline{R}_{n_j}$ represents a matrix having $N_t$ rows and $N_t$ columns, where is a row-column matrix, $N_t$ is the quantity of antennas of the base station. $\overline{R}_{n_j}$ obtained through polarization combination is:

$$\begin{bmatrix} \overline{R}_{n_j}\left(1{:}N_t/2,\, 1{:}N_t/2\right) & 0 \\ 0 & \overline{R}_{n_j}\left(\left(\frac{N_t}{2}+1\right){:}N_t,\, \left(N_t/2+1\right){:}N_t\right) \end{bmatrix}$$

In $\overline{R}_{n_j}$, a block located from a first row to a $N_t/2^{th}$ row and from a first column to a $N_t/2^{th}$ column (which is referred to as a block 1 below for ease of description) and a block located from a $N_t/2+1^{th}$ row to a $N_t^{th}$ row and from a $N_t/2+1^{th}$ column to a $N_t^{th}$ column (which is referred to as a block 2) may be referred to as main diagonal blocks. A block located from the first row to the $N_t/2^{th}$ row and from the $N_t/2+1^{th}$ column to the $N_t,1$ column (which is referred to as a block 3) and a block located from the $N_t/2+1^{th}$ row to the $N_t^{th}$ row and from the first column to the $N_t/2^{th}$ column (which is referred to as a block 4) may be referred to as non-main diagonal blocks.

The polarization combination for $\overline{R}_{n_j}$ may be understood as maintaining values of the main diagonal blocks of $\overline{R}_{n_j}$ unchanged, and setting values of the non-main diagonal blocks of $R_{n_j}$ to 0.

It may be understood that, in $\overline{R}_{n_j}$, the values on the main diagonal blocks are autocorrelation values in a same polarization direction, and the values on the non-main diagonal blocks are cross-correlation values in different polarization directions. For example, if an antenna is a $\pm 45°$ antenna, the block 1 is an autocorrelation value in a $+45°$ polarization direction, the block 2 is an autocorrelation value in a $-45°$ polarization direction, the block 3 is a cross-correlation value between the $+45°$ polarization direction and the $-45°$ polarization direction, and the block 4 is a cross-correlation value between the $-45°$ polarization direction and the $+45°$ polarization direction.

The cross-correlation values of different polarization directions are set to 0, and a correlation between polarizations may be ignored, so that complexity of subsequently performing an operation by using $\overline{R}_{n_j}(t)$ to is reduced, resources of a processor are saved, and complexity of implementation is reduced.

S504: The base station calculates a single-user precoding matrix of each of the M terminals.

In this application, a single-user precoding matrix of each terminal may be understood as a precoding matrix of the terminal in a case of single-user MIMO (SU-MIMO). A single user may be understood as single user equipment or a single terminal. The base station performs transmission with the terminal on a same time-frequency resource, and does not communicate with another terminal. The precoding matrix may be referred to as a transmit weight, and the single-user precoding matrix may be referred to as a single-user transmit weight.

The single-user precoding matrix of each of the plurality of terminals may be calculated by using the RE as a granularity, or may be calculated by using the RBG (including a plurality of REs) as a granularity. The following separately uses two implementations as examples for description.

In some embodiments, singular value decomposition (SVD) may be performed on a channel estimation $H_{r,m_i}(t)$ that is of the terminal $m_i$ and that is on a subcarrier r at the moment t to obtain a single-user precoding matrix $U_{m_i}$.

$$U_{m_i} \in \mathbb{C}^{N_t \times N_f},$$

where $N_t$ is the quantity of antennas of the base station, $N_f$ is a quantity of streams of the terminal $m_i$, and $$U_k \in \mathbb{C}^{N_t \times N_f}$$

represents that $U_k$ is complex number space of $N_t \times N_f$.

In some embodiments, in this implementation, SVD may be separately performed on channel estimations that are of the M terminals and that are on a same subcarrier to obtain the single-user precoding matrix of each of the M terminals.

In some embodiments, channel estimations that are of the terminal $m_i$ and that are on a plurality of subcarriers at the moment t may be concatenated, and then SVD is performed on a matrix obtained through concatenation to obtain the single-user precoding matrix $U_{m_i}$ of the terminal $m_i$. Concatenation may be understood as concatenating matrices corresponding to the channel estimations that are of the terminal $m_i$ and that are on all subcarriers into one matrix, where a matrix corresponding to a channel estimation on each subcarrier is a submatrix in the matrix obtained through concatenation.

$$U_{m_i} \in \mathbb{C}^{N_t \times N_f},$$

where $N_t$ is the quantity of antennas of the base station, $N_f$ is a quantity of streams of the terminal $m_i$, and $$U_{m_i} \in \mathbb{C}^{N_t \times N_f}$$

represents that $U_k$ is the complex number space of $N_t \times N_f$.

In some embodiments, in this implementation, channel estimations that are of the M terminals and that are on a plurality of same subcarriers may be separately concatenated, and then SVD is performed on a matrix obtained through concatenation to obtain the single-user precoding matrix of each terminal.

The foregoing uses two implementations as examples for description. It can be learned that the single-user precoding matrix of each of the M terminals is obtained based on a channel estimation result of the terminal. In addition to the foregoing two implementations, the single-user precoding matrix of each of the M terminals may be obtained in another manner. This is not limited in this embodiment of this application.

For example, in the foregoing plurality of implementations, a single-user precoding matrix $U_{m_1}$ of the terminal $m_1$, a single-user precoding matrix $U_{m_2}$ of the terminal $m_2$, a single-user precoding matrix $U_{m_3}$ of the terminal $m_3$, and a single-user precoding matrix $U_{m_4}$ of the terminal $m_4$ may be obtained.

S505: The base station calculates a joint precoding matrix of the M terminals based on the statistical autocorrelation matrix of each of the N terminals and the single-user precoding matrix of each of the M terminals.

Because the single-user precoding matrix of each of the M terminals is obtained based on the channel estimation result of the terminal, S505 may be understood as calculating the joint precoding matrix of the M terminals based on the statistical autocorrelation matrix of each of the N terminals and the channel estimation result of each of the M terminals.

Specifically, for each of the M terminals, a multi-user precoding matrix of the terminal may be calculated, and then multi-user precoding matrices of the terminals are concatenated to obtain the joint precoding matrix. The joint precoding matrix may be represented as $$W' = \left[ W'_{m_1}, W'_{m_2}, \dots, W'_{m_M} \right].$$

In this application, a multi-user precoding matrix of each terminal may be understood as a precoding matrix of the terminal in a case of MU-MIMO. Multiple users may be understood as a plurality of user equipment or a plurality of terminals. The base station not only performs transmission with the terminal on a same time-frequency resource, but also may communicate with another terminal. By using the multi-user initial precoding matrix, each terminal may reduce interference from another terminal when receiving data of the terminal. The precoding matrix may be referred to as the transmit weight, and the multi-user precoding matrix may be referred to as a multi-user transmit weight.

In a first implementation, the method in FIG. 5 further includes the following step A1, and S505 may include the following step A2.

A1 and A2 may be performed for each of the M terminals. The following uses an example in which A1 and A2 are performed for one terminal $m_k$ in the M terminals for description, where $1 \leq k \leq M$.

A1: Calculate a sum of statistical autocorrelation matrices of other terminals, in the M terminals, other than the terminal $m_k$.

In a possible case, the terminal $m_k$ is a terminal in the N terminals, that is, the terminal $m_k$ has a statistical autocorrelation matrix corresponding to the terminal $m_k$. It is assumed that the terminal $m_k$ is a terminal n, of the N terminals, where $1 \leq l \leq N$. In this case, A1 may be understood as calculating a sum of statistical autocorrelation matrices of other terminals, in the N terminals, other than the terminal n.

A sum of the statistical autocorrelation matrices and noise of the other terminals, in the N terminals, other than the terminal $n_i$ may be represented as $\Phi \backslash m_k$;

$$\Phi_{\backslash m_k} = \sum_{j=1, j \neq l}^{N} \left( \left( 1 - \alpha_{n_j}^2 \right) \overline{R}_{n_j} + \sigma_{n_j}^2 I \right)$$

$\alpha_{n_j}$ represents a channel correlation of the terminal $n_j$. $\alpha_{n_j}$ may be a number from 0 to 1. $\overline{R}_{n_j}$ represents the statistical autocorrelation matrix $\overline{R}_{n_j}$ of the terminal $n_j$ obtained in S503. $\sigma_{n_j}$ represents noise in a channel estimation corresponding to the terminal $n_j$. In some embodiments, noise in a channel estimation corresponding to each of the N terminals may be the same. I represents a unit matrix.

In some embodiments, $\alpha_{n_j}$ may represent a correlation between a channel corresponding to a moment at which downlink data is sent and a channel corresponding to a moment at which a reference signal is sent.

For example, in this application, downlink data may be sent one or more times between two historical SRS moments. A correlation between channels at the two historical SRS moments may be first calculated, and then a linear difference is calculated by using the correlation between the channels at the two SRS moments, so that the correlation between the channel corresponding to the moment at which the downlink data is sent and the channel corresponding to the moment at which the reference signal is sent is obtained.

In another possible case, the terminal $m_k$ is not a terminal in the N terminals, that is, the terminal $m_k$ does not have the statistical autocorrelation matrix corresponding to the terminal $m_k$. A1 may be understood as calculating a sum of statistical autocorrelation matrices of the N terminals.

A sum of the statistical autocorrelation matrices and noise of the N terminals may be represented as Pmk.

$$\Phi_{\backslash m_k} = \sum_{j=1}^{N}\left(\left(1 - \alpha_{n_j}^2\right)\bar{R}_{n_j} + \sigma_{n_j}^2 I\right)$$

$\alpha_{n_j}$ represents the channel correlation of the terminal $n_j$. $\bar{R}_{n_j}$ represents the statistical autocorrelation matrix $\bar{R}_{n_j}$ of the terminal $n_j$. $\sigma_{n_j}$ represents the noise in the channel estimation corresponding to the terminal $n_j$. In some embodiments, the noise in the channel estimation corresponding to each of the N terminals may be the same. I represents the unit matrix.

A1 may be performed before S504 or may be performed after S504. This is not limited in this embodiment of this application.

A2: Obtain a multi-user precoding matrix of the terminal $m_k$ based on the statistical autocorrelation matrix of another terminal other than the terminal $m_k$ and the single-user precoding matrix of each of the M terminals.

The multi-user precoding matrix of the terminal $m_k$ may be represented as $$W'_{m_k}, \text{ and } W'_{m_k}$$

satisfies the following formula:

$$W'_{m_k} = \alpha_{m_k}\left(\sum_{i=1}^{M}\left(\alpha_{m_i}^2 U_{m_i}\left(U_{m_i}\right)^H\right) + \Phi_{\backslash m_k}\right)^{-1} U_{m_k}$$

$\alpha_{m_k}$ represents a channel correlation of the terminal $m_k$. $U_{m_i}$ represents the single-user precoding matrix of the terminal $m_i$. $U_{m_k}$ represents a single-user precoding matrix of the terminal $m_k$.

According to A1 and A2, it may be understood that $\bar{R}_{n_j}$ in $\Phi_{\backslash m_k}$ may represent a historical status of channel space between the terminal $n_j$ and the base station, and it may be considered that $\bar{R}_{n_j}$ approximately indicate a future status of channel space between the terminal $n_j$ and the base station. 60 Because $$a_{n_j}^2 \text{ in } \Phi_{\backslash m_k}$$

is not equal to 1, $\bar{R}_{n_j}$ is considered in calculation of $$W'_{m_k}.$$

The foregoing formula of $$W'_{m_k}$$

may be understood as that a precoding matrix of the terminal $m_k$ not only avoids channel space (which may be represented by $U_{m_i}$) of the another terminal, in the M terminals, other than the terminal $m_k$ at the latest moment, but also avoids future possible channel space (which may be represented by $\Phi_{\backslash m_k}$) of the another terminal, so that a weight avoidance dimension is increased, downlink inter-stream interference can be reduced, and downlink data transmission performance can be improved.

It can be learned from A1 and A2 that if the terminal $m_k$ is a terminal in the N terminals, a multi-user initial precoding matrix of the terminal $m_k$ is related to the statistical autocorrelation matrix of the another terminal, in the N terminals, other than the terminal $m_k$. If the terminal $m_k$ is not a terminal in the N terminals (in other words, the M terminals include the N terminals and the terminal $m_k$), the multi-user initial precoding matrix of the terminal $m_k$ is related to the statistical autocorrelation matrices of the N terminals.

In some embodiments, when values of M and N are equal, that is, the N terminals are the M terminals, the set A is equal to the set B, and the formulas in A1 and A2 may be simplified as follows:

$$\Phi_{\backslash m_k} = \sum_{j=1, j \neq l}^{N}\left(\left(1 - \alpha_{n_j}^2\right)\bar{R}_{n_j} + \sigma_{n_j}^2 I\right); \text{ and}$$

$$W'_{m_k} = \alpha_{m_k}\left(\sum_{i=1}^{M}\alpha_{m_i}^2 U_{m_i}\left(U_{m_i}\right)^H + \Phi_{\backslash m_k}\right)^{-1} U_{m_k}.$$

For meanings of the formulas, refer to the foregoing description in FIG. 5, and details are not described herein again.

The foregoing describes calculation of the multi-user precoding matrix of the terminal $m_k$ with reference to A1 and A2. A1 and A2 may be performed for each of the M terminals. Finally, the joint precoding matrix of the M terminals may be represented as $$W' = \left[W'_{m_1}, W'_{m_2}, \ldots, W'_{m_M}\right].$$

In a second implementation, the method in FIG. 5 further includes the following step B1, and S505 may include the following step B2. B1: Calculate a sum of statistical autocorrelation matrices of the N terminals.

A sum of the statistical autocorrelation matrices and noise of the N terminals may be represented as $\Phi_N$:

$$\Phi_N = \sum_{j=1}^{N}\left(\left(1 - \alpha_{n_j}^2\right)\bar{R}_{n_j} + \sigma_{n_j}^2 I\right)$$

For a meaning of the formula, refer to the foregoing description in FIG. 5, and details are not described herein again.

The foregoing step B1 may be performed only once for the N terminals, and does not need to be performed for each of different terminals, so that processing resources are saved.

B2 may be performed for each of the M terminals. The following uses an example in which B2 is performed for one terminal $m_k$ in the M terminals for description, where $1 \leq k \leq M$.

B2: Obtain a multi-user precoding matrix of the terminal $m_k$ based on the statistical autocorrelation matrices of the N terminals and the single-user precoding matrix of each of the M terminals.

In a possible case, if the terminal $m_k$ is a terminal in the N terminals, that is, the terminal $m_k$ has a statistical autocorrelation matrix corresponding to the terminal $m_k$. The multi-user precoding matrix of the terminal $m_k$ may be represented as $$W'_{m_k}, \text{ and } W'_{m_k}$$

satisfies the following formula:

$$W'_{m_k} = \left( \sum_{i=1}^{M} \alpha_{m_i}^2 U_{m_i} \left( u_{m_i} \right)^H + \Phi_N \right)^{-1} \left( \alpha_{m_k} U_{m_k} + \left( 1 - \alpha_{m_k}^2 \right) \overline{R}_{m_k} U_{m_k} \right)$$

In another possible case, the terminal $m_k$ does not belong to a terminal in the N terminals, and the multi-user precoding matrix of the terminal $m_k$ may be represented as $$W'_{m_k}, \text{ and } W'_{m_k}$$

satisfies the following formula:

$$W'_{m_k} = \left( \sum_{i=1}^{M} \alpha_{m_i}^2 U_{m_i} \left( U_{m_i} \right)^H + \Phi_N \right)^{-1} \left( \alpha_{m_k} U_{m_k} \right)$$

In some embodiments, when values of M and N are equal, that is, the N terminals are the M terminals, the formulas in B1 and B2 may be simplified as follows:

$$\Phi_N = \sum_{j=1}^{N} \left( \left( 1 - \alpha_{n_j}^2 \right) \overline{R}_{n_j} + \sigma_{n_j}^2 I \right); \text{ and}$$

$$W'_{m_k} = \left( \sum_{i=1}^{M} \alpha_{m_i}^2 U_{m_i} \left( U_{m_i} \right)^H + \Phi_N \right)^{-1} \left( \alpha_{m_k} U_{m_k} + \left( 1 - \alpha_{m_k}^2 \right) \overline{R}_{m_k} U_{m_k} \right).$$

The foregoing describes calculation of the multi-user precoding matrix of the terminal $m_k$ with reference to B2. B2 may be performed for each of the M terminals. Finally, the joint precoding matrix of the M terminals may be represented as $$W' = \left[ W'_{m_1}, W'_{m_2}, \dots, W'_{m_M} \right].$$

For meanings of the formulas related to B1 and B2, refer to the foregoing descriptions, and details are not described herein again.

It can be learned from B1 and B2 that if the terminal $m_k$ is a terminal in the N terminals, in addition to the statistical autocorrelation matrix of the another terminal, in the N terminals, other than the terminal $m_k$, a multi-user initial precoding matrix of the terminal $m_k$ is further related to the statistical autocorrelation matrix of the terminal $m_k$. If the terminal $m_k$ is not a terminal in the N terminals (in other words, the M terminals include the N terminals and the terminal $m_k$), the multi-user initial precoding matrix of the terminal $m_k$ is related to the statistical autocorrelation matrices of the N terminals.

The terminal $m_k$ in A1, A2, B1, and B2 may be the first terminal in S401, and the content in A1, A2, B1, and B2 and the content in S401 may be mutually cited and referenced.

A difference between A1 and A2 and B1 and B2 lies in that if the N terminals include the terminal $m_k$, in A1, for each of the N terminals, the terminal needs to be not counted, the statistical autocorrelation matrices of other terminals, in the N terminals, other than the terminal are summed up, and then in A2, inversion is performed on the statistical autocorrelation matrices of the other terminals other than the terminal $m_k$ to calculate the multi-user precoding matrix of the terminal $m_k$, whereas in B1, the terminal $m_k$ does not need to be not counted, the sum of the statistical autocorrelation matrices of the N terminals are calculated, then in B2, inversion is performed on the sum of the statistical autocorrelation matrices of the N terminals, and then the statistical autocorrelation matrix of the terminal m is separately supplemented. Through B1 and B2, the statistical autocorrelation matrices of N terminals can be summed up only once, and inversion can be performed only once, so that a quantity of times of summation and inversion of the statistical autocorrelation matrices can be reduced, calculation complexity can be reduced, and the processing resources can be saved.

FIG. 6 is a schematic diagram of another method for obtaining a joint precoding matrix according to an embodiment of this application. The method in FIG. 6 specifically describes how to obtain the joint precoding matrix. A difference between FIG. 6 and FIG. 5 lies in that in FIG. 6, a statistical autocorrelation matrix and/or a channel estimation result may be corrected. The method in FIG. 6 and the methods in FIG. 3B, FIG. 4A, and FIG. 5 may be mutually combined and referenced. For example, S601 may be performed by 301 in FIG. 3B, S602 and S603 may be performed by 302 in FIG. 3B, and S604 to S607 may be performed by 303 in FIG. 3B. S607 and S401 may be mutually referenced. S601 to S604 and S501 to S504 may be mutually referenced.

The following provides descriptions with reference to FIG. 6.

S601: A base station obtains channel estimation results of M terminals.

Refer to content in S501.

For example, the M terminals include a terminal $m_1$, a terminal $m_2$, a terminal $m_3$, and a terminal $m_4$.

S602: The base station selects N terminals from the M terminals.

Refer to content in S502.

For example, the N terminals include a terminal $n_1$, a terminal $n_2$, and a terminal $n_3$, where the terminal $n_1$ is the terminal $m_1$, the terminal $n_2$ is the terminal $m_2$, and the terminal $n_3$ is the terminal $m_3$.

S602 is optional. When S602 does not exist, it may be understood as that in S603, the base station calculates a statistical autocorrelation matrix of each of the M terminals.

S603: The base station calculates a statistical autocorrelation matrix of each of the N terminals.

Refer to content in S503.

For example, a statistical autocorrelation matrix $\overline{R}_{n_1}$ of the terminal $n_1$, a statistical autocorrelation matrix $\overline{R}n_2$ of the terminal $n_2$, and a statistical autocorrelation matrix $R_{n_3}$ of the terminal $n_3$ may be obtained.

S604: The base station calculates a single-user precoding matrix of each of the M terminals.

Refer to content in S504.

$$U_{m_i}.\ U_{m_i} \in \mathbb{C}^{N_t \times N_f},$$

A single-user precoding matrix of the terminal $m_i$ in the M terminals is where $N_t$ is a quantity of antennas of the base station, $N_f$ is a quantity of streams of the terminal $m_i$, and $$U_{m_i} \in \mathbb{C}^{N_t \times N_f}$$

represents that $U_{m_i}$ is complex number space of $N_t \times N_f$.

For example, a single-user precoding matrix $U_{m_1}$ of the terminal $m_1$, a single-user precoding matrix $U_{m_2}$ of the terminal $m_2$, a single-user precoding matrix $U_{m_3}$ of the terminal $m_3$, and a single-user precoding matrix $U_{m_4}$ of the terminal $m_4$ may be obtained.

S604 may be performed before S603, S604 may be performed after S603, or S604 and S603 may be simultaneously performed. This is not limited in this embodiment of this application.

S605: Select P terminals from the M terminals.

The P terminals may be terminals, in the M terminals, of which a relationship between channels of the terminals and a channel of another terminal satisfies a second preset condition. For example, the second preset condition may be that a correlation between a channel of a terminal and a channel of another terminal is high, or a channel of a terminal causes interference to a channel of another terminal to some extent.

Refer to content in S401. For ease of description, a terminal in the P terminals may be referred to as $p_x$, where P and x are positive integers, $1 \leq P \leq M$, and $1 \leq x \leq P$. That is, $p_x \in \{p_1, p_2, \ldots, p_P\}$. A set $\{p_1, p_2, \ldots, p_P\}$ may be referred to as a set C, and $p_x \in C$. The set C is a subset of a set of the M terminals, and is a subset of a set A. In other words, $C \subseteq A$.

For example, the P terminals include a terminal $p_1$, a terminal $p_2$, and a terminal $p_3$. The terminal $p_1$ is the terminal $m_1$, the terminal $p_2$ is the terminal $m_2$, and the terminal $p_3$ is the terminal $m_4$.

S605 is optional. When S605 does not exist, it may be understood that in S606, the base station calculates a joint initial precoding matrix of the M terminals based on the single-user precoding matrices of the M terminals.

S606: Calculate an initial joint precoding matrix W of the P terminals.

In this application, to distinguish S606 from the step of calculating the joint precoding matrix, a matrix in S606 is referred to as the initial joint precoding matrix. The initial joint precoding matrix of the P terminals includes an initial multi-user precoding matrix of each of the P terminals. For the multi-user precoding matrix, refer to the description in S505, and details are not described herein again.

There may be a plurality of methods for calculating the initial joint precoding matrix. In this embodiment of this application, the following provides descriptions by using the following example, but is not limited to the following example.

First, single-user precoding matrices of the P terminals obtained in S604 and S605 may be concatenated to obtain a precoding matrix $U=[U_{p_1}, U_{p_2}, \ldots, U_{p_P}]$.

For example, a single-user precoding matrix $U_{p_1}$ of the terminal $p_1$, a single-user precoding matrix $U_{p_2}$ of the terminal $p_2$, and a single-user precoding matrix $U_{p_3}$ of the terminal $p_3$ are concatenated to obtain $U=[U_{p_1}, U_{p_2}, U_{p_3}]$.

Then, the initial joint precoding matrix may be represented as W, and $W=U(U^H U+\sigma^2 I)^{-1}$, where $U^H$ represents a conjugate transpose matrix of U, $\sigma^2$ represents downlink noise floor power, and/represents a unit matrix. Downlink noise floor power of each of the P terminals may be the same. In this case, $\sigma^2$ is the same downlink noise floor power. If the downlink noise floor power of each of the P terminals is different, $$\sigma_{p_x}^2 I$$

of the terminal $p_x$ may be obtained, and then $$\sigma_{p_1}^2 I, \sigma_{p_2}^2 I, \ldots, \sigma_{p_P}^2 I$$

are concatenated to obtain $\sigma^2 I$. $W=[W_{p_1}, W_{p_2}, \ldots, W_{p_P}]$. $W_{p_x}$ is an initial multi-user precoding matrix of the terminal $P_x$.

For example, it may be obtained that an initial joint precoding matrix of the terminal $P_1$, the terminal $p_2$, and the terminal $p_3$ satisfies $W=[W_{p_1}, W_{p_2}, W_{p_3}]$.

$(U^H U+\sigma^2 I)^{-1}$ may be understood as avoiding channel space of each of the P terminals, and $W_{p_x}$ may be understood as avoiding channel space corresponding to a channel estimation of another terminal, in the P terminals, other than the terminal $p_x$.

It may be understood that W is obtained based on a single-user precoding matrix of each of the P terminals, and the single-user precoding matrix of each terminal is obtained based on a channel estimation of the terminal. Therefore, W is obtained based on the channel estimation of each of the P terminals, and Wy, is obtained based on the channel estimation of each of the P terminals.

It may be understood that if the single-user precoding matrix of each terminal in S604 is in a granularity of an RE, W obtained in S606 is also at the granularity of an RE; and if the single-user precoding matrix of each terminal in S604 is at a granularity of an RBG, W obtained in S606 is also at the granularity of an RBG.

S607: Update the joint precoding matrix of the M terminals based on the statistical autocorrelation matrix of each of the N terminals and the initial joint precoding matrix of the P terminals.

FIG. 7 is a schematic diagram of a method for updating a joint precoding matrix according to an embodiment of this application. The following describes S607 with reference to FIG. 7.

The method in FIG. 6 may further include S701 to S704. S705 and S607 may be mutually referenced. The following first describes S701 to S705. S701 to S705 are an iteration process. A parameter g may be used to indicate a quantity of iterations, where an initial value of g is 0, and S701 to S705 are performed.

S701: Calculate an equivalent channel of each of the P terminals based on W.

An equivalent channel of the terminal $p_x$ may be represented as $$H_{p_x}^{user}, \text{ and } H_{p_x}^{user} = H_{p_x}^H W_{p_x}, \text{ where } H_{p_x}^H$$

represents a conjugate transpose matrix of $H_{p_x}$. $H_{p_x}$ represents a channel estimation result of the terminal $p_x$.

For example, an equivalent channel of the terminal $p_1$ is $$H_{p_1}^{user}, \text{ and } H_{p_1}^{user} = H_{p_1}^H W_{p_1}.$$

An equivalent channel of the terminal $p_2$ is $$H_{p_2}^{user}, \text{ and } H_{p_2}^{user} = H_{p_2}^H W_{p_2}.$$

An equivalent channel of the terminal $p_3$ is $$H_{p_3}^{user}, \text{ and } H_{p_3}^{user} = H_{p_3}^H W_{p_3}.$$

The equivalent channel of the terminal $p_x$ may be understood as a channel between the terminal $p_x$ and the base station from a perspective of the terminal $p_x$.

$H_{p_x}$ may be obtained based on $H_{r,m_i}(t)$ in S501 or S601. It may be understood that the terminal $p_x$ belongs to a terminal $m_i$. The following provides descriptions with reference to several implementations. It may be understood that the following content is also applicable to $H_{m_i}$.

In some embodiments, $H_{p_x}=H_{r,p_x}(t)$, where r is a subcarrier.

For example, for the terminal $p_1$, $H_{p_1}=H_{1,p_1}(2)$ or $H_1=H_{2,p_1}(2)$.

In some embodiments, in this implementation, $H_{r,p_x}(t)$ corresponding to different terminals may correspond to a same subcarrier or different subcarriers.

In some embodiments, $$H_{p_x} = \frac{1}{R}\sum_{r=1}^R H_{r,p_x}(t).$$

It may be understood that a channel matrix corresponding to each of R REs at a moment t is summed up and averaged to obtain $H_{p_x}(t)$. For example, $H_{p_1}=(H_{1,p_1}(2)+H_{2,p_1}(2))/2$.

The foregoing uses the two implementations as examples for description. It can be learned that $H_{p_x}$ may be obtained based on a channel estimation that is of the terminal $p_x$ and that is on one or more REs at the moment t. In addition to the foregoing two manners, $H_{p_x}$ may be obtained in another manner. This is not limited in this embodiment of this application.

It can be learned from S701 that because the equivalent channel $$H_{p_x}^{user}$$

of the terminal $p_x$ is determined based on $$H_{p_x}^H \text{ and } W_{p_x}, H_{p_x}^H$$

is obtained based on the channel estimation result $H_{p_x}$ of the terminal $p_x$, and $W_{p_x}$ is obtained based on a channel estimation result of each of the P terminals, the equivalent channel $$H_{p_x}^{user}$$

of the terminal $p_x$ is obtained based on the channel estimation result of each of the P terminals.

S701 may be performed before S603 or may be performed after S603, or S701 and S603 may be simultaneously performed. This is not limited in this embodiment of this application.

S702: Calculate a coefficient matrix of each of the P terminals based on the equivalent channel of the terminal.

A coefficient matrix of the terminal $p_x$ may be referred to as an equalization coefficient (equalizer) or a receive weight of the terminal $p_x$, and may be represented as $B_{p_x}$. The coefficient matrix may have another name. This is not limited in this implementation of this application.

In some embodiments, $B_{p_x}$ satisfies the following formula:

$$B_{p_x} = \left(H_{p_x}^{user}\left(H_{p_x}^{user}\right)^H + \sigma_{p_x}{}^2 I\right)^{-1} H_{p_x}^{user}$$

$\sigma_{p_x}$ represents noise in the channel estimation corresponding to the terminal $p_x$. I represents a unit matrix.

In some embodiments, if the terminal $p_x$ is a terminal in the N terminals, that is, the terminal $p_x$ has a statistical autocorrelation matrix $\overline{R}_{p_x}$. $B_{p_x}$ satisfies the following formula:

$$B_{p_x} = \left(H_{p_x}^{user}\left(H_{p_x}^{user}\right)^H + \left(\sigma_{p_x}{}^2 + tr\{W_{p_x}^H \overline{R}_{p_x} W_{p_x}\}\right)I\right)^{-1} H_{p_x}^{user}$$

$$tr\{W_{p_x}^H \overline{R}_{p_x} W_{p_x}\}$$

is a trace of a matrix $$W_{p_x}^H \overline{R}_{p_x} W_{p_x}.$$

49 50

If the terminal $p_x$ is not a terminal in the N terminals, $B_{p_x}$ satisfies the formula in the foregoing first implementation:

$$B_{p_x} = \left(H_{p_x}^{user}\left(H_{p_x}^{user}\right)^H + \sigma_{p_x}{}^2 I\right)^{-1} H_{p_x}^{user}$$

In some embodiments, trace calculation is performed on $$W_{p_x}^H \overline{R}_{p_x} W_{p_x},$$  10 so that a receiving direction represented by the receive weight $B_{p_x}$ can expand, and a wider beam can be received. In this way, more channel energy can be received, and more accurate correction may be performed subsequently based on $B_{p_x}$.

It can be learned from S702 that the coefficient matrix of the terminal $p_x$ in the P terminals is obtained based on the equivalent channel $$H_{p_x}^{user}$$

of the terminal $p_x$, and the equivalent channel $$H_{p_x}^{user}$$ of the terminal $p_x$ is obtained based on the channel estimation of each of the P terminals. Therefore, the coefficient matrix of the terminal $p_x$ is obtained based on the channel estimation of each of the P terminals. In other words, the coefficient matrix of the terminal $p_x$ is related to the channel estimation result of each of the P terminals.

It is assumed that the P terminals include Q terminals in the N terminals. It may be understood that each of the Q terminals has both a statistical autocorrelation matrix and a coefficient matrix, and coefficient matrices of the Q terminals may be used to correct statistical autocorrelation matrices of the Q terminals. Refer to the descriptions in FIG. 4A and FIG. 4C. A terminal in the Q terminals may be referred to as $q_y$, where Q and y are positive integers, $1 \leq Q \leq P$, $1 \leq Q \leq N$, and $1 \leq y \leq Q$. That is, $q_y \in \{q_1, q_2, \ldots, q_Q\}$. A set $\{q_1, q_2, \ldots, q_Q\}$ may be referred to as a set D, and $q_y \in D$. The set D is an intersection of a set of the P terminals (that is, a set C) and a set of the N terminals (that is, a set B). In other words, $D = C \cap B$.

For example, according to the foregoing descriptions, the N terminals include the terminal $n_1$ (that is, the terminal $m_1$), the terminal $n_2$ (that is, the terminal $m_2$), and the terminal $n_3$ (that is, the terminal $m_3$). The P terminals include the terminal $p_1$ (that is, the terminal $m_1$), the terminal $p_2$ (that is, the terminal $m_2$), and the terminal $p_3$ (that is, the terminal $m_4$). In this case, the Q terminals include the terminal $m_1$ and the terminal $m_2$ that may be denoted as a terminal $q_1$ and a terminal $q_2$.

S702 may be performed before S603 or may be performed after S603, or S702 and S603 may be simultaneously performed. This is not limited in this embodiment of this application.

S703: Correct a statistical autocorrelation matrix of each of the Q terminals based on a coefficient matrix of the terminal.

A corrected statistical autocorrelation matrix of the terminal $q_y$ may be represented as $$R'_{q_y}:$$

$$R'_{q_y} = tr\left\{B_{q_y} B_{q_y}^H\right\} \overline{R}_{q_y}$$

$$B_{q_y}^H$$

represents a conjugate transpose matrix of $B_{q_y}$.

In some embodiments, for a terminal that belongs to the N terminals, but does not belong to the Q terminals, because the terminal does not have a coefficient matrix, a statistical autocorrelation matrix may not need to be corrected.

S703 is optional, and the statistical autocorrelation matrices of the Q terminals may not be corrected.

S704: Correct a channel estimation result of each of the P terminals based on the coefficient matrix of the terminal.

A corrected channel estimation result of the terminal $p_x$ may be represented as $$H'_{p_x}, \text{ and } H'_{p_x}$$

satisfies the following formula:

$$H'_{p_x} = H_{p_x}\left(B_{p_x}\right)^H$$

The foregoing formula is used, so that a sending direction of the base station may better match a receiving direction of the terminal.

The corrected channel estimation result of the terminal $p_x$ may be understood as an equivalent channel of the base station. The equivalent channel of the base station may be understood as a channel between the base station and the terminal $p_x$ from a perspective of the base station side.

S704 is optional, and channel estimations of the P terminals may not be corrected.

S705: Update a joint precoding matrix W' of M terminals based on a statistical autocorrelation matrix of each of the N terminals and a channel estimation result of each of the M terminals.

Specifically, for each of the M terminals, a multi-user precoding matrix of the terminal may be updated, and then updated multi-user precoding matrices of the terminals are concatenated to obtain an updated joint precoding matrix. The updated joint precoding matrix may be represented as $$W' = \left[W'_{m_1}, W'_{m_2}, \ldots, W'_{m_M}\right].$$

In a first implementation, the method in FIG. 7 further includes the following step C1, and S705 may include the following step C2.

C1 and C2 may be performed for each of the M terminals. The following uses an example in which C1 and C2 are performed for one terminal $m_k$ in the M terminals for description, where $1 \leq k \leq M$.

C1: Calculate a sum of statistical autocorrelation matrices of other terminals, in the M terminals, other than the terminal $m_k$.

In a possible case, the terminal $m_k$ is a terminal in the Q terminals, that is, the terminal $m_k$ has a corrected statistical autocorrelation matrix corresponding to the terminal $m_k$. It is assumed that the terminal $m_k$ is a terminal $q_s$, where $1 \leq s \leq Q$. In this case, C1 may be understood as calculating a sum of a statistical autocorrelation matrix of another terminal $q_s$ and a statistical autocorrelation matrix of another terminal, in the N terminals, other than the Q terminals.

Refer to the foregoing descriptions. A set of the Q terminals may be represented as a set D, and $q_y \in D$. The set of the N terminals may be represented as the set B, and $n_j \in B$.

A sum of autocorrelation matrices of the other terminals, in the M terminals, other than the terminal $m_k$ may be represented as $\Phi_{\backslash m_k}$:

$$\Phi_{\backslash m_k} = \sum_{q_y \in D, y \neq s} \left( \left(1 - \alpha_{q_y}^2\right) R'_{q_y} + tr\left\{ B_{q_y} B_{q_y}^H \right\} \sigma_{q_y^2} I \right) + \sum_{n_j \in B, n_j \notin D} \left( \left(1 - \alpha_{n_j}^2\right) \bar{R}_{n_j} + \sigma_{n_j^2} I \right)$$

In another possible case, the terminal $m_k$ is not a terminal in the Q terminals, but is a terminal in the N terminals, that is, the terminal $m_k$ has a statistical autocorrelation matrix. It is assumed that the terminal $m_k$ is a terminal $n_1$, where $1 \leq l \leq N$. In this case, C1 may be understood as calculating a sum of corrected statistical autocorrelation matrices of the Q terminals and a statistical autocorrelation matrix of a terminal, in the N terminals, other than the Q terminals and the terminal $m_k$.

Refer to the foregoing descriptions. The set of the Q terminals may be represented as the set D, and $q_y \in D$. The set of the N terminals may be represented as the set B, and $n_j \in B$.

The sum of the autocorrelation matrices of the other terminals, in the M terminals, other than the terminal $m_k$ may be represented as $\Phi_{\backslash m_k}$:

$$\Phi_{\backslash m_k} = \sum_{q_y \in D} \left( \left(1 - \alpha_{q_y}^2\right) R'_{q_y} + tr\left\{ B_{q_y} B_{q_y}^H \right\} \sigma_{q_y^2} I \right) + \sum_{n_j \in B, n_j \notin D, j \neq l} \left( \left(1 - \alpha_{n_j}^2\right) \bar{R}_{n_j} + \sigma_{n_j^2} I \right)$$

In still another possible case, the terminal $m_k$ is not a terminal in the N terminals, that is, the terminal $m_k$ does not have a statistical autocorrelation matrix corresponding to the terminal $m_k$. C1 may be understood as calculating a sum of statistical autocorrelation matrices of the N terminals.

$$\Phi_{\backslash m_k} = \sum_{q_y \in D} \left( \left(1 - \alpha_{q_y}^2\right) R'_{q_y} + tr\left\{ B_{q_y} B_{q_y}^H \right\} \sigma_{q_y^2} I \right) + \sum_{n_j \in B, n_j \notin D} \left( \left(1 - \alpha_{n_j}^2\right) \bar{R}_{n_j} + \sigma_{n_j^2} I \right)$$

In this application, $\alpha_{q_y}$ represents a channel correlation of the terminal $q_y$, and any represents a channel correlation of the terminal $q_y$. $\sigma_{q_y}$ represents noise in a channel estimation corresponding to the terminal $q_y$. $\sigma_{n_j}$ represents noise in a channel estimation corresponding to the terminal $n_j$. Meanings in the formulas are mutually referenced and cited.

C1 may be performed before S704 or may be performed after S704. This is not limited in this embodiment of this application.

C2: Update a multi-user precoding matrix of the terminal $m_k$ based on the sum of the statistical autocorrelation matrices of the other terminals and channel estimation results of the M terminals.

An updated multi-user precoding matrix of the terminal $m_k$ may be represented as $$W'_{m_k}.$$

In a possible case, the terminal $m_k$ is a terminal in the P terminals, that is, the terminal $m_k$ has a corresponding corrected channel estimation result $$H'_{m_k}.$$

Refer to the foregoing descriptions. The set of the M terminals may be represented as the set A. The set of the P terminals may be represented as the set C.

$$W'_{m_k}$$

satisfies the following formula:

$$W'_{m_k} = \alpha_{m_k}^2 \left( \left( \sum_{p_x \in C} \left( \alpha_{p_x}^2 H'_{p_x} \left(H'_{p_x}\right)^H \right) + \left( \sum_{m_i \in A, m_i \notin C} \left( \alpha_{m_i}^2 H_{m_i} \left(H_{m_i}\right)^H \right) + \Phi_{\backslash m_k} \right) \right)^{-1} H'_{m_k}$$

In a possible case, the terminal $m_k$ is not a terminal in the P terminals, that is, the terminal $m_k$ does not have a corresponding corrected channel estimation result.

$$W'_{m_k} = \alpha_{m_k}^2 \left( \left( \sum_{p_x \in C} \alpha_{p_x}^2 H'_{p_x} \left(H'_{p_x}\right)^H \right) + \left( \sum_{m_i \in A, m_i \notin C} \alpha_{m_i}^2 H_{m_i} \left(H_{m_i}\right)^H \right) + \Phi_{\backslash m_k} \right)^{-1} H_{m_k}$$

It can be learned from C1 and C2 that if the terminal $m_k$ is a terminal in the N terminals, the multi-user precoding matrix of the terminal $m_k$ is related to a statistical autocorrelation matrix of another terminal, in the N terminals, other than the terminal $m_k$. If the terminal $m_k$ is not a terminal in the N terminals (in other words, the M terminals include the N terminals and the terminal $m_k$), the multi-user precoding matrix of the terminal $m_k$ is related to the statistical autocorrelation matrices of the N terminals.

In some embodiments, when values of M, N, P, and Q are equal, that is, the N terminals, the P terminals, and the Q terminals are all the M terminals, and sets A, B, C, and D in FIG. 4C are equal. It is assumed that the terminal $m_k$ is a terminal $q_s$ in the Q terminals, the formulas in C1 and C2 may be simplified as follows:

$$\Phi_{\backslash m_k} = \sum\nolimits_{q_y \in D, y \neq s} \left( \left(1 - \alpha_{q_y}^2\right) R'_{q_y} + tr\left\{B_{q_y} B_{q_y}^H\right\} \sigma_{q_y}^2 I \right);$$

$$W'_{m_k} = \alpha_{m_k}^2 \left( \left( \sum_{p_x \in C} \alpha_{p_x}^2 H'_{p_x} \left(H'_{p_x}\right)^H \right) + \Phi_{\backslash m_k} \right)^{-1} H'_{m_k}$$

The foregoing describes calculation of the multi-user precoding matrix of the terminal $m_k$ with reference to C1 and C2. C1 and C2 may be performed for each of the M terminals. Finally, the joint precoding matrix of the M terminals may be represented as $$W' = \left[W'_{m_1}, W'_{m_2}, \ldots, W'_{m_M}\right].$$

The following describes S705 with reference to a second implementation.

In the second implementation, the method in FIG. 7 further includes the following step D1, and S705 may include the following step D2.

D1: Calculate a sum of statistical autocorrelation matrices of the N terminals.

The statistical autocorrelation matrices of the Q terminals are corrected, and a statistical autocorrelation matrix of a terminal, in the N terminals, other than the Q terminals is not corrected.

$$\Phi_N =$$

$$\sum_{q_y \in D} \left( \left(1 - \alpha_{q_y}^2\right) R'_{q_y} + tr\left\{B_{q_y} B_{q_y}^H\right\} \sigma_{q_y}^2 I \right) + \sum_{n_j \in B, n_j \notin D} \left( \left(1 - \alpha_{n_j}^2\right) \bar{R}_{n_j} + \sigma_{n_j}^2 I \right)$$

In this application, $\alpha_{q_y}$ represents the channel correlation of the terminal $q_y$, and $\alpha_{n_j}$ represents the channel correlation of the terminal $q_y$. $\sigma_{q_y}$ represents the noise in the channel estimation corresponding to the terminal $q_y$. $\sigma_{n_j}$ represents the noise in the channel estimation corresponding to the terminal $n_j$.

The foregoing step B1 may be performed only once for the N terminals, and does not need to be performed for each of different terminals, so that processing resources are saved.

An example in which D2 is performed for one terminal $m_k$ in the M terminals is used for description, where $1 \leq k \leq M$.

D2: Calculate the multi-user precoding matrix of the terminal $m_k$ based on the sum of the statistical autocorrelation matrices of the N terminals and the channel estimation results of the M terminals.

The updated multi-user precoding matrix of the terminal $m_k$ may be represented as $$W'_{m_k}.$$

In a possible case, the terminal $m_k$ belongs to the Q terminals, and $W'_{m_k}$ satisfies the following formula:

$$W'_{m_k} = \left( \sum_{p_x \in C} \left(\alpha_{p_x}^2 H'_{p_x} \left(H'_{p_x}\right)^H\right) + \sum_{m_i \in A, m_i \notin C} \left(\alpha_{m_i}^2 H_{m_i} \left(H_{m_i}\right)^H\right) + \Phi_N \right)$$

$$\left( \left(\alpha_{m_k}^2 H'_{m_k} + \left(1 - \alpha_{m_k}^2\right) R'_{m_k} W_{m_k}\right) \right)$$

In another possible case, the terminal $m_k$ does not belong to the Q terminals, but belongs to the N terminals, and $$W'_{m_k}$$

satisfies the following formula:

$$W'_{m_k} = \left( \sum_{p_x \in C} \left(\alpha_{p_x}^2 H'_{p_x} \left(H'_{p_x}\right)^H\right) + \sum_{m_i \in A, m_i \notin C} \left(\alpha_{m_i}^2 H_{m_i} \left(H_{m_i}\right)^H\right) + \Phi_N \right)$$

$$\left( \left(\alpha_{m_k}^2 H'_{m_k} + \left(1 - \alpha_{m_k}^2\right) \bar{R}_{m_k} U_{m_k}\right) \right)$$

In still another possible case, the terminal $m_k$ does not belong to the N terminals, but belongs to the P terminals, and $$W'_{m_k}$$

satisfies the following formula:

$$W'_{m_k} = \left( \sum_{p_x \in C} \left(\alpha_{p_x}^2 H'_{p_x} \left(H'_{p_x}\right)^H\right) + \sum_{m_i \in A, m_i \notin C} \left(\alpha_{m_i}^2 H_{m_i} \left(H_{m_i}\right)^H\right) + \Phi_N \right) \left(\alpha_{m_k}^2 H'_{m_k}\right)$$

In still another possible case, the terminal $m_k$ does not belong to the N terminals, and does not belong to the P terminals, and $$W'_{m_k}$$

satisfies the following formula:

$$W'_{m_k} = \left( \sum_{p_x \in C} \left(\alpha_{p_x}^2 H'_{p_x} \left(H'_{p_x}\right)^H\right) + \sum_{m_i \in A, m_i \notin C} \left(\alpha_{m_i}^2 H_{m_i} \left(H_{m_i}\right)^H\right) + \Phi_N \right) \left(\alpha_{m_k}^2 H'_{m_k}\right)$$

In this application, $\alpha_{p_x}$ represents a channel correlation of the terminal $p_x$, $\alpha_{m_i}$ represents a channel correlation of the terminal $m_i$, and $\alpha_{m_k}$ represents a channel correlation of the terminal $m_k$.

In some embodiments, when the values of M, N, P, and Q are equal, that is, the N terminals, the P terminals, and the Q terminals are all the M terminals, the foregoing sets A, B, C, and D are equal, and the formulas in D1 and D2 may be simplified as follows:

$$\Phi_N = \sum_{q_y \in D} \left( \left(1 - \alpha_{q_y}^2\right) R'_{q_y} + tr\left\{B_{q_y} B_{q_y}^H\right\} \sigma_{q_y^2}^2 I \right); \text{ and}$$

$$W'_{m_k} = \left( \sum_{p_x \in C} \left(\alpha_{p_x}^2 H'_{p_x} \left(H'_{p_x}\right)^H\right) + \Phi_N \right) \left( \left(\alpha_{m_k}^2 H'_{m_k} + \left(1 - \alpha_{m_k}^2\right) R'_{m_k} W_{m_k}\right) \right)$$

The foregoing describes calculation of the multi-user precoding matrix of the terminal $m_k$ with reference to D2. D2 may be performed for each of the M terminals. Finally, the joint precoding matrix of the M terminals may be represented as $$W' = \left[W'_{m_1}, W'_{m_2}, \ldots, W'_{m_M}\right].$$

It can be learned from D1 and D2 that if the terminal $m_k$ is a terminal in the N terminals, in addition to the statistical autocorrelation matrix of the another terminal, in the N terminals, other than the terminal $m_k$, the multi-user precoding matrix of the terminal $m_k$ is further related to the statistical autocorrelation matrix of the terminal $m_k$. If the terminal $m_k$ is not a terminal in the N terminals (in other words, the M terminals include the N terminals and the terminal $m_k$), the multi-user precoding matrix of the terminal $m_k$ is related to the statistical autocorrelation matrices of the N terminals.

The terminal $m_k$ in C1 and C2 and D1 and D2 may be the first terminal in S401, and the content in C1 to C2 and D1 to D2 and the content in S401 may be mutually cited and referenced.

A difference between C1 and C2 and D1 and D2 lies in that if the N terminals include the terminal $m_k$, in C1, for each of the N terminals, the terminal needs to be not counted, the statistical autocorrelation matrices of other terminals, in the N terminals, other than the terminal are summed up, and then in C2, inversion is performed on the statistical autocorrelation matrices of the other terminals other than the terminal $m_k$ to calculate the multi-user precoding matrix of the terminal $m_k$. However, in D1, the terminal $m_k$ does not need to be not counted, and the sum of the statistical autocorrelation matrices of the N terminals are calculated. Then, in D2, inversion is performed on the sum of the statistical autocorrelation matrices of the N terminals, and then the statistical autocorrelation matrix of the terminal $m_k$ is supplemented. Through D1 and D2, the statistical autocorrelation matrices of the N terminals can be summed up only once, and inversion can be performed only once, so that a quantity of times of summation and inversion on the statistical autocorrelation matrices can be reduced, calculation complexity is reduced, and processing resources are saved.

After S705 is performed, a quantity of iterations g is replaced with g+1.

S706: Determine whether the quantity of iterations g is equal to a threshold.

The threshold may be set. A larger value of the threshold indicates a more accurate joint precoding matrix finally obtained.

When the quantity of iterations g is less than the threshold, the joint precoding matrix W' obtained through calculation in S705 is used to replace W, and then S701 is performed.

It should be noted that because W' represents the joint precoding matrix of the M terminals, W is replaced with W'. After returning to S701, in S701, equivalent channels of the M terminals are calculated based on W. In S702, a coefficient matrix of each of the M terminals is calculated based on the equivalent channels of the M terminals. In S703, the statistical autocorrelation matrix, of each of the N terminals, obtained through calculation in S603 is corrected based on the coefficient matrix of the terminal. In S704, the channel estimation result, of each of the M terminals, obtained in S601 is corrected based on the coefficient matrix of the terminal. In S705, the joint precoding matrix W' is updated again based on corrected statistical autocorrelation matrices of the N terminals and corrected channel estimation results of the M terminals.

When the quantity of iterations g is equal to the threshold, the joint precoding matrix W' is output.

S707: Output the joint precoding matrix W'.

The content in S707 and S402 may be combined and mutually referenced.

Corresponding to the methods provided in the foregoing method embodiments, an embodiment of this application further provides a corresponding apparatus, including a corresponding module configured to perform the foregoing embodiments. The module may be software, hardware, or a combination of software and hardware.

The apparatus has a function of implementing the base station described in embodiments of this application. For example, the apparatus includes a corresponding module, unit, or means (means) used by a network device to perform the terminal-related steps described in embodiments of this application. The function, unit, or means (means) may be implemented by using software or hardware, may be implemented by using hardware to execute corresponding software, or may be implemented by a combination of software and hardware. For details, further refer to the corresponding descriptions in the foregoing corresponding method embodiments. Alternatively, the apparatus has a function of implementing the network device described in embodiments of this application. For example, the apparatus includes a corresponding module, unit, or means (means) used by the network device to perform the network device-related steps described in embodiments of this application. The function, unit, or means (means) may be implemented by using software or hardware, may be implemented by using hardware to execute corresponding software, or may be implemented by a combination of software and hardware. For details, further refer to the corresponding descriptions in the foregoing corresponding method embodiments.

Figure 8:
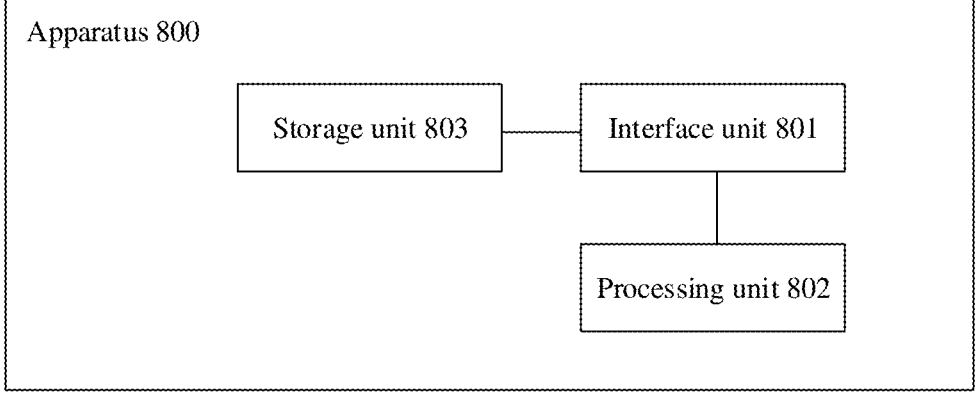
FIG. 8 is a schematic diagram of a structure of an apparatus 800 according to this application.

FIG. 8 is a schematic diagram of a structure of an apparatus 800 according to this application. The apparatus may be a network device, a server, or a centralized controller, or may be a component (for example, an integrated circuit or a chip) of the network device, the server, or the centralized controller. Alternatively, the apparatus may be another communication module configured to implement the methods in the method embodiments of this application. The network device may be a network device in an architecture in which a CU and a DU are not separated, may be a CU or a DU in an architecture in which the CU and the DU are separated, may be a CU-CP or a CU-UP in an architecture in which the CU-CP and the CU-UP are separated, or may be a DU or an RU in an architecture in which the DU and the RU are separated.

The apparatus 800 may include an interface unit 801, a processing unit 802, and a storage unit 803. The interface unit 801 and the storage unit 803 are optional.

In a possible design, the processing unit 802 in FIG. 8 may be implemented by one or more processors. The processing unit 802 may also be referred to as a processing module, and may implement a specific control function.

The interface unit 801 may be implemented by one or more transceivers and/or communication interfaces. The transceiver may implement communication with a terminal, and is configured to implement receiving and sending functions. The communication interface may implement communication with another network device. Alternatively, the communication interface may be a transceiver circuit, an interface, or an interface circuit. The interface unit 801 may be referred to as a transceiver unit.

The storage unit 803 may be implemented by using one or more memories.

In some embodiments, modules in the apparatus 800 in this embodiment of this application may be configured to perform one or more steps described in FIG. 4A, FIG. 5, FIG. 6, or FIG. 7 in embodiments of this application. Specifically, the processing unit is configured to perform a processing-related action. The interface unit 801 is configured to perform information receiving, information sending, or the like with a unit in the network device, or is configured to perform information receiving, information sending, or the like between the network device and another network device. The storage unit 803 is configured to store information received from another unit of the network device or from another network device, or store information to be sent to another unit or another network device, or may store information generated by the processing unit in a processing process.

In some embodiments, the processing unit 802 is configured to obtain a joint precoding matrix of M terminals based on statistical autocorrelation matrices respectively corresponding to N terminals in the M terminals, where M and N are positive integers, $M \geq 2$, and $1 \leq N \leq M$. The interface unit 801 is configured to output information that indicates the joint precoding matrix.

The N terminals include a terminal $n_j$, a statistical autocorrelation matrix $\overline{R}_{n_j}$ corresponding to the terminal $n_j$ is obtained by filtering an autocorrelation matrix $R_{n_j}$ corresponding to the terminal $n_j$ in frequency domain and/or time domain, j is a positive integer, $1 \leq j \leq N$, and the autocorrelation matrix $R_{n_j}$ corresponding to the terminal $n_j$ is obtained based on a channel estimation result corresponding to the terminal $n_j$.

The storage unit 803 may store one or more of the channel estimation result corresponding to the terminal $n_j$, the autocorrelation matrix $R_{n_j}$ corresponding to the terminal $n_j$, the statistical autocorrelation matrix $\overline{R}_{n_j}$ corresponding to the terminal $n_j$, and the joint precoding matrix.

In some embodiments, the statistical autocorrelation matrix $\overline{R}_{n_j}$ includes T main diagonal blocks and a zero element other than the T main diagonal blocks, and T is an integer greater than or equal to 2.

The M terminals include P terminals. The P terminals include a terminal $p_x$. The terminal $p_x$ corresponds to a coefficient matrix $B_{p_x}$. $B_{p_x}$ is related to a channel estimation result corresponding to each of the P terminals, where P and x are positive integers, $1 \leq P \leq M$, and $1 \leq x \leq P$. The N terminals include Q terminals in the P terminals. The Q terminals include a terminal $q_y$.

In some embodiments, the processing unit is configured to obtain the joint precoding matrix based on corrected statistical autocorrelation matrices corresponding to the Q terminals and a statistical autocorrelation matrix of a terminal, in the N terminals, other than the Q terminals.

A corrected statistical autocorrelation matrix $$R'_{q_y}$$

corresponding to the terminal $q_y$ is obtained by correcting a statistical autocorrelation matrix $\overline{R}_{q_y}$ corresponding to the terminal $q_y$ based on a coefficient matrix $B_{q_y}$ corresponding to the terminal $q_y$, where Q and y are positive integers, $1 \leq Q \leq P$, $1 \leq Q \leq N$, and $1 \leq y \leq Q$.

In some embodiments, in the foregoing possible implementation, the processing unit is configured to obtain the joint precoding matrix based on a corrected channel estimation result $$H'_{p_x}$$

corresponding to the terminal $p_x$, the corrected statistical autocorrelation matrices corresponding to the Q terminals, and the statistical autocorrelation matrix of the terminal, in the N terminals, other than the Q terminals. The corrected channel estimation result $H'_{p_x}$ corresponding to the terminal $p_x$ is obtained by correcting a channel estimation result $$H'_{p_x}$$

corresponding to the terminal $p_x$ based on the coefficient matrix $B_{p_x}$ corresponding to the terminal $p_x$.

In another possible implementation, the processing unit is configured to obtain the joint precoding matrix based on the corrected channel estimation result $$H'_{p_x}$$

corresponding to the terminal $p_x$ and the statistical autocorrelation matrices respectively corresponding to the N terminals. The corrected channel estimation result $$H'_{p_x}$$

corresponding to the terminal $p_x$ is obtained by correcting the channel estimation result $H_{p_x}$ corresponding to the terminal $p_x$ based on the coefficient matrix $B_{p_x}$ corresponding to the terminal $p_x$.

In some embodiments, the M terminals include the N terminals and a first terminal, and a precoding matrix that is in the joint precoding matrix and that corresponds to the first terminal is related to the statistical autocorrelation matrices of the N terminals.

In another possible implementation, N>1, the N terminals include the first terminal, and the precoding matrix that is in the joint precoding matrix and that corresponds to the first terminal is related to statistical autocorrelation matrices of N−1 terminals, in the N terminals, other than the first terminal.

In some embodiments, in the another possible implementation, the precoding matrix corresponding to the first terminal is further related to a statistical autocorrelation matrix of the first terminal.

In some embodiments, the interface unit 801 is specifically configured to output information that indicates a compressed matrix, where the compressed matrix corresponds to the joint precoding matrix.

In some embodiments, the channel estimation result is obtained by measuring an uplink reference signal or is obtained based on information that is fed back by the terminal and that indicates an initial precoding matrix.

The processor and the transceiver described in this application may be implemented on an integrated circuit (IC), an analog IC, a radio frequency integrated circuit RFIC, a mixed signal IC, an application-specific integrated circuit (ASIC), a printed circuit board (PCB), an electronic device, or the like. The processor and the transceiver may also be manufactured by using various IC technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiment may be a network device.

However, a scope of the apparatus described in this application is not limited thereto, and a structure of the apparatus may not be limited by FIG. 8. The apparatus may be an independent device or may be a part of a large device. For example, the apparatus may be:

(1) an independent integrated IC, a chip, or a chip system or subsystem;

(2) a set including one or more ICs, where in some embodiments, the IC set may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like: or (6) others.

Figure 9:
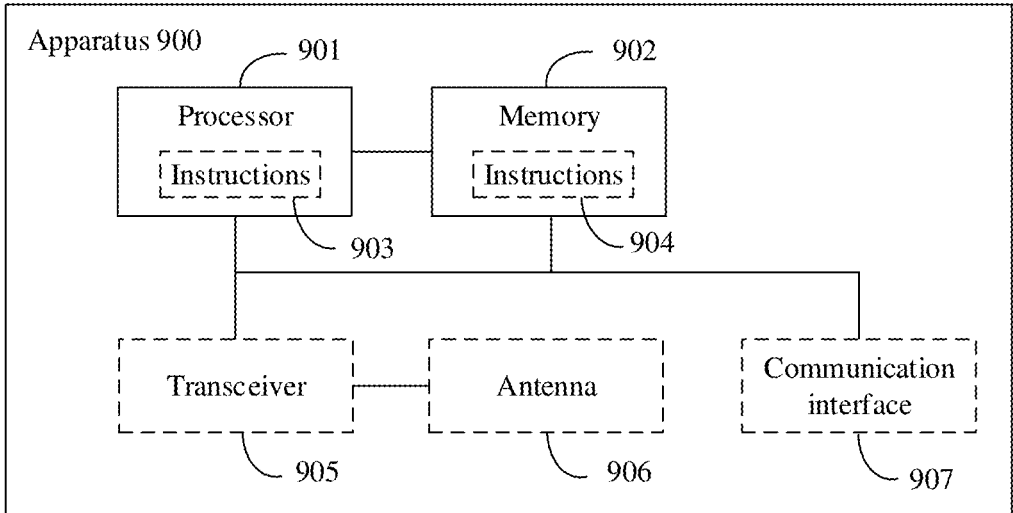
FIG. 9 is a schematic diagram of a structure of an apparatus 900 according to this application.

FIG. 9 is a schematic diagram of a structure of an apparatus 900. The apparatus 900 may be configured to implement the methods described in the foregoing method embodiments. For details, refer to the descriptions in the foregoing method embodiments. The apparatus may be a network device, a server, or a centralized controller, or may be a component (for example, an integrated circuit or a chip) of the network device, the server, or the centralized controller. Alternatively, the apparatus may be another communication module configured to implement the methods in the method embodiments of this application. The network device may be a network device in an architecture in which a CU and a DU are not separated, may be a CU or a DU in an architecture in which the CU and the DU are separated, may be a CU-CP or a CU-UP in an architecture in which the CU-CP and the CU-UP are separated, or may be a DU or an RU in an architecture in which the DU and the RU are separated.

The apparatus 900 may include one or more processors 901. The processor 901 may also be referred to as a processing unit, and may implement a specific control function. The processor 901 may be a general-purpose processor or a dedicated processor. For example, the processor 901 may be a baseband processor or a central processing unit. The baseband processor may be configured to process a communication protocol and communication data. The central processing unit may be configured to: control a communication apparatus (for example, a base station, a baseband chip, a DU, a CU, or an RU), execute a software program, and process data of the software program.

In an optional design, the processor 901 may also store instructions and/or data 903. The instructions and/or data 903 may be run by the processor, so that the apparatus 900 performs the methods described in the foregoing method embodiments.

In another optional design, the processor 901 may include an interface unit configured to implement a receiving function and a sending function. For example, the interface unit may be a transceiver circuit, an interface, an interface circuit, or a communication interface. A transceiver circuit, an interface, or an interface circuit configured to implement the receiving function and that configured to implement the sending function may be separated, or may be integrated together. The transceiver circuit, the interface, or the interface circuit may be configured to read and write code/data. Alternatively, the transceiver circuit, the interface, or the interface circuit may be configured to transmit or transfer a signal.

In some embodiments, the apparatus 900 may include one or more memories 902. The memory 902 may store instructions 904. The instructions may be run on the processor, so that the apparatus 900 performs the methods described in the foregoing method embodiments. In some embodiments, the memory may further store data. In some embodiments, the processor may also store instructions and/or data. The processor and the memory may be separately disposed, or may be integrated together. For example, the correspondences described in the foregoing method embodiments may be stored in the memory or stored in the processor.

In some embodiments, the apparatus 900 may further include a transceiver 905 and/or an antenna 906. The transceiver 905 may be referred to as a transceiver unit, a transceiver, a transceiver circuit, an interface unit, a transceiver apparatus, a transceiver module, or the like, and is configured to implement receiving and sending functions, for example, receiving and sending functions with a terminal.

In some embodiments, the apparatus 900 may further include a communication interface. The communication interface may be configured to communicate with another communication apparatus. For example, the communication apparatus is the CU, and the CU may communicate with the DU through the communication interface.

For example, the apparatus is a base station in the architecture in which the CU and the DU are not separated, and the apparatus 900 may include the processor 901, the memory 902, the transceiver 905 and the antenna 906, and the communication interface 907. The base station may perform information transmission with the terminal by using the transceiver 905 and the antenna 906. The base station may communicate with another base station or network device through the communication interface 907.

For example, when the apparatus is the CU, the apparatus 900 may include the processor 901, the memory 902, and the communication interface 907. The CU may perform information transmission with the DU through the communication interface 907.

Alternatively, for example, when the apparatus is the DU (which is the DU in the architecture in which the DU and the RU are not separated), the communication apparatus may include the processor 901, the memory 902, the transceiver 905 and the antenna 906, and the communication interface 907. The DU may perform information transmission with the terminal by using the transceiver 905 and the antenna 906, and the DU may perform information transmission with the CU through the communication interface 907. For example, the DU may implement the methods in FIG. 4A, FIG. 5, and FIG. 6 to FIG. 7. After obtaining the joint precoding matrix, the DU may process data of the M terminals by using the joint precoding matrix, and then send the data to the terminal by using the transceiver 905 and the antenna 906.

Alternatively, for example, when the apparatus is the RU in the architecture in which the DU and the RU are separated, the apparatus may include the processor 901, the memory 902, the transceiver 905 and the antenna 906, and the communication interface 907. The RU may perform information transmission with the terminal by using the transceiver 905 and the antenna 906, and the RU may perform information transmission with the DU through the communication interface 907.

Alternatively, for example, when the apparatus is the DU in the architecture in which the DU and the RU are separated, the apparatus may include the processor 901, the memory 902, and the communication interface 907. The DU may perform information transmission with the RU through the communication interface 907.

It may be understood that in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

A person skilled in the art may further understand that various illustrative logical blocks (illustrative logical blocks) and steps (steps) that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the functions for corresponding applications, but it should not be considered that the implementation goes beyond the protection scope of embodiments of this application.

It may be understood that the processor in embodiments of this application may be an integrated circuit chip and has a signal processing capability. In some embodiments process, steps in the foregoing method embodiments may be implemented by using a hardware integrated logic circuit in the processor or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component.

The solutions described in this application may be implemented in various manners. For example, these technologies may be implemented by using hardware, software, or a combination of hardware and software. For hardware implementation, a processing unit configured to execute these technologies at a communication apparatus (for example, a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic device, a discrete hardware component, or any combination thereof. The general-purpose processor may be a microprocessor. In some embodiments, the general-purpose processor may be any processor, controller, microcontroller, or state machine. The processor may alternatively be implemented by a combination of computing apparatuses, for example, a digital signal processor and a microprocessor, a plurality of microprocessors, one or more microprocessors with a digital signal processor core, or any other similar configuration.

It may be understood that the memory in embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, a plurality of forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and methods described in this specification includes but is not limited to these memories and any memory of another appropriate type.

This application further provides a computer-readable medium. The computer-readable medium stores a computer program. When the computer program is executed by a computer, a function of any one of the foregoing method embodiments is implemented.

This application further provides a computer program product. When the computer program product is executed by a computer, a function of any one of the foregoing method embodiments is implemented.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, that integrates one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

It may be understood that "an embodiment" mentioned in the entire specification means that particular features, structures, or characteristics related to the embodiment are included in at least one embodiment of this application. Therefore, embodiments in the entire specification do not necessarily mean a same embodiment. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that in this application, "when" and "if" mean that an apparatus performs corresponding processing in an objective situation, and are not intended to limit time. The terms do not mean that the apparatus is required to have a determining action during implementation, and do not mean any other limitation.

"Simultaneously" in this application may be understood as being at a same time point, may be understood as being within a time period, or may be understood as being within a same periodicity.

A person skilled in the art may understand that various numbers such as "first" and "second" in this application are merely used for distinguishing for ease of description, and are not used to limit the scope of embodiments of this application. A specific value of a number (which may also be referred to as an index), a specific value of a quantity, and a position in this application are merely used as examples, but are not unique representation forms, and are not used to limit the scope of embodiments of this application. Various numbers such as "first" and "second" in this application are merely used for distinguishing for ease of description, and are not used to limit the scope of embodiments of this application.

In this application, an element represented in a singular form is intended to represent "one or more", but does not represent "one and only one", unless otherwise specified. In this application, unless otherwise specified, "at least one" is intended to represent "one or more", and "a plurality of" is intended to represent "two or more".

In addition, the terms "system" and "network" in this specification may be used interchangeably in this specification. The term "and/or" in this specification describes only an association relationship for describing associated objects and represents that three relationships may exist. For example, A and/or B may represent the following three cases: Only A exists, both A and B exist, and only B exists.

A may be singular or plural, and B may be singular or plural. The character "/" generally indicates an "or" relationship between the associated objects.

The term "at least one of . . . " in this specification represents all or any combination of the listed items. For example, "at least one of A, B, and C" may represent the following six cases: Only A exists, only B exists, only C exists, both A and B exist, both B and C exist, and A, B, and C all exist. A may be singular or plural, B may be singular or plural, and C may be singular or plural.

It may be understood that in embodiments of this application, "B corresponding to A" indicates that B is associated with A, and B may be determined based on A. However, it should be further understood that determining B based on A does not mean that B is determined only based on A. B may alternatively be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all the correspondences shown in the tables need to be configured. For example, in the tables in this application, correspondences shown in some rows may alternatively not be configured. For another example, appropriate deformations and adjustments such as splitting and combination may be performed based on the foregoing tables. Names of the parameters shown in titles of the foregoing tables may alternatively be other names that may be understood by a communication apparatus, and values or representation manners of the parameters may alternatively be other values or representation manners that may be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by using electronic hardware or a combination of computer software and electronic hardware. Whether these functions are performed by using hardware or software depends on particular applications and design constraints of the technical solutions. A skilled person may use different methods to implement the described functions for each particular application, but it should not be considered that the implementation goes beyond the scope of this application.

A person of ordinary skill in the art may understand that for a purpose of convenient and brief descriptions, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between apparatuses or units may be implemented in electronic, mechanical, or other forms.

The units described as separate components may or may not be physically separate, and components displayed as units may or may not be physical units, may be located in one place, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in a form of a software functional unit and sold or used as an independent product, the functions may be stored in a computer-readable storage medium. Based on such an understanding, the technical solutions of this application essentially, or the part contributing to the technology of some approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that may store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods/ implementation methods in embodiments, unless otherwise specified or a logical conflict occurs, terms and/or descriptions are consistent and may be mutually referenced between different embodiments and between the implementations/ implementation methods/implementation methods in embodiments. Technical features in different embodiments and the implementations/implementation methods/implementation methods in embodiments may be combined to form a new embodiment, implementation, implementation method, or implementation method based on an internal logical relationship thereof. The foregoing implementations of this application are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A method, wherein the method comprises:
    obtaining, by a network device, a joint precoding matrix of M terminals based on statistical autocorrelation matrices respectively corresponding to N terminals in the M terminals, where M and N are positive integers, M≥2, and 1≤N≤M;
    outputting, by the network device, information that is useable to indicate the joint precoding matrix; and generating, by the network device, precoding signals based on the joint precoding matrix, and transmitting data based on the precoding signals;
    wherein the N terminals comprise a terminal $n_j$, wherein a statistical autocorrelation matrix $\overline{R}_{n_j}$ corresponding to the terminal $n_j$ is obtainable by filtering an autocorrelation matrix $R_{n_j}$ corresponding to the terminal $n_j$ in a frequency domain or a time domain, j is a positive integer, 1≤j≤N, and the autocorrelation matrix $R_{n_j}$ corresponding to the terminal $n_j$ is obtainable based on a channel estimation result $H_{n_j}$ corresponding to the terminal $n_j$.

2. The method according to claim 1, wherein the statistical autocorrelation matrix $\overline{R}_{n_j}$ comprises T main diagonal blocks and a zero element other than the T main diagonal blocks, and T is an integer greater than or equal to 2.

3. The method according to claim 1, wherein
    the M terminals comprise P terminals, the P terminals comprise a terminal $p_x$, the terminal $p_x$ corresponds to a coefficient matrix $B_{p_x}$, where $B_{p_x}$ is related to a channel estimation result corresponding to each of the P terminals, where P and x are positive integers, 1≤P≤M, and 1≤x≤P; and
    the N terminals comprise Q terminals in the P terminals, the Q terminals comprise a terminal $q_y$, and
    obtaining the joint precoding matrix of the M terminals based on the statistical autocorrelation matrices respectively corresponding to the N terminals in the M terminals comprises:
        obtaining the joint precoding matrix based on corrected statistical autocorrelation matrices corresponding to the Q terminals and a statistical autocorrelation matrix of a terminal in the N terminals and being other than the Q terminals, wherein
        a corrected statistical autocorrelation matrix $$R'_{q_y}$$

corresponding to the terminal $q_y$ is obtainable by correcting a statistical autocorrelation matrix $\overline{R}_{q_y}$ corresponding to the terminal $q_y$ based on a coefficient matrix Bay corresponding to the terminal $q_y$, where Q and y are positive integers, 1≤Q≤P, 1≤Q≤N, and 1≤y≤Q.

4. The method according to claim 3, wherein the obtaining the joint precoding matrix based on the corrected statistical autocorrelation matrices corresponding to the Q terminals and the statistical autocorrelation matrix of the terminal in the N terminals and being other than the Q terminals comprises:
    obtaining the joint precoding matrix based on the corrected channel estimation result $$H'_{p_x}$$

corresponding to the terminal $p_x$, the corrected statistical autocorrelation matrices corresponding to the Q terminals, and the statistical autocorrelation matrix of the terminal in the N terminals and being other than the Q terminals, wherein

67 the corrected channel estimation result $$H'_{p_x}$$

corresponding to the terminal $p_x$ is obtainable by correcting a channel estimation result $H_{p_x}$ corresponding to the terminal $p_x$ based on a coefficient matrix $B_{p_x}$ corresponding to the terminal $p_x$.

5. The method according to claim 1, wherein the M terminals comprise P terminals, the P terminals comprise a terminal $p_x$, the terminal $p_x$ corresponds to a coefficient matrix $B_{p_x}$, and $B_{p_x}$ is related to a channel estimation result corresponding to each of the P terminals, P and x are positive integers, $1 \le P \le M$, and $1 \le x \le P$; and the obtaining the joint precoding matrix of the M terminals based on the statistical autocorrelation matrices respectively corresponding to the N terminals comprises:

obtaining the joint precoding matrix based on the corrected channel estimation result $$H'_{p_x}$$

corresponding to the terminal $p_x$ and the statistical autocorrelation matrices respectively corresponding to the N terminals, wherein the corrected channel estimation result $$H'_{p_x}$$

corresponding to the terminal $p_x$ is obtainable by correcting a channel estimation result $H_{p_x}$ corresponding to the terminal $p_x$ based on the coefficient matrix $B_{p_x}$ corresponding to the terminal $p_x$.

6. The method according to claim 1, wherein the M terminals comprise the N terminals and a first terminal, where a precoding matrix that is in the joint precoding matrix and that corresponds to the first terminal is related to the statistical autocorrelation matrices respectively corresponding to the N terminals.

7. The method according to claim 1, wherein N≥2, the N terminals comprise a first terminal, and a precoding matrix that is in the joint precoding matrix and that corresponds to the first terminal is related to statistical autocorrelation matrices respectively corresponding to N−1 terminals in the N terminals and being other than the first terminal.

8. The method according to claim 7, wherein the precoding matrix that is in the joint precoding matrix and that corresponds to the first terminal is further related to another statistical autocorrelation matrix corresponding to the first terminal.

9. The method according to claim 1, wherein the outputting, by the network device, the information that is useable to indicate the joint precoding matrix comprises: outputting information that is useable to indicate a compressed matrix, wherein the compressed matrix corresponds to the joint precoding matrix.

10. The method according to claim 1, wherein the channel estimation result $H_{n_j}$ corresponding to the terminal $n_j$ is obtainable by measuring an uplink reference signal or is obtainable based on information that is fed back by another terminal and that indicates an initial precoding matrix.

11. A communication apparatus, wherein the communication apparatus comprises:

a processor configured to obtain a joint precoding matrix of M terminals based on statistical autocorrelation matrices respectively corresponding to N terminals in the M terminals, where M and N are positive integers, M≥2, and $1 \le N \le M$; and an interface configured to output information that is useable to indicate the joint precoding matrix, to generate precoding signals based on the joint precoding matrix, and to transmit data based on the precoding signals, wherein the N terminals comprise a terminal $n_j$, wherein a statistical autocorrelation matrix $\bar{R}_{n_j}$ corresponding to the terminal $n_j$ is obtainable by filtering an autocorrelation matrix $R_{n_j}$ corresponding to the terminal $n_j$ in a frequency domain or a time domain, j is a positive integer, $1 \le j \le N$, and the autocorrelation matrix $R_{n_j}$ corresponding to the terminal $n_j$ is obtainable based on a channel estimation result $H_{n_j}$ corresponding to the terminal $n_j$.

12. The communication apparatus according to claim 11, wherein the statistical autocorrelation matrix $\bar{R}_{n_j}$ comprises T main diagonal blocks and a zero element other than the T main diagonal blocks, and T is an integer greater than or equal to 2.

13. The communication apparatus according to claim 11, wherein the M terminals comprise P terminals, the P terminals comprise a terminal $p_x$, the terminal $p_x$ corresponds to a coefficient matrix $B_{p_x}$, where $B_{p_x}$ is related to a channel estimation result corresponding to each of the P terminals, where P and x are positive integers, $1 \le P \le M$, and $1 \le x \le P$; and the N terminals comprise Q terminals in the P terminals, the Q terminals comprise a terminal $q_y$, and the processor configured to obtain the joint precoding matrix of the M terminals based on the statistical autocorrelation matrices respectively corresponding to the N terminals in the M terminals comprises:

the processor configured to obtain the joint precoding matrix based on corrected statistical autocorrelation matrices corresponding to the Q terminals and a statistical autocorrelation matrix of a terminal in the N terminals and being other than the Q terminals, wherein a corrected statistical autocorrelation matrix $R'_{q_y}$ corresponding to the terminal $q_y$ is obtainable by correcting a statistical autocorrelation matrix $\bar{R}_{q_y}$ corresponding to the terminal $q_y$ based on a coefficient matrix $B_{q_y}$ corresponding to the terminal $q_y$, where Q and y are positive integers, $1 \le Q \le P$, $1 \le Q \le N$, and $1 \le y \le Q$.

14. The communication apparatus according to claim 13, wherein the processor configured to obtain the joint precoding matrix based on the corrected statistical autocorrelation matrices corresponding to the Q terminals and the statistical autocorrelation matrix of the terminal in the N terminals and being other than the Q terminals comprises:

the processor configured to obtain the joint precoding matrix based on the corrected channel estimation result $$H'_{p_x}$$

corresponding to the terminal $p_x$, the corrected statistical autocorrelation matrices corresponding to the Q terminals, and the statistical autocorrelation matrix of the terminal in the N terminals and being other than the Q terminals, wherein the corrected channel estimation result $$H'_{p_x}$$

corresponding to the terminal $p_x$ is obtainable by correcting a channel estimation result $H_{p_x}$ corresponding to the terminal $p_x$ based on the coefficient matrix $B_{p_x}$ corresponding to the terminal $p_x$.

15. The communication apparatus according to claim 11, wherein the M terminals comprise P terminals, the P terminals comprise a terminal $p_x$, the terminal $p_x$ corresponds to a coefficient matrix $B_{p_x}$, and $B_{p_x}$ is related to a channel estimation result corresponding to each of the P terminals, P and x are positive integers, $1 \leq P \leq M$, and $1 \leq x \leq P$; and the processor configured to obtain the joint precoding matrix of the M terminals based on the statistical autocorrelation matrices respectively corresponding to the N terminals in the M terminals comprises:

the processor configured to obtain the joint precoding matrix based on a corrected channel estimation result $$H'_{p_x}$$

corresponding to the terminal $p_x$ and the statistical autocorrelation matrices respectively corresponding to the N terminals, wherein the corrected channel estimation result $$H'_{p_x}$$

corresponding to the terminal $p_x$ is obtainable by correcting a channel estimation result $H_{p_x}$ corresponding to the terminal $p_x$ based on the coefficient matrix $B_{p_x}$ corresponding to the terminal $p_x$.

16. The communication apparatus according to claim 11, wherein the M terminals comprise the N terminals and a first terminal, where a precoding matrix that is in the joint precoding matrix and that corresponds to the first terminal is related to the statistical autocorrelation matrices of the N terminals.

17. The communication apparatus according to claim 11, wherein $N > 1$, the N terminals comprise a first terminal, and a precoding matrix that is in the joint precoding matrix and that corresponds to the first terminal is related to statistical autocorrelation matrices of $N-1$ terminals, in the N terminals and being other than the first terminal.

18. The communication apparatus according to claim 17, wherein the precoding matrix that is in the joint precoding matrix and that corresponds to the first terminal is further related to a statistical autocorrelation matrix of the first terminal.

19. The communication apparatus according to claim 11, wherein the interface is further configured to:

output information that is useable to indicate a compressed matrix, wherein the compressed matrix corresponds to the joint precoding matrix.

20. The communication apparatus according to claim 11, wherein the channel estimation result $H_{n_j}$ corresponding to the terminal $n_j$ is obtainable by measuring an uplink reference signal or is obtainable based on information that is fed back by another terminal and that indicates an initial precoding matrix.

* * * * *